US008080610B2

(12) United States Patent
Kiss et al.

(10) Patent No.: US 8,080,610 B2
(45) Date of Patent: *Dec. 20, 2011

(54) MONOMER RECYCLE PROCESS FOR FLUID PHASE IN-LINE BLENDING OF POLYMERS

(75) Inventors: Gabor Kiss, Hampton, NJ (US); Alan Anthony Galuska, Glen Gardner, NJ (US); James Richardson Lattner, LaPorte, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 900 days.

This patent is subject to a terminal disclaimer.

(21) Appl. No.: 12/074,496

(22) Filed: Mar. 4, 2008

(65) Prior Publication Data

US 2008/0281040 A1 Nov. 13, 2008

Related U.S. Application Data

(60) Provisional application No. 60/905,247, filed on Mar. 6, 2007.

(51) Int. Cl.
*C08F 2/04* (2006.01)
*C08F 2/06* (2006.01)

(52) U.S. Cl. ............ 525/53; 525/54; 525/191; 525/240; 526/68; 526/70; 526/71

(58) Field of Classification Search .................... 525/53, 525/54, 191, 240; 526/68, 70, 71
See application file for complete search history.

(56) References Cited

U.S. PATENT DOCUMENTS

| | | | |
|---|---|---|---|
| 2,153,553 A | 4/1939 | Fawcett et al. | |
| 2,852,501 A | 9/1958 | Richard, Jr. et al. | |
| 3,000,854 A * | 9/1961 | Favre | 523/303 |
| 3,294,772 A | 12/1966 | Cottle | |
| 3,725,378 A | 4/1973 | Chamberlin | |
| 4,135,044 A | 1/1979 | Beals | |
| 4,153,774 A | 5/1979 | Boettcher et al. | |
| 4,530,914 A | 7/1985 | Ewen et al. | |
| 4,794,004 A | 12/1988 | Pfleger et al. | |
| 4,962,262 A | 10/1990 | Winter et al. | |
| 5,026,798 A | 6/1991 | Canich | |
| 5,081,322 A | 1/1992 | Winter et al. | |
| 5,084,534 A | 1/1992 | Welborn, Jr. et al. | |
| 5,096,867 A | 3/1992 | Canich | |
| 5,236,998 A | 8/1993 | Lundeen et al. | |
| 5,272,236 A | 12/1993 | Lai et al. | |
| 5,324,799 A | 6/1994 | Yano et al. | |
| 5,324,800 A | 6/1994 | Welborn, Jr. et al. | |
| 5,326,835 A | 7/1994 | Ahvenainen et al. | |
| 5,382,630 A | 1/1995 | Stehling et al. | |
| 5,382,631 A | 1/1995 | Stehling et al. | |
| 5,391,654 A | 2/1995 | Ahvenainen et al. | |
| 5,408,017 A | 4/1995 | Turner et al. | |
| 5,416,153 A | 5/1995 | Winter et al. | |
| 5,504,171 A | 4/1996 | Etherton et al. | |
| 5,514,761 A | 5/1996 | Etherton et al. | |
| 5,635,573 A | 6/1997 | Harrington et al. | |
| 5,652,308 A | 7/1997 | Merrill et al. | |
| 5,670,595 A | 9/1997 | Meka et al. | |
| 5,693,730 A | 12/1997 | Kuber et al. | |
| 5,723,560 A | 3/1998 | Canich | |
| 5,723,705 A | 3/1998 | Herrmann et al. | |
| 5,756,608 A | 5/1998 | Langhauser et al. | |
| 5,840,644 A | 11/1998 | Kuber et al. | |
| 5,866,663 A | 2/1999 | Brookhart et al. | |
| 5,882,750 A | 3/1999 | Mink et al. | |
| 5,936,053 A | 8/1999 | Fukuoka et al. | |
| 5,962,719 A | 10/1999 | Winter et al. | |
| 5,965,674 A | 10/1999 | Moen et al. | |
| 5,969,062 A | 10/1999 | Moll et al. | |
| 5,998,547 A | 12/1999 | Hohner | |
| 6,084,041 A | 7/2000 | Adntsjo et al. | |
| 6,124,231 A | 9/2000 | Fritze et al. | |
| 6,143,682 A | 11/2000 | Fisher | |
| 6,160,072 A | 12/2000 | Ewen | |
| 6,207,756 B1 | 3/2001 | Datta et al. | |
| 6,218,488 B1 | 4/2001 | Schiffino et al. | |
| 6,225,432 B1 | 5/2001 | Weng et al. | |
| 6,255,410 B1 | 7/2001 | Shigekauzu et al. | |
| 6,300,451 B1 | 10/2001 | Mehta et al. | |

(Continued)

FOREIGN PATENT DOCUMENTS

CA 2118711 3/1993

(Continued)

OTHER PUBLICATIONS

U.S. Appl. No. 11/961,583, filed Dec. 20, 2007, ExxonMobil.

(Continued)

*Primary Examiner* — Roberto Rabago
(74) *Attorney, Agent, or Firm* — Robert A. Migliorini

(57) ABSTRACT

A monomer recycle process for fluid phase in-line blending of polymers is provided. In one form, the monomer recycle process includes providing a first group (G1) of one or more reactor trains and a second group (G2) of one or more reactor trains and one or more separators fluidly connected to G1 and one separator fluidly connected to G2; polymerizing in each reactor train of G1 and G2 olefin monomers to form homogenous fluid phase polymer-monomer mixtures wherein each of the G1 and G2 reactor trains have at least one common monomer; passing the reactor effluents from the one or more G1 reactor trains through the one or more G1 separators to separate a monomer-rich phase from a polymer-enriched phase; passing the polymer-enriched phase and the reactor effluents from the one or more G2 reactor trains into the G2 separator (separator-blender) to separate another monomer-rich phase from a polymer-rich blend; recycling to one or more G1 reactor trains the separated monomer-rich phase from the one or more G1 separators; and recycling to one or more G2 reactor trains the separated monomer-rich phase from the G2 separator. The polymer-rich blend is conveyed to a downstream finishing stage for further monomer stripping, drying and/or pelletizing to form a polymer product blend.

52 Claims, 26 Drawing Sheets

U.S. PATENT DOCUMENTS

| | | | |
|---|---|---|---|
| 6,355,741 B1 | 3/2002 | Marechal | |
| 6,372,847 B1 | 4/2002 | Wouters | |
| 6,469,188 B1 | 10/2002 | Miller et al. | |
| 6,492,473 B1 | 12/2002 | Canich | |
| 6,562,914 B1 | 5/2003 | Andtsjo et al. | |
| 6,562,920 B2 | 5/2003 | Brant | |
| 6,642,316 B1 | 11/2003 | Datta et al. | |
| 6,689,847 B2 | 2/2004 | Mawson et al. | |
| 6,770,714 B2 | 8/2004 | Ommundsen et al. | |
| 6,881,800 B2 | 4/2005 | Friedersdorf | |
| 7,087,690 B2 | 8/2006 | Boussie et al. | |
| 7,163,989 B2 | 1/2007 | Friedersdorf | |
| 7,265,193 B2 | 9/2007 | Weng et al. | |
| 7,279,536 B2 | 10/2007 | Brant et al. | |
| 7,319,125 B2 | 1/2008 | Arjunan et al. | |
| 2001/0044506 A1 | 11/2001 | Mehta et al. | |
| 2002/0013440 A1 | 1/2002 | Argawal et al. | |
| 2002/0016415 A1 | 2/2002 | Laughner et al. | |
| 2003/0088021 A1 | 5/2003 | Van Dun et al. | |
| 2004/0024146 A1* | 2/2004 | Friedersdorf | 526/82 |
| 2004/0122191 A1 | 6/2004 | Arjunan et al. | |
| 2004/0127654 A1 | 7/2004 | Brant et al. | |
| 2004/0158010 A1 | 8/2004 | Lehmus et al. | |
| 2006/0009595 A1 | 1/2006 | Rix et al. | |
| 2006/0025545 A1 | 2/2006 | Brant et al. | |
| 2006/0183861 A1 | 8/2006 | Harrington et al. | |
| 2006/0211832 A1 | 9/2006 | Brant et al. | |
| 2006/0293474 A1 | 12/2006 | Brant et al. | |
| 2008/0090974 A1 | 4/2008 | Brant et al. | |
| 2008/0153997 A1 | 6/2008 | Casty et al. | |
| 2008/0234443 A1* | 9/2008 | Kiss et al. | 526/64 |
| 2009/0163643 A1* | 6/2009 | Kiss et al. | 524/528 |

FOREIGN PATENT DOCUMENTS

| | | |
|---|---|---|
| CA | 2103694 | 2/1994 |
| DE | 41 30 299 A1 | 3/1993 |
| EP | 0 480 190 B1 | 4/1992 |
| EP | 0 603 232 B1 | 9/1992 |
| EP | 0 667 359 | 8/1995 |
| EP | 0 718 324 | 6/1996 |
| EP | 0 806 436 | 11/1997 |
| EP | 0 846 696 A1 | 6/1998 |
| EP | 0 887 379 | 12/1998 |
| EP | 0 887 380 | 12/1998 |
| EP | 0 942 017 | 9/1999 |
| EP | 0 987 279 A1 | 3/2000 |
| EP | 0 129 368 B2 | 4/2002 |
| EP | 1 195 391 A1 | 4/2002 |
| EP | 1 231 226 | 8/2002 |
| EP | 1 008 607 B1 | 12/2003 |
| GB | 1443394 | 7/1976 |
| JP | 6-25357 | 2/1994 |
| JP | 9216916 A | 9/1997 |
| JP | 96-208535 | 2/1998 |
| JP | 10045834 | 2/1998 |
| JP | 342 1202 | 4/1998 |
| JP | 1998-110003 A | 4/1998 |
| WO | WO 88/04672 A1 | 6/1988 |
| WO | WO 92/14766 A1 | 9/1992 |
| WO | WO 93/05082 A1 | 6/1993 |
| WO | WO 93/11171 A1 | 6/1993 |
| WO | WO 94/00500 | 1/1994 |
| WO | WO 94/14856 A1 | 7/1994 |
| WO | WO 96/00246 A1 | 1/1996 |
| WO | WO 96/12744 A1 | 5/1996 |
| WO | WO 96/34023 A1 | 10/1996 |
| WO | WO 97/11098 A1 | 3/1997 |
| WO | WO 97/13790 A1 | 4/1997 |
| WO | WO 97/44391 | 11/1997 |
| WO | WO 97/45434 A1 | 12/1997 |
| WO | WO 97/48737 | 12/1997 |
| WO | WO 98/33823 A1 | 8/1998 |
| WO | WO 98/49229 | 11/1998 |
| WO | WO 99/02540 A1 | 1/1999 |
| WO | WO 99/11680 | 3/1999 |
| WO | WO 99/29749 A1 | 6/1999 |
| WO | WO 99/32226 A1 | 7/1999 |
| WO | WO 00/06621 | 2/2000 |
| WO | WO 00/12572 A1 | 3/2000 |
| WO | WO 00/37514 A1 | 6/2000 |
| WO | WO 00/40625 A1 | 7/2000 |
| WO | WO 00/50475 A1 | 8/2000 |
| WO | WO 00/64952 A2 | 11/2000 |
| WO | WO 01/44318 A1 | 6/2001 |
| WO | WO 01/46273 A1 | 6/2001 |
| WO | WO 02/34795 | 5/2002 |
| WO | WO 02/38628 A2 | 5/2002 |
| WO | WO 02/50145 A1 | 6/2002 |
| WO | WO 02/070572 A2 | 9/2002 |
| WO | WO 02/090399 A1 | 11/2002 |
| WO | WO 03/040095 A2 | 5/2003 |
| WO | WO 03/040201 A1 | 5/2003 |
| WO | WO 03/040202 | 5/2003 |
| WO | WO 03/040233 A2 | 5/2003 |
| WO | WO 03/040442 A1 | 5/2003 |
| WO | WO 2004/026921 | 4/2004 |
| WO | WO 2006/009976 A1 | 1/2006 |
| WO | WO 2006/009981 | 1/2006 |
| WO | WO 2006/044149 A1 | 4/2006 |
| WO | WO 2006/120177 A2 | 11/2006 |
| WO | WO 2007/037944 | 4/2007 |

OTHER PUBLICATIONS

U.S. Appl. No. 11/854,936, filed Sep. 13, 2007, ExxonMobil.

Lehmus, P. et al., Abstract, "Metallocene-PP produced under supercritical polymerization conditions", and list of posters, 1$^{st}$ BlueSky Conference on Catalytic Olefin Polymerization, Jun. 17-20, 2002, Sorrento, Italy.

Lofgren et al., Abstract, Borealis Publications, "Metallocene-PP produced under supercritical conditions", 1$^{st}$ BlueSky Conference on Catalytic Olefin Polymerization, Jun. 17-20, 2002, Sorrento, Italy (2002).

Zowade et al., Abstract, PL 159518, "Manufacturing Low-molecular-weight Isotactic Polypropylene", Sep. 10, 1989.

Alt, H.G. et al., "Effect of the Nature of Metallocene Complexes of Group IV Metals on Their Performance in Catalytic Ethylene and Propylene Polymerization", Chem. Rev. 100, 2000, pp. 1205-1221.

Akimoto, A. et al., "New Developments in the Production of Metallocene LLDPE by High Pressure Polymerization", Tosoh Corp., Metallocene-Based Polyolefins 2000 (conference proceedings), pp. 287-308 (John Wiley & Sons Ltd.).

Barnhart, R. W. et al., "Synthesis of Branched Polyolefins Using a Combination of Homogeneous Metallocene Mimics", J. Am. Chem. Soc. 1998, vol. 120, pp. 1082-1083.

Bergemann, C. R. et al., "Copolymerization of Ethylene and 1,5-Hexadiene under High Pressure Catalyzed by a Metallocene", J. Mol. Catal. A: Chemical 116, 1997, pp. 317-322 (Elsevier).

Bergemann, C. R. et al., "Copolymerization of Ethylene and Linear α-Olefins with a Metallocene Catalyst System under High Pressure, Part II. Comparison of Propene, 1-Butene, 1-Hexene and 1-Decene", J. Mol. Catal. A: Chemical 105, 1996, pp. 87-91 (Elsevier).

Britovsek, G. J. P. et al., "The Search for New-Generation Olefin Polymerization Catalysts: Life Beyond Metallocenes", Chemie Intl. Edn., 1999, vol. 38, pp. 428-447.

Bujadoux, G. K., "Use of Bridged and Non-Bridged Metallocene Catalysts in High Pressure/High Temperature Ethylene/α-Olefin Copolymerization", Metallocenes 95 Intl. Congr., Metallocene Polym. 1995, pp. 375-402, Schotland Bus. Rsrch. Publ.

Chen, E. Y.-X, et al., "Cocatalysts for Metal-Catalyzed Olefin Polymerization: Activators, Activation Processes, and Structure-Activity Relationships", Chem. Rev. 2000, vol. 100, pp. 1391-1434.

Coates, G. W., "Precise Control of Polyolefin Stereochemistry Using Single Site Metal Catalysis", Chem. Rev. 100, 2000, pp. 1223-1252.

Cottom, W. P., "Waxes", in Encyclo. Chem. Tech., vol. 25, pp. 614-626, Fourth edition, 1998.

Eckstein, A. et al., "Determination of Plateau Moduli and Entainglement Molecular Weights of Isotactic, Syndiotactic, and Atactic Polypropylenes Synthesized with Metallocene Catalysts", Macromolecules 31, 1998, pp. 1335-1340.

Ewen, J. A. et al., "Syndiospecific Propylene Polymerizations with Group 4 Metallocenes", J. Am. Chem. Soc., 1988, vol. 110, pp. 6255-6256.

Gotz, C. et al., "MAO-Free Metallocene Based Catalysts in High Pressure Polymerisation of Ethylene and 1-Hexene", Chem. Eng. Technol., 21, 1998, pp. 954-957 (Wiley-VCH Verlag GmbH).

Hauptman, E. et al., "Stereoblock Polypropylene: Ligand Effects on the stereospecificity of 2-Arylindene Zirconocene Catalysts", J. Am. Chem. Soc. 1995, vol. 117, pp. 11586-11587.

Ittel, S. D. et al., "Late Metal Catalysts for Ethylene Homo- and Copolymerization", Chem. Rev. 2000, vol. 100, pp. 1169-1203.

Janiak, C., "Metallocene Catalysts for Olefin Polymerization", Metallocenes, Synthesis, Reactivity and Applications, vol. 2, Wiley-VCH, 1998, pp. 547-614, A. Togni and R. L. Halterman, editors.

Luft, G., "Development of Metallocene Catalysts and Their Application in the High Pressure Polymerisation Process" (Darmstadt University of Technology), PE 99, World Congress Global Technology Update Forum, Mar. 15, 16, 1999, Zurich, Switzerland.

Resconi, L. et al., "Selectivity in Propene Polymerization with Metallocene Catalysts", Chem. Rev. 2000, vol. 100, pp. 1253-1345.

Schaverien, C. J. et al., "Ethylene Bis(2-indenyl) Zirconocenes: A New Class of Diastereomeric Metallocenes for the (Co)Polymerization of α-Olefins", Organometallics 2001, vol. 20, No. 16, pp. 3436-3452 (ACI, Columbus, Ohio), Aug. 2001.

Scollard, J. D. et al., "Polymerization of α-Olefins by Chelating Diamide Complexes of Titanium", Macromolecules, 1996, vol. 29, p. 5241-5243.

Smith, B. D. et al., "Thermodynamic Data for Pure Compounds Part A, Hydrocarbons and Ketones Physical Sciences Data", vol. 25, Elsevier, New York, 1986, pp. 308-309.

Stephenson et al., "Handbook of the Thermodynamics of Organic Compounds", Elsevier Science Publ. NY, p. 75, 1987.

Stratton, A. W., "Waxes", in Encyclo. Polymer Science and Eng., vol. 17, pp. 784-795, Second Edition, 1985.

Suzuki, N. et al., "Olefin Polymerization Using Highly Congested Ansa-Metallocenes Under High Pressure: Formation of Superhigh Molecular Weight Polyolefins", Macromolecules, 2000, vol. 33, No. 3, pp. 754-759.

Yano., A. et al., "Homo- and Copolymerization of Ethylene at High Temperature with Cationic Zirconocene Catalysts", Macromol. Chem. Phys. 200, No. 4, pp. 917-923 (Wiley-VCH Verlag GmbH).

Yano, A. et al., Homo- and Copolymerization of Ethylene by Cationic Hafnocene Catalysts based on Tetrakis(pentafluorophenyl), Macromol. Chem. Phys. 200, No. 4, 1999, pp. 924-932 (Wiley-VCH Verlag Gmb).

Yano, A. et al., "Novel Zirconocene Catalysts for the Production of High Molecular Weight LLDPE in High Temperature Polymerization", Macromol. Chem. Phys. 200, No. 4, 1999, pp. 933-941 (Wiley-VCH Verlag GmbH).

Hackmann et al., "Functional Olefin Copolymers: Uniform Architectures of Propene/7-Methyl-1,6-Octadiene Copolymers by ATR-FTIR Spectroscopy Control of Monomer Composition", Macromolecules, American Chemical Society, Easton, US, vol. 33, No. 5, Mar. 7, 2000, pp. 1524-1529 (Germany).

Hackmann, M. et al., "Zirconocene-MAO Catalyzed Homo- and Copolymerizations of Linear Assymetrically Substituted Dienes with Propene: A Novel Strategy of Functional (co)poly(α-olefin)s", Macromol. Chem. Phys., pp. 1511-1517, 1998 (Germany).

Lee et al., "Copolymerizations of Olefins and Dienes with Homogeneous and Heterogeneous Catalysts", Eur. Polym. J., vol. 33(4), pp. 447-451, 1997 (Great Britain).

Dassaud, J. P. et al., "Copolymerization of Propene-Nonconjugated Dienes: Derivatization Through Hydroboration and Epoxydation", Polym. Adv. Technol., 4(7), pp. 457-464, 1993 (France).

Resconi, L. et al., "Effect of Monomer Concentration on Propene Polymerization with the rac-[Ethylenebis(1-indenyl)]zirconium Dichloride/Methylaluminoxane Catalyst", Macromol. 1995, 28, pp. 6667-6676.

Spalek, W. et al., "The Influence of Aromatic Substituents on the Polymerization Behavior of Bridged Zirconocene Catalysts", Organometallics 1994, 13, pp. 954-963.

Resconi, L. et al., "Highly Regiospecific Zirconocene Catalysts for the Isospecific Polymerization of Propene", J. Amer. Chem. Soc. 1998, 120, pp. 2308-2321.

Resconi, L. et al., "rac-[Methylene(3-tert-butyl-1-indenyl)$_2$]ZrCl$_2$: A Simple, High-Performance Zirconocene Catalyst for Isotactic Polypropene", Organometallics 2000, 19, pp. 420-429.

Kirby, C. F. et al., "Phase Behavior of Polymers in Supercritical Fluid Solvents", Chem. Rev. 1999, 99, pp. 565-602.

Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, vol. 204, pp. 1323-1337.

* cited by examiner

Production of polymer blends in two-stage series reactor configuration
(Prior Art)

The effect of polymerization temperature on the molecular weight and melting point of polypropylene made in supercritical polypropylene using MAO-activated (μ-dimethylsilyl)bis(2-methyl-4-phenylindenyl)zirconium dichloride (Q-Zr-MAO) at 30 kpsi The effect of polymerization pressure on the molecular weight and melting point of polypropylene made in supercritical propylene using MAO-activated (μ-dimethylsilyl)bis(2-methyl-4-phenylindenyl)zirconium dichloride (Q-Zr-MAO) at 120 and 130 °C The effect of propylene conversion in the polymerization of supercritical propylene with MAO-activated (μ-dimethylsilyl)bis(2-methyl-4-phenylindenyl)zirconium dichloride (Q-Zr-MAO) at 130 °C and 10 or 20 kpsi pressure Prior art monomer recycle process with full recovery of individual monomer components (monomer recycles (1) and (2)) used in conjunction with a fluid phase in-line polymer blending process Exemplary monomer recycle process for fluid phase in-line blending of polymers with one separator vessel (separator-blender), the combined monomer recycle stream of reactor trains (1) and (2) recycled to train (2) without recovering individual monomer components Exemplary monomer recycle process for fluid phase in-line blending of polymers with one separator vessel (separator-blender) and with additive/polymer blending component option, the combined monomer recycle stream of reactor trains (1) and (2) recycled to train (2) without recovering individual monomer components Monomer Recycle Process For Fluid Phase In-Line Blending Of Polymers With Two Separation Vesssels Monomer Recycle Process For Fluid-Phase In-Line Polymer Blending With Two Separation Vessels With A Product Effluent Buffer Tank That Also Serves As Monomer/Product Separator For Improved Blend Ratio Control Exemplary monomer recycle process for fluid phase in-line blending of polymers with two separation vessels and with additive/polymer blending component option Exemplary monomer recycle process for fluid phase in-line blending of polymers with two separation vessels, one also serving as buffer, and with additive/polymer blending component option Cloud point isotherms for Polymer Achieve™ 1635

Fig. 2 Cloud point isotherms, Polymer Achieve 1635

Cloud point isotherms for Polymer PP 45379 dissolved in bulk propylene

Fig. 3 Cloud point isotherms, Polymer PP 45379

Cloud point isotherms for Polymer PP 4062 dissolved in bulk propylene

Fig. 4 Cloud point isotherms, Polymer PP 4062

Cloud point isotherms for Polymer Achieve™ 1635 dissolved in bulk propylene

Fig. 5 Cloud point isopleths, Polymer Achieve 1635

Cloud point isopleths for Polymer PP 45379 dissolved in bulk propylene

Fig. 6 Cloud point isopleths, Polymer PP 45379

Cloud point isopleths for Polymer PP 4062 dissolved in bulk propylene

Fig. 7 Cloud point isopleths, Polymer PP 4062

Comparison of isopleths for PP 45379, Achieve™ 1635 and PP 4062 dissolved in bulk propylene Comparison of isopleths for Achieve™ 1635 and literature data Basic phase diagram for mixture of propylene monomer with polymer Comparison of the density of supercritical propylene with liquid propylene Operating regime with process disclosed for a reactor operating in a single fluid phase Operating regime with process disclosed for a reactor operating in a fluid-fluid phase Operating regime with process disclosed herein for a gravity separator

US 8,080,610 B2

MONOMER RECYCLE PROCESS FOR FLUID PHASE IN-LINE BLENDING OF POLYMERS

CROSS-REFERENCE TO RELATED APPLICATIONS

This application that claims priority to U.S. Provisional Application No. 60/905,247 filed on Mar. 6, 2007, herein incorporated by reference in its entirety.

FIELD

The present disclosure relates to the field of polymer blending. It more particularly relates to a monomer recycle process for in-line blending of polyolefin-based polymers in the fluid phase. Still more particularly, the present disclosure relates to a simplified monomer recycle process for polymerization plants making in-line polymer blends of homopolymers and copolymers in the fluid phase.

BACKGROUND

Polymer blends may be made by a variety of methods. A flexible but expensive off-line process of making polymer blends uses solid polymers as starting materials, typically outside the polymerization process that produced the polymer blend components. The polymer blend components are typically first melted or dissolved in a solvent and then blended. These processes are known as melt-blending and off-line solution blending, respectively. In melt blending, the solid, often pelletized or baled, polymer blend components are first melted and then blended together in their molten state. One of the difficulties presented by melt blending is the high viscosity of molten polymers, which makes blending of two or more polymers difficult and often imperfect on the molecular level. In solution off-line blending, the solid, often pelletized, polymer blend components are first dissolved in a suitable solvent to form a polymer solution, and then two or more polymer solutions are blended together. After blending, solution blending requires the extraction of solvent from the blend and drying of the blended polymer. Solution blending can overcome the viscosity issue associated with melt blending, but is expensive due to the need for redissolving the polymer blend components and due to the cost of solvent handling.

The common feature of both melt blending and off-line solution blending is that the polymer blending components are made in separate plants and the solid polymers then are reprocessed either in a molten or in a dissolved state to prepare the final polymer blend. In fact, these off-line blending processes are often operated by so-called compounders, generally independent of the manufacturers of the polymer blend components. These processes add considerable cost to the cost of the final polymer blend. The production and full polymer recovery in separate plants and subsequent reprocessing increases the costs of producing such blends because of the need for duplicate polymer recovery lines and because of the need for separate blending facilities and the energy associated with their operations. Off-line solution blending also requires extra solvent, and facilities for polymer dissolution and solvent recovery-recycle. Substantial reprocessing costs could be saved if the polymer blends could be made in one integrated polymerization plant in-line, i.e. before the recovery and pelletizing of the solid polymer blend components.

The disadvantage of a separate polyolefin blending plant associated with the melt blending and off-line solution blending processes is alleviated with the prior art method of in-line solution blending of polymers using a series reactor configuration. Utilizing the series reactor configuration, product blending may be accomplished in the solution polymerization reactor itself when the effluent of the first solution polymerization reactor is fed into the second reactor operating at different conditions with optionally different catalyst and monomer feed composition. Referring to the two-stage series reactor configuration of FIG. 1 (prior art), the two different polymers made in the first and second reactor stages are blended in the second stage yielding a blended polymer product leaving the second reactor. Such reactor series configuration may be further expanded into more than a two-stage series configuration (three or more reactors in series). Generally, a series of n reactors may produce a blend with as many as n components or even more present in the effluent of the last reactor. Note that in principle, more than n components may be produced and blended in n reactors by, for example, using more than one catalyst or by utilizing multiple zones operating at different conditions in one or more reactors of the series reactor cascade. While mixing in the downstream reactor(s) provides good product mixing, particularly when the reactors are equipped with mixing devices, e.g., mechanical stirrers, such series reactor configuration and operation presents a number of practical process and product quality control problems due to the close coupling of the reactors in the cascade. One of the most important difficulties in commercial practice is ensuring proper blend and monomer ratios to deliver consistent blend quality. Additional complications arise when the blend components have different monomer compositions, particularly when they have different monomer pools, such as in the case of blending different copolymers or in the case of blending homo- and copolymers. Since the monomer streams are blended, there is no option for their separate recovery and recycle mandating costly monomer separations in the monomer recycle lines.

The above-outlined issues with series reactor operations are apparent to those skilled in the art of chemical engineering. These difficulties are particularly significant in polymerization because unlike in small-molecule syntheses, reactor conditions determine not only reactor productivities related to product blend ratio, but also product properties related to controlling the quality of the polymer blend components. For example, FIGS. 2 and 3 show how reactor temperature and pressure affect polymer properties of fundamental importance, such as molecular weight (MW) and melting behavior. Surprisingly, we found that monomer conversion in the reactor also influences these critical product attributes (see FIG. 4). Since in a series reactor cascade the effluent of an upstream reactor flows into the next downstream member of the reactor cascade, the residence time, catalyst concentration, and monomer composition and thus monomer conversion in the downstream reactor cannot be adjusted independently of the operating conditions (particularly of the flow rate) of the upstream reactor. Because of this close and inherent coupling of operating regimes in the reactors of the series cascade, the correlations depicted in FIGS. 2, 3, and 4 further reduce the controllability, flexibility, and thus the usefulness of the in-line blending method in a series reactor configuration. Ultimately, this greatly reduces the number of blend products that can be made in such a series reactor cascade and makes the blend quality difficult to control.

Applying parallel reactors can overcome the disadvantages related to the direct coupling of the polymerization reactors in an in-line polymer blending applying series reactors. While production flexibility is increased, a parallel reactor arrangement necessitates the installation of blending vessels increasing the cost of the process. As disclosed in U.S. Patent Application No. 60/876,193 filed on Dec. 20, 2006, herein incorporated by reference in its entirety, an improved in-line process for blending polymers has been developed to improve blend quality and reduce the capital and operating costs associated with a combined polymerization and blend plant.

One problem associated with the fluid phase in-line blending process utilizing two or more parallel reactor trains and the two or more high-pressure separators fluidly connected to the two or more reactor trains configured in parallel is that the polymerization processes do not convert 100% of the feed monomers in a single pass through the parallel reactor trains. Because the monomers are of high value, the unconverted monomer streams are typically recovered by separating them from the polymeric products and recycled back to the polymerization reactor bank. However, when the monomer-rich phase from a high-pressure separator contains two or more different monomers, separation and recycle become more challenging and complex. In particular, when the monomer-rich phase from a high pressure separator contains a mixture of a monomer stream from a homopolymerization parallel reactor train and a comonomer stream from a copolymerization parallel reactor trains, recycle of the monomer and comonomer streams becomes particularly challenging due to the fact that the monomer composition of the recycle stream is often too far from the desired reactor feed composition. This imbalance can be best quantified by the excess monomer component flow present in the recycle monomer stream. In order to allow the rebalancing of the monomer feed composition, the monomers present in the combined recycle stream are typically split into individual pure monomer feeds. These individual monomer recycle streams then are combined with the make up monomer streams at a controlled rate to provide for the reactor feeds at the required monomer feed rate and composition. Such monomer separation trains, however, are capital intensive and expensive to operate. They are particularly expensive for light olefinic monomer recycle streams comprising aliphatic olefins of two to four carbon atoms due to their low boiling points and thus due to the need for cryogenic distillation. Hence, there is a need for new inventive processes that minimize or even eliminate such expensive monomer separations in the monomer recycle train of in-line blending processes.

There are a variety of possible options for recovering and recycling the monomers. One option, outside the scope of the present disclosure, recovers the monomers in separate trains that do not contact each other and combine the monomer and comonomer streams before, during, or after the monomer separation from the polymers. The monomer and comonomer streams are kept separate and may be recycled to their corresponding polymerization reactor trains without concerns about contaminating the feed of the homopolymerization train by the comonomer of the copolymerization train. While this option eliminates the need for and the cost associated with separation and recovery of the individual monomers, it requires parallel feed-product separation trains for each reactor train. It also handles and blends the undiluted, highly viscous polymer blend components in their molten state, as opposed to their diluted fluid state. Both of these requirements increase cost and decrease blend quality.

FIG. 5 depicts the process flow diagram of another prior art monomer recycle process used in conjunction with fluid phase in-line blending of polymers. Referring to FIG. 5, the reactor effluents (1) and (2) from the two parallel reactor trains (1) and (2) are blended in the single separator-blender that also separates a monomer-rich phase from a polymer-rich phase. The monomer-rich phase emerging from the top of the separator-blender comprises a mixture of the monomers of reactor train (1) and the monomers from reactor train (2). This combined monomer stream is then separated into its individual monomer components before those components are recycled to the proper reactor trains of the in-line polymer blending process. This prior art monomer separation and recycle method provides ultimate flexibility in the recycle train since each monomer component is recovered individually and can be directed at the desired rate to the appropriate reactor train(s). However, it also applies a complex and expensive monomer separation train. A recycle process that can operate without the full recovery of each individual monomer components would be cost advantaged, simpler to operate and maintain, and thus desirable.

Besides separating the monomer components present in the monomer recycle stream emerging from the separator-blender, heavier impurities, such as solvents used in the catalyst feed, oligomeric side products, excess catalyst killer(s), etc. need to be separated and purged from the monomer recycle stream in order to prevent their buildup in the reactor trains. Again, referring to FIG. 5, separation tower (1) separates the combined monomer-comonomer stream from solvents, oligomers and other heavies, which emerge from the bottom of tower (1). Separation tower (2) further separates the monomer-containing stream emerging from the top of tower (1). Monomer (1) emerges from the bottom and monomer (2) emerges from the top of tower (2). The monomer (1) bottom stream from separation tower (2) is recycled back to polymerization parallel reactor train (1) and the monomer (2) top stream from separation tower (2) is recycled back to polymerization parallel reactor train (2). It should be understood that in the case of monomer recycle streams comprising more than two monomers, more than two separation towers may be necessary to recover the individual monomer components. These chilled separation towers and associated hardware are expensive to install from a capital equipment standpoint and expensive to operate from utility standpoint. The separation towers also increase maintenance costs associated with the polymerization-blending plant. In addition, the separation process step also increases the overall in-line blending process complexity and thus the probability of process upsets. Therefore, there is a need for an improved method that can reduce the complexity and cost of monomer recycle related to the in-line polymer blending process.

SUMMARY

Provided is a monomer recycling process for use with the fluid phase in-line blending of polymers.

One aspect of the present disclosure relates to an advantageous monomer recycle process for use with fluid phase in-line blending of polymers comprising: (a) providing two or more reactor trains configured in parallel and two or more high-pressure separators downstream fluidly connected to the two or more reactor trains configured in parallel; (b) contacting in the two or more reactor trains configured in parallel 1) olefin monomers having two or more carbon atoms, 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, and wherein the catalyst system for each reactor train comprises one or more catalyst precursors, one or more activators, and optionally, one or more catalyst supports; (c) forming an unreduced reactor effluent including a homogenous fluid phase polymer-monomer mixture in each parallel reactor train, wherein one or more of the parallel reactor trains define a first group (G1) of reactor trains and another one or more of the parallel reactor trains define a second group (G2) of reactor trains, wherein the number of monomers (N) in the feed monomer pools for G1 (N(G1)), G2 (N(G2)), and for the combined feed monomer pool of G1 and G2 (N(G1+G2)) are related as follows: N(G1+G2)=N(G2) and N(G1)≦N(G2), and wherein the feed monomer pool in each reactor train of G2 are the same; (d) passing the unreduced reactor effluents from one or more of the G1 reactor trains through one or more high-pressure separators, maintaining the temperature and pressure within the one or more high-pressure separators above the solid-fluid phase transition point but below the cloud point pressure and temperature to form fluid-fluid two-phase systems in each of the one or more high-pressure separators with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases; (e) passing the one or more polymer-enriched phases from the one or more high-pressure separators of (d), any unreduced reactor effluents of G1 not passing through the one or more high-pressure separators of G1, and the unreduced reactor effluents of the G2 reactor trains through another high-pressure separator for product blending and product-feed separation; (f) maintaining the temperature and pressure within the another high-pressure separator of (e) above the solid-fluid phase transition point but below the cloud point pressure and temperature to form a fluid-fluid two-phase system comprising a polymer-rich blend phase and a monomer-rich phase; (g) separating the monomer-rich phase from the polymer-rich blend phase in the another high-pressure separator of (e) to form a polymer-rich blend and a separated monomer-rich phase; (h) recycling the one or more separated monomer-rich phases of (d) to one or more reactor trains of G1; and (i) recycling the separated monomer-rich phase of (g) to one or more reactor trains of G2.

Another aspect of the present disclosure relates to an advantageous monomer recycle process for use with fluid phase in-line blending of polymers comprising: (a) providing two or more reactor trains configured in parallel and a high-pressure separator downstream fluidly connected to the two or more reactor trains configured in parallel; (b) contacting in the two or more reactor trains configured in parallel 1) olefin monomers having two or more carbon atoms, 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, and wherein the catalyst system for each reactor train comprises one or more catalyst precursors, one or more activators, and optionally, one or more catalyst supports; (c) forming a reactor effluent including a homogeneous fluid phase polymer-monomer mixture in each parallel reactor train, wherein one or more of the parallel reactor trains define a first group (G1) of reactor trains and another one or more of the parallel reactor trains define a second group (G2) of reactor trains, wherein the number of monomers (N) in the feed monomer pools for G1 (N(G1)), G2 (N(G2)), and for the combined feed monomer pool of G1 and G2 (N(G1+G2)) are related as follows: N(G1+G2)=N(G2) and N(G1)≦N(G2), and wherein the monomer pool in each reactor train of G2 are the same; (d) passing the reactor effluent comprising the homogeneous fluid phase polymer-monomer mixture from each reactor train of G1 and G2 through the high-pressure separator for product blending and product-feed separation; (e) maintaining the temperature and pressure within the high-pressure separator above the solid-fluid phase transition point but below the cloud point pressure and temperature to form a fluid-fluid two-phase system comprising a polymer-rich blend phase and a monomer-rich phase; (f) separating the monomer-rich phase from the polymer-rich blend phase in the high-pressure separator to form a polymer-rich blend and a separated monomer-rich phase; and (g) recycling the separated monomer-rich phase of (f) to one or more reactor trains of G2.

Still another aspect of the present disclosure relates to an advantageous monomer recycle process for use with fluid phase in-line blending of polymers comprising: (a) providing a first group (G1) of one or more parallel reactor trains and a second group (G2) of one or more parallel reactor trains, wherein G1 polymerizes a polypropylene homopolymer and G2 polymerizes a polypropylene copolymer, and wherein one high-pressure separator is fluidly connected to G1 and another high-pressure separator is fluidly connected to G2; (b) contacting in each of the parallel reactor trains of G1 and G2: 1) propylene monomer, 2) one or more catalyst systems, 3) one or more comonomers in each of the parallel reactor trains of G2, 4) optional one or more scavengers, and 5) optional one or more diluents or solvents, wherein each of the parallel reactor trains for G1 and G2 are at a temperature above the solid-fluid phase-transition temperature of the polymerization system and a pressure no lower than 10 MPa below the cloud point pressure of the polymerization system and less than 1500 MPa and have at least one common monomer, wherein the polymerization system for each parallel reactor train of G1 and G2 is in its dense fluid state and comprises propylene monomer, any diluent or solvent present, any scavenger present, and the polymer product, and the polymerization system for the second reactor train further comprises one or more comonomers, and wherein the catalyst system for each parallel reactor train of G1 and G2 comprises one or more catalyst precursors, one or more activators, and optionally, one or more catalyst supports; (c) forming an unreduced reactor effluent including a homogenous fluid phase polymer-monomer mixture in each parallel reactor train of G1 and G2; (d) passing the unreduced reactor effluents from the one or more of the G1 parallel reactor trains through a high-pressure separator while maintaining the temperature and pressure within the high-pressure separator above the solid-fluid phase transition point but below the cloud point pressure and temperature to form a fluid-fluid two-phase systems comprising a polymer-enriched phase and a monomer-rich phase, and separating the monomer-rich phase from the polymer-enriched phase in the high-pressure separator to form a separated monomer-rich phase and a polymer-enriched phase; (e) passing the polymer-enriched phase from the high-pressure separator of (d) and the unreduced reactor effluents of the G2 reactor trains through another high-pressure separator for product blending and product-feed separation; (f) maintaining the temperature and pressure within the another high-pressure separator of (e) above the solid-fluid phase transition point but below the cloud point pressure and temperature to form a fluid-fluid two-phase system comprising a polymer-rich blend phase and a monomer-rich phase; (g) separating the monomer-rich phase from the polymer-rich blend phase in the another high-pressure separator of (e) to form a polymer-rich blend and a separated monomer-rich phase; (h) recycling the separated monomer-rich phase of (d) to the one or more reactor trains of G1; and (i) recycling the separated monomer-rich phase of (g) to one or more reactor trains of G2.

Still yet another aspect of the present disclosure relates to an advantageous monomer recycle process for use with fluid phase in-line blending of polymers comprising: (a) providing a first group (G1) of one or more reactor trains and a second group (G2) of one or more reactor trains, wherein G1 polymerizes a polypropylene homopolymer and G2 polymerizes a polypropylene copolymer, wherein a high-pressure separator is fluidly connected to G1 and G2, and wherein the G1 reactor trains are configured parallel to and fluidly connected to the G2 reactor trains; (b) contacting in each of the reactor trains of G1 and G2: 1) propylene monomer, 2) one or more catalyst systems, 3) one or more comonomers in each of the reactor trains of G2, 4) optional one or more scavengers, and 5) optional one or more diluents or solvents, wherein each of the reactor trains for G1 and G2 are at a temperature above the solid-fluid phase-transition temperature of the polymerization system and a pressure no lower than 10 MPa below the cloud point pressure of the polymerization system and less than 1500 MPa and have at least one common monomer, wherein the polymerization system for each reactor train of G1 and G2 is in its dense fluid state and comprises propylene monomer, any diluent or solvent present, any scavenger present, and the polymer product, and the polymerization system for the second reactor train further comprises one or more comonomers, and wherein the catalyst system for each reactor train of G1 and G2 comprises one or more catalyst precursors, one or more activators, and optionally, one or more catalyst supports; (c) forming a reactor effluent including a homogeneous fluid phase polymer-monomer mixture in each reactor train of G1 and G2; (d) passing the reactor effluents from each reactor train of G1 and G2 through the high-pressure separator for product blending and product-feed separation; (e) maintaining the temperature and pressure within the high-pressure separator above the solid-fluid phase transition point but below the cloud point pressure and temperature to form a fluid-fluid two-phase system comprising a polymer-rich blend phase and a monomer-rich phase; (f) separating the monomer-rich phase from the polymer-rich blend phase in the high-pressure separator to form a polymer-rich blend and a separated monomer-rich phase; and (g) recycling the separated monomer-rich phase of (f) to the one or more reactor trains of G2.

These and other features and attributes of the disclosed monomer recycle processes for fluid phase in-line blending of polymers and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

Figure 1:
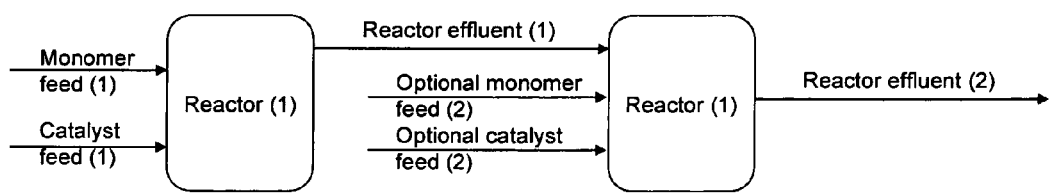
FIG. 1 presents the process for the production of polymer blends in a two-stage series reactor configuration (prior art)

For the purposes of this invention and the claims thereto:

A catalyst system is defined to be the combination of one or more catalyst precursor compounds and one or more activators. Although themselves are not catalytically active (need to be combined with an activator to become active), the catalyst precursor compounds are often referred to as catalysts in the art of polymerization. Any part of the catalyst system can be optionally supported on solid particles, in which case the support is also part of the catalyst system.

Dense fluids are defined as fluid media in their liquid or supercritical state with densities greater than 300 kg/m$^3$. Note that gas-phase fluids are excluded from the group of dense fluids.

Solid-fluid phase transition temperature is defined as the temperature at which a solid polymer phase separates from the polymer-containing dense fluid medium at a given pressure. The solid-fluid phase transition temperature can be determined by temperature reduction starting from temperatures at which the polymer is fully dissolved in the dense fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

Solid-fluid phase transition pressure is defined as the pressure at which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium. At the onset of the formation of a solid polymer phase, the homogeneous fluid medium becomes turbid, which can be observed by eye or can be detected by shining a laser through the medium and detecting the sudden increase of light scattering as described in J. Vladimir Oliveira, C. Dariva and J. C. Pinto, Ind. Eng, Chem. Res. 29 (2000) 4627.

The cloud point is defined as the pressure below which, at a given temperature, the polymer-containing homogeneous fluid medium becomes turbid upon pressure reduction at constant temperature as described in J. Vladimir Oliveira, C. Dariva and J. C. Pinto, Ind. Eng, Chem. Res. 29 (2000) 4627. For purposes of this invention and the claims thereto, the cloud point is measured by shining a helium laser through the selected polymerization system in a cloud point cell onto a photocell and recording the pressure at the onset of rapid increase in light scattering for a given temperature.

A higher α-olefin is defined as an α-olefin having four or more carbon atoms.

Polymerization encompasses any polymerization reaction such as homopolymerization and copolymerization.

Copolymerization encompasses any polymerization reaction of two or more monomers.

The new numbering scheme for the Periodic Table Groups is used as published in CHEMICAL AND ENGINEERING NEWS, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade (also referred to as series reactor configuration or reactors in series) includes two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams.

Reactor train or reactor branch or reactor leg refers to a single polymerization reactor or to a group of polymerization reactors of the in-line blending process disclosed herein that produces a single polymer blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the in-line blending processes disclosed herein, the polymeric product of a reactor train is referred to simply as blend component or polymeric blend component regardless of its molecular weight and/or compositional dispersion. For the purpose of defining the process of the present invention, parallel reactors will be always considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process is disclosed herein. A reactor bank may comprise one or more reactor trains.

A parallel reactor configuration includes two or more reactors or reactor trains connected (also referred to as fluidly connected) in parallel. A reactor train, branch, or leg may include one reactor or alternatively more than one reactor configured in a series configuration. For example, a reactor train may include two, or three, or four, or more reactors in series. The entire parallel reactor configuration of the polymerization process disclosed herein, i.e., the combination of all parallel polymerization reactor trains forms the reactor bank.

Monomer recycle ratio refers to the ratio of the amount of recycled monomer fed to the reactor divided by the total (fresh plus recycled) amount of monomer fed to the reactor.

Polymerization system is defined to be the monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid region in its phase diagram.

Pure substances, including all types of hydrocarbons, can exist in either a subcritical, or supercritical state, depending on their temperature and pressure. To be in the supercritical state, a substance must have a temperature above its critical temperature (Tc) and a pressure above its critical pressure (Pc). Mixtures of hydrocarbons, including mixtures of monomers, polymers, and optionally inert solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this invention, the critical temperatures (Tc) and critical pressures (Pc) of certain pure substances relevant to the current invention are those that found in the Handbook of Chemistry and Physics, David R. Lide, Editor-in-Chief, 82nd edition 2001-2002, CRC Press, LLC. New York, 2001. In particular, the Tc and Pc of selected substances are:

| Name | Tc (K) | Pc (MPa) |
|---|---|---|
| Hexane | 507.6 | 3.025 |
| Isobutane | 407.8 | 3.64 |
| Ethane | 305.3 | 4.872 |
| Cyclobutane | 460.0 | 4.98 |
| Cyclopentane | 511.7 | 4.51 |

-continued

| Name | Tc (K) | Pc (MPa) |
|---|---|---|
| 1-Butene | 419.5 | 4.02 |
| 1-pentene | 464.8 | 3.56 |
| Pentane | 469.7 | 3.37 |
| Benzene | 562.05 | 4.895 |
| 1-hexene | 504.0 | 3.21 |
| Propane | 369.8 | 4.248 |
| Toluene | 591.8 | 4.11 |
| Methane | 190.56 | 4.599 |
| Butane | 425.12 | 3.796 |
| Ethylene | 282.34 | 5.041 |
| Propylene | 364.9 | 4.6 |
| Cyclopentene | 506.5 | 4.8 |
| Isopentane | 460.4 | 3.38 |
| Cyclohexane | 553.8 | 4.08 |
| Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates (or is intended to operate) without interruption or cessation. For example, a continuous process to produce a polymer would be one where the reactants are continually introduced into one or more reactors and polymer product is continually withdrawn.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In a liquid/vapor polymerization medium, the polymer resides in the liquid (dense) phase. Slurry polymerization processes typically employ heterogeneous catalyst particles, such as Ziegler-Natta catalysts or supported metallocene catalysts, and the like. The solid polymeric product typically adheres to the heterogeneous solid catalyst particles thus forming a slurry phase. Slurry polymerization processes operate below the solid-fluid phase transition temperature of the polymerization system.

Solution polymerization refers to a polymerization process in which the polymer is dissolved in a liquid polymerization system, such as an inert solvent or monomer(s) or their blends. Solution polymerization comprises a homogeneous liquid polymerization system in the reactor. The temperature of a liquid polymerization system is below of its supercritical or pseudo supercritical temperature, thus solution polymerizations are performed below the supercritical temperature and/or pressure.

Supercritical polymerization refers to a polymerization process in which the polymerization system is in its dense supercritical or pseudo supercritical state, i.e. when the density of the polymerization system is above 300 g/L and its temperature and pressure are above the corresponding critical values.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent. Inert solvents are characterized by their lack of incorporation into the product polymer chain. In the production of polyolefins, solvents are typically hydrocarbons comprising 4 to 20 carbon atoms, advantageously 5 to 10, or 5 to 8 carbon atoms. Note that the polymerization system may also contain inert diluents that do not incorporate into the product polymer chain. They are typically introduced as impurities present in the monomer feeds. For the purpose of the current disclosure, the inert diluents are considered separately from the inert solvents, the latter of which are added intentionally for their ability to keep the polymeric products in their dissolved state.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system as it is the case when, for example, solid polymer-containing particles are suspended in a dense fluid. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid (liquid or supercritical fluid) region in its phase diagram.

Homogeneous supercritical polymerization refers to a polymerization process in which the polymer is dissolved in a dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

An in-line blending process disclosed herein refers to one where the polymerization and the polymer blending processes are integrated in a single process and at least one of the polymerization trains operates under solution or homogeneous supercritical conditions. Although in-line blending processes typically employ polymerization trains using solution or homogeneous supercritical polymerization systems, one or more of the polymerization trains may employ slurry polymerization systems, particularly bulk slurry polymerization systems. When the polymerization bank includes one or more slurry polymerization trains, the effluents of those slurry trains are always heated above their solid-fluid transition points and optionally pressurized before mixing them with the effluents of other trains to enable fluid-phase mixing.

In-line polymer blend or in-line blend disclosed herein refers to a mixture of two or more polymeric components, at least one of which is produced under either homogeneous supercritical polymerization conditions or homogeneous solution polymerization conditions. The polymeric components are produced internally in the in-line blending process and are mixed in the same process without recovering them in their solid state. Optionally, the in-line blends may also contain additives produced outside the invention process, such as plasticizers, UV stabilizers, antioxidants, etc., and off-line polymeric additives/modifiers in minor amounts, i.e., less than 50%, or less than 40%, or less than 30%, or less than 20%, or less than 10%, or less than 5%, or less than 1% by weight.

Single-pass conversion of monomer i in reactor train j is defined by the following formula:

Single pass conversion of monomer $i$ in reactor train $j$(%)=100×[(reactor train $j$ effluent flow rate in weight per hour)×(polymer product concentration in the effluent of reactor train $j$ in weight fraction)×(monomer $i$ concentration in the polymer product made in reactor train $j$ in weight fraction)]/[(reactor train $j$ feed flow rate, including fresh and recycled, in weight per hour)×(monomer $i$ concentration in the feed of reactor train $j$, including fresh and recycled, in weight fraction)].

Overall conversion of monomer i in reactor train j is defined by the following formula:

Overall conversion of monomer $i$ in reactor train $j$(%)=100×[(reactor train $j$ effluent flow rate in weight per hour)×(polymer product concentration in the effluent of reactor train $j$ in weight fraction)×(monomer $i$ concentration in the polymer product made in reactor train $j$ in weight fraction)]/[(reactor train $j$ fresh feed flow rate, excluding recycled, in weight per hour)×(monomer $i$ concentration in the fresh feed of reactor train $j$, excluding recycled, in weight fraction)].

The total monomer feed rate of a given train is equal to the sum of fresh (make up) monomer feed rate plus recycled monomer feed rate in weight per hour.

The flow (feed, effluent, recycle, purge etc. flow) rate of monomer component i in weight per hour is equal to the total flow (feed, effluent, recycle, purge etc. flow) rate in weight per hour multiplied by the weight fraction of monomer component i.

Conversion rate of monomer i in reactor train j expressed in weight per hour is equal to [(reactor train j effluent flow rate in weight per hour)×(polymer product concentration in the effluent of reactor train j in weight fraction)×(monomer i concentration in the polymer product made in reactor train j in a single pass in weight fraction)].

Monomer pool describes the number and nature of the monomers present not less than 1.0 wt %, or not less than 0.5 wt %, or not less than 0.1 wt %, or not less than 0.05 wt %, or not less than 0.01 wt %, or not less than 0.001 wt % in the process or in certain feeds or effluents or recycle streams or vessels or products of the process. In general, one can refer to the monomer pool of reactor r, or the monomer pool of reactor train j, or the monomer pool in the feed or in the effluent of reactor r or of reactor train j, or the monomer pool of the entire process, or the monomer pool of the product of a reactor train or of a reactor group, or of the process, etc. While the monomer pool pertains to the number and nature of the monomers it represents, it does not speak to the quantity or concentration of the monomers of the polymer pool (except for setting a minimum/threshold level below which a monomer is not considered to be a part of the monomer pool). Two or more monomer pools containing the same and only the same monomers are considered to be identical or the same even if the (higher than the minimum/threshold) concentration or the ratio of the monomers in the pools are not the same. Naturally, a monomer is not present in a pool when its concentration is below a defined threshold and thus only considered to be present in a monomer pool or considered to be part of a monomer pool when its concentration is higher than the defined threshold. Two examples of monomer pools are as follows. (1) The monomer pool of a stream containing ethylene, propylene, and 1,5-hexadiene has three members: ethylene, propylene, and 1,5-hexadiene. (2) The combined monomer pools of reactor train 1 containing ethylene and propylene, reactor train 2 containing propylene and butene-1, and reactor train 3 containing propylene has also three members: ethylene, propylene, and butene-1. Note that the monomer pool of train 1 has two members: ethylene and propylene, the monomer pool of train 2 has also two members: propylene and butene-1, and the monomer pool of train 3 has one member: propylene. Also, note that in this example, propylene is present in all individual monomer pools (the pools of train 1, 2, and 3), therefore propylene is called a common member of all three monomer pools.

Unreduced reactor effluent refers to the whole effluent stream emerging from a reactor train, leg, or branch that has yet to undergo phase separation in one or more high pressure separators., i.e., it contains the entire unreduced polymerization system as it emerges from the reactor train, leg, or branch. As opposed to unreduced reactor effluents, reduced reactor effluents are the polymer-containing streams derived from the unreduced reactor effluents. Reduced reactor effluents contain less than the entire, unreduced polymerization system as it emerges from the reactor train, leg, or branch. In practical terms, reduced effluents are formed by separating and removing a part of the monomer and the optional inert solvent/diluent content in the form of a monomer-rich stream. In the practice of the present disclosure, the separation of the said monomer-rich effluent and thus the reduction of the unreduced reactor effluent is performed by phase separation that generates the said monomer-rich stream and the said reduced reactor effluent, the latter of which in the form of a polymer-enriched stream. Stating it yet another way, the unreduced reactor effluent is the whole reactor effluent before any split of that effluent occurs, while a reduced effluent is formed after at least one split in which some of the light components (monomers and the optional inert solvents/diluents) are removed from the whole, unreduced reactor effluent.

DETAILED DESCRIPTION

The monomer recycle processes disclosed herein operate in conjunction with the in-line fluid phase polymer blending processes described in detail in U.S. Patent Application No. 60/876,193 filed on Dec. 20, 2006, herein incorporated by reference in its entirety.

One form of the improved in-line process for blending polymers disclosed in U.S. Patent Application Ser. No. 60/876,193 includes (a) providing two or more reactor trains configured in parallel and two or more high-pressure separators fluidly connected to the two or more reactor trains configured in parallel; (b) contacting in the two or more reactor trains configured in parallel olefin monomers having two or more carbon atoms with: 1) one or more catalyst systems, 2) optional one or more comonomers, 3) optional one or more scavengers, and 4) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein at least one of the reactor trains includes an olefin monomer that has three or more carbon atoms, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports; (c) forming an unreduced reactor effluent including a homogenous fluid phase polymer-monomer mixture in each parallel reactor train; (d) passing the unreduced reactor effluents from one or more but not from all of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-rich phase and a monomer-enriched phase, and separating the monomer-rich phase from the polymer-rich phase in each of the one or more high-pressure separators to form one or more separated monomer-rich phases and one or more polymer-rich phases; (e) combining the one or more polymer-enriched phases from the one or more high-pressure separators of (d) with the one or more unreduced reactor effluents from one or more parallel reactor trains to form a mixture of the one or more polymer-enriched phases and the one or more unreduced reactor effluents from the one or more parallel reactor trains to form a combined effluent stream that comprises the polymeric blend components from all parallel reactor trains; (f) passing the combined effluent stream of (e) into another high-pressure separator for product blending and product-feed separation; (g) maintaining the temperature and pressure within the another high pressure separator of (f) above the solid-fluid phase transition point but below the cloud point pressure and temperature to form a fluid-fluid two-phase system comprising a polymer-rich blend phase and a monomer-rich phase; and (h) separating the monomer-rich phase from the polymer-rich blend phase to form a polymer blend and a separated monomer-rich phase. The polymer-rich blend phase is conveyed to a downstream finishing stage for further monomer stripping, drying and/or pelletizing to form a polymer product blend. The fluid phase in-line blending process improves the resultant polymer blend by blending polymers in the presence of monomers as a solvent, which aids blending by reducing viscosity in the blending step.

Another form of the improved in-line process for blending polymers disclosed in U.S. Patent Application Ser. No. 60/876,193 includes: (a) providing two or more reactor trains configured in parallel and a high-pressure separator downstream fluidly connected to the two or more reactor trains configured in parallel; (b) contacting in the two or more reactor trains configured in parallel olefin monomers having two or more carbon atoms with: 1) one or more catalyst systems, 2) optional one or more comonomers, 3) optional one or more scavengers, and 4) optional one or more diluents or solvents, wherein at least one of the reactor trains configured in parallel is at a temperature above the solid-fluid phase transition temperature of the polymerization system and a pressure no lower than 10 MPa below the cloud point pressure of the polymerization system and less than 1500 MPa, wherein at least one of the reactor trains includes an olefin monomer that has three or more carbon atoms, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports; (c) forming a reactor effluent including a homogeneous fluid phase polymer-monomer mixture in each parallel reactor train; (d) combining the reactor effluent comprising the homogeneous fluid phase polymer-monomer mixture from each parallel reactor train to form a combined reactor effluent; (e) passing the combined reactor effluent through the high-pressure separator for product blending and product-feed separation; (f) maintaining the temperature and pressure within the high-pressure separator above the solid-fluid phase transition point but below the cloud point pressure and temperature to form a fluid-fluid two-phase system comprising a polymer-rich blend phase and a monomer-rich phase; and (g) separating the monomer-rich phase from the polymer-rich blend phase to form a polymer blend and a separated monomer-rich phase. The polymer-rich blend phase is conveyed to a downstream finishing stage for further monomer stripping, drying and/or pelletizing to form a polymer product blend. The fluid phase in-line blending process improves the resultant polymer blend by blending polymers in the presence of monomers as a solvent, which aids blending by reducing viscosity in the blending step.

The novel recycle methods disclosed herein provide for simplified recycle methods for the monomers emerge unconverted from the parallel reactor trains of the in-line fluid phase polymer blending processes described in U.S. Patent Application No. 60/876,193 (will be referred to herein as the in-line fluid phase polymer blending process or the in-line polymer blending process). Particularly, the novel monomer recycle methods are applicable for use with said fluid-phase in-line polymer blending processes in which each monomer component fed to a first group of one or more reactor trains of the said in-line blending processes (G1) is also present in the feed of a second group of one or more trains of the said in-line blending processes (G2) so that when the monomer pool of the said first group of trains (G1) is combined with the monomer pool of the second group of trains (G2), the said combined monomer pool and the monomer pool of the second group of trains (G2) are the same. Stating it differently, when the effluents (or reduced effluent streams derived from the effluents) of the said first group of reactor trains (G1) are combined with the effluents of the said second group of reactor trains (G2), the combined effluent stream essentially contains only monomers that are present in the feed of the said second group of reactor trains (G2). Stating it yet another way, the effluents (or reduced effluent streams derived from the effluents) of the said first group of reactor trains (G1) essentially do not introduce new monomer components into the recycled effluents of said second group of reactor trains (G2) when the effluent streams of G1 and G2 are combined. In a mathematical form, these conditions can be described as follows:

$$N(G1+G2)=N(G2) \text{ and } N(G1) \leq N(G2)$$

Where N(G1+G2) is the number of monomers in the combined monomer pool of the first and second group of reactor trains of the in-line fluid phase polymer blending process; N(G1) and N(G2) are the number of monomers in the monomer pool of the first (G1) and second (G2) group of reactor trains of the in-line fluid phase polymer blending process, respectively. The monomer pools present in the individual reactor trains of G1 can be the same or different. However, the monomer pools present in the individual reactor trains of G2 are always the same, although the monomer concentrations or monomer ratios may be different (but may also be the same). The number of reactor trains both in the first and in the second groups of reactor trains (G1 and G2) can be one or more than one. In practice, the number of reactor trains belonging to the first group of reactor trains of the in-line fluid phase polymer blending process (G1) can be one, two, three, four, five, or more. Similarly, the number of reactor trains belonging to the second group of reactor trains of the in-line fluid phase polymer blending processes (G2) can also be one, two, three, four, five, or more. It should be understood that as all reactor trains of the in-line fluid phase polymer blending processes disclosed herein, the one or more reactor trains of G1 are configured in parallel relative to the one or more reactor trains of G2. The G1 and G2 reactor trains are also fluidly connected to one another. The total number of reactors in the parallel reactor bank may be any number, although for economic reasons the number of reactors should be maintained as low as the desired product grade slate and plant capacity allows. The optimum number of parallel reactor trains (also referred to as legs of the reactor bank) may be determined by standard chemical engineering optimization methods well known in the art. Most typically, the polymerization-blending plant of the processes described in U.S. Patent Application No. 60/876,193 will have up to three polymerization reactor trains or legs both in the first (G1) and in the second (G2) group of reactor trains. However, more than three reactor trains/legs per reactor group may be employed if the production of the target product blends so requires.

When the above-stated conditions for the monomer pools are met in the in-line fluid phase polymer blending processes described in U.S. Patent Application No. 60/876,193 filed on Dec. 20, 2006, the disclosed novel monomer recycle methods provide for a simplified and thus advantaged monomer recycle method for the monomer recycle streams. In all embodiments of the novel recycle processes disclosed herein, the monomer recycle streams recovered from the product streams of G1 before mixing them with any of the effluents of G2 are recycled to G1 while the monomer recycle streams recovered from the mixed polymer-containing streams of G1 and G2 are recycled to G2. Since the mixed streams that contain monomers originated both from G1 and G2 are recycled to G2, the disclosed novel monomer recycle methods also ensure that the monomer component recycle rates in the recycle stream originated from the combined G1 and G2 product-containing streams and sent to G2 are not higher than the desired monomer component flow rates in the composite feed of G2. There are several methods available for achieving such balanced monomer recycles, which are disclosed below in the particular embodiments of the novel recycle processes. Note that meeting this mass-balance requirement in combination with the earlier-defined requirement for the monomer pools of G1 and G2 allows for the recycle of the said monomer-rich streams to G2 unseparated and without building up excess monomer inventories in G2.

In some embodiments of the novel recycle processes operating in conjunction with the in-line fluid phase polymer blending processes described in detail in U.S. Patent Application No. 60/876,193, the combined effluents of the first group of reactor trains (G1) deliver monomers at rates that are not higher than the combined purge rates of the corresponding monomers for the entire process plus the combined conversion rates of the same monomers in the second group of reactor trains (G2). In these embodiments, the invention processes mix the unreduced effluents (i.e., without recovering monomers for recycle) of the first group of reactor trains (G1) with the effluents of the second group of reactor trains (G2). The monomer-rich recycle streams emerging from and downstream of the mixing point of the polymer-containing effluent streams of G1 and G2 are recycled to the second group of reactor trains (G2). Optionally, some parts of the monomer recycle streams are purged from the system to control the buildup of light inert components, such as light alkanes (methane, ethane, propane, etc.), nitrogen, etc. Since these purge streams typically also contain monomers, the rate at which monomers are recycled to G2 are typically somewhat lower than the combined reactor effluent flow rates of those monomers. Note that since at least as much of the monomers common to the first (G1) and second (G2) groups of reactor trains is consumed in G2 or removed in the optional purge streams as much brought in by the effluents from G1, there is no excess monomer inventory buildup in G2 even without separating and recovering some or all of the monomers from the reactor effluents or from the streams derived from the reactor effluents before recycling them to G2. These embodiments are the simpler ones among the novel recycle processes disclosed herein in that they apply a single high-pressure separator to separate and recover a monomer-rich and a polymer-rich phase while blending the monomer and polymer components originated from G1 and G2. Since this high-pressure separator serves both as a separator and as a blender, it is also referred to as separator-blender. The monomer-rich stream emerging from the separator-blender is recycled to G2 while the polymer-rich stream emerging from the separator-blender is sent to the finishing section for further monomer and lights removal. The monomer recycle streams emerging from and downstream of the separator-blender may be purged to control undesirable heavy and light components, such as solvents, inert alkanes, $N_2$, excess catalyst killers, etc., before they are sent back to feed the second group of reactor trains. Note that in such embodiments, the monomers are recycled without recovering them individually before or after the product streams of G1 and G2 are mixed saving substantial capital and operating costs as compared to methods that separate and recover the individual monomers from the recycle streams. These embodiments, however, require the combined unreduced effluents of the first group of reactor trains (G1) deliver monomers at rates not higher than the combined purge rates of the corresponding monomers for the entire process plus the combined conversion rates of the corresponding monomers in the second group of reactor trains (G2).

In other embodiments, the combined effluents of the earlier-described first group of reactor trains (G1) of the in-line fluid phase polymer blending process carry one or more monomers at rates higher than the combined purge rates of the corresponding monomers for the entire process plus the combined conversion rates of the same monomers in the second group of reactor trains (G2) of the in-line fluid phase polymer blending process. Stating it differently, one or more monomers are present in excess in the effluents of G1. As in all embodiments of the novel recycle processes disclosed herein, the monomer recycle streams recovered after mixing all the product streams originated from G1 and G2 are recycled to only one selected group of reactor trains, G2. Since such recycle method would lead to a buildup of the excess monomers in G2 in these embodiments, the excess monomer flows need to be removed by phase separation before mixing the product streams originated from G1 and G2 and thus before they are recycled to G2. Therefore, in embodiments where the combined effluents of G1 carry one or more monomers in excess, the disclosed processes remove the excess monomer streams from the effluents of G1 prior to mixing the effluents with the product streams of G2. The removed excess monomer streams are recycled to their corresponding G1 reactor trains without separating and recovering the individual monomers present in their essentially pure forms. The said excess monomer recovery is achieved by phase separation performed in high-pressure separators as described in U.S. Patent Application No. 60/876,193. It comprises the removal of enough monomers from the one or more effluents of the first group of reactor trains (G1) to ensure that after the reduction, the combined polymer-containing streams originated from G1 bring in no excess monomer flows into the recycle streams sent to G2. It means that after removing the monomer excesses, the combined polymer-containing product streams originated from G1 deliver monomers to the blending point with the effluent streams of G2 at rates that are not higher than the combined purge rates of the corresponding monomers for the entire process plus the combined conversion rates of the same monomers in the second group of reactor trains (G2). The monomer-rich recycle streams emerging from or downstream of the mixing point of G1 and G2 product streams are recycled to G2. Consequently, at least a part of the monomer content of the product streams from G1 will be delivered to G2. Note that since no excess monomer is brought in by streams mixed with the effluents of G2, no excess inventory of those monomers builds up in G2 even without recovering some or all of the said monomers from the monomer-rich recycle streams recovered at or downstream of the said mixing point between the product streams of G1 and G2. The separation and recovery of excess monomer flows from G1 for recycle to G1 can be performed by using individual reactor train effluents or by using combined effluent blends of two or more reactor trains with same monomer pools. When G1 reactor effluents are combined before excess monomer recovery for recycle to G1, the recycled monomer stream can be directed toward one or more of the reactor trains it originated from. As mentioned before, the separation processes disclosed herein achieve the removal of excess monomers from the reactor effluents of G1 by performing phase separations during which a monomer-rich phase and a reduced polymer-containing (polymer-enriched) phase are recovered from the effluents of one or more reactor trains belonging to G1. Since these is phase separations are performed on streams originated exclusively from reactor trains of G1, they will be referred to as G1 phase separators, or G1 separators throughout the current disclosure. Recycling the thus-separated one or more monomer-rich streams to G1 ensures that no excess monomer stream is directed toward G2. Naturally, since no foreign monomers are present in these monomer-rich G1 recycle streams, there is no need for monomer separation before their recycle to the appropriate reactor trains of G1. The reduced polymer-enriched streams along with other (unreduced) product streams of G1 in turn are mixed with the (unreduced) product streams of G2 to ultimately yield an in-line polymer blend product. The reduction of the effluents originated from the first group of reactor trains (G1), i.e. the recovery of excess monomer streams recycled to their corresponding reactor trains belonging to G1, is controlled by adjusting the temperature and pressure of the phase separator so that the combined flow rate of each monomer component derived from G1 and blended with the product streams of G2 is not higher than the combined purge rate of each said monomer component for the entire process plus the combined conversion rate of each said monomer component in G2. The adjustment of the conditions of the phase separators for recovering the G1 monomer recycle streams can be readily performed by using standard chemical engineering techniques, including phase behavior measurements, well known in the art. The product-containing streams of G1 and G2 are combined upstream of or in the high-pressure separator downstream of the last G1 phase separator as described in described in U.S. Patent Application No. 60/876,193. Since this high-pressure separator has a dual function separating a monomer-rich stream from a polymer-rich stream while blending the monomer and polymer components originated from G1 and G2, it is also referred to as separator-blender. The monomer-rich stream emerging from the separator-blender is recycled to G2. A part of this and other monomer recycle streams of the process may be purged to control the buildup of undesirable heavy and light components, such as excess solvents, catalyst killers, light alkanes, etc. The polymer-rich stream emerging from the separator-blender is sent to the finishing section of the in-line blending process disclosed in U.S. Patent Application No. 60/876,193. The monomer-rich streams emerging downstream of the separator-blender may be combined with the monomer-rich stream emerging from the separator-blender for recycle to G2. They may also be partially or fully be purged from the system to control the buildup of undesirable components. Note that monomer recoveries in the disclosed processes are achieved by phase separations as opposed to the conventional cryogenic distillation required for the separation of monomer recycle streams emerging downstream of the point where the product streams of G1 and G2 are mixed. Phase separations are simpler, require lower investment, and operate with less energy, making the processes disclosed herein advantageous over the conventional recycle methods requiring costly distillative separation and recovery of the individual monomers.

In some embodiments of the novel recycle processes operating in conjunction with the in-line fluid phase polymer blending processes described in detail in U.S. Patent Application No. 60/876,193, the number of monomer components in any of monomer pools of the feeds to the first group of reactor trains (G1) may be one or more and the monomer pools of the reactor trains of G1 may be the same or different as long as the earlier-set $N(G1+G2)=N(G2)$ and $N(G1) \leq N(G2)$ conditions for the monomer pools of the earlier-defined first (G1) and second (G2) groups of reactor trains are met. For example, the reactor trains in G1 may all make the same homopolymer (e.g., polypropylene, or polyethylene, or polyhexene-1, etc.), or the same copolymer (e.g. ethylene-propylene or ethylene-butene-1, etc. copolymers), or may make more than one homopolymers (e.g., polyethylene and polypropylene) or more than one copolymer, (e.g., ethylene-propylene and ethylene-butene-1, etc., copolymers), or some may make a homopolymer and others may make copolymers in any combination, as long as the monomer pools of the feeds to the reactor trains in G2 comprise all members of the combined monomer pools of the feeds to the reactor trains in G1. As in all embodiments of the novel recycle processes disclosed herein, the monomer recycle streams recovered after mixing the product streams originated from G1 and G2 are recycled to G2. The polymers made in G1 may have the same or different average molecular weights, molecular weight distributions, melting and crystallization behaviors, melt viscosities, compositions, composition distributions, or combinations thereof. The second group of reactor trains (G2) makes copolymers containing two or more monomers that all have identical monomer pools and the feed monomer pool of said second group of reactor trains (G2) comprises each monomer present in the combined feed monomer pool of the first group of reactor trains (G1). The polymers made in the second group of reactor trains (G2) may have the same or different average molecular weights, molecular weight distributions, melting and crystallization behaviors, average monomer concentrations, composition distributions, or combination thereof. The flow rate for each monomer is not more in the combined effluents of the first group of reactor trains (G1) than the combined purge rates of the corresponding monomers for the entire process plus the combined conversion rates of the corresponding monomers in the second group of reactor trains (G2). The monomer-rich recycle streams emerging downstream of the mixing point of the polymer-containing effluent streams of G1 and G2 are recycled to the second group of reactor trains (G2). Optionally, some parts of the monomer recycle streams are purged from the system to control the buildup of light inert components, such as light alkanes (methane, ethane, propane, etc.), nitrogen, etc. Since these purge streams typically also contain monomers, the rate at which monomers are recycled to G2 are typically somewhat lower than the combined reactor effluent flow rates of those monomers. Note that since at least as much of the monomers common to the first (G1) and second (G2) groups of reactor trains is consumed in G2 or removed in the optional purge streams as much brought in by the effluents from G1, there is no excess monomer inventory buildup in G2 even without separating and recovering some or all of the monomers from the reactor effluents or from the streams derived from the reactor effluents before recycling them to G2. These embodiments are the simpler ones among the novel recycle processes disclosed herein in that they apply a single high-pressure separator to separate and recover a monomer-rich and a polymer-rich phase while blending the monomer and polymer components originated from G1 and G2. Since this high-pressure separator serves both as a separator and a blender, it is also referred to as separator-blender. The monomer-rich stream emerging from the separator-blender is recycled to G2 while the polymer-rich stream emerging from the separator-blender is sent to the finishing section for further monomer and lights removal. The monomer recycle streams emerging from and downstream of the separator-blender may be purged to control undesirable heavy and light components, such as solvents, inert alkanes, $N_2$, excess catalyst killers, etc., before they are sent back to feed the second group of reactor trains. Note that in such embodiments, the monomers are recycled without recovering them individually before or after the product streams of G1 and G2 are mixed saving substantial capital and operating costs as compared to methods that separate and recover the individual monomers from the recycle streams. These embodiments, however, require the combined unreduced effluents of the first group of reactor trains (G1) deliver monomers at rates not higher than the combined purge rates of the corresponding monomers for the entire process plus the combined conversion rates of the corresponding monomers in the second group of reactor trains (G2).

In some embodiments of the novel recycle processes operating in conjunction with the in-line fluid phase polymer blending processes described in detail in U.S. Patent Application No. 60/876,193, the number of monomer components in any of the monomer pools of the feeds to the first group of reactor trains (G1) may be one or more and the monomer pools of the feeds to the trains of G1 may be the same or different as long as the earlier-set $N(G1+G2)=N(G2)$ and $N(G1) \leq N(G2)$ conditions for the monomer pools of the earlier-defined first (G1) and second (G2) groups of reactor trains are met. For example, the reactor trains in G1 may all make the same homopolymer (e.g., polypropylene, or polyethylene, or polyhexene-1, etc.), or the same copolymer (e.g. ethylene-propylene or ethylene-butene-1, etc. copolymers), or may make more than one homopolymers (e.g., polyethylene and polypropylene) or more than one copolymer, (e.g., ethylene-propylene and ethylene-butene-1, etc., copolymers), or some may make a homopolymer and others may make copolymers in any combination, as long as the monomer pools of the feeds to the reactor trains in G2 comprise all members of the combined monomer pools of the feeds to the reactor trains in G1. As in all embodiments of the novel recycle processes disclosed herein, the monomer recycle streams recovered after mixing the product streams originated from G1 and G2 are recycled to G2. The polymers made in G1 may have the same or different average molecular weights, molecular weight distributions, melting and crystallization behaviors, melt viscosities, compositions, composition distributions, or combinations thereof. The second group of reactor trains (G2) makes copolymers containing two or more monomers that all have identical monomer pools and the feed monomer pool of said second group of reactor trains (G2) comprises each monomer present in the combined feed monomer pool of the first group of reactor trains (G1). The polymers made in the second group of reactor trains (G2) may have the same or different average molecular weights, molecular weight distributions, melting and crystallization behaviors, average monomer concentrations, composition distributions, or combination thereof. The combined effluents of the earlier-described first group of reactor trains (G1) carry one or more monomers at rates higher than the combined purge rates of the corresponding monomers for the entire process plus the combined conversion rates of the same monomers in the second group of reactor trains (G2). Stating it differently, one or more monomers are present in excess in the effluents of G1. As in all embodiments of the novel recycle processes disclosed herein, the monomer recycle streams recovered after mixing all the product streams originated from G1 and G2 are recycled to only one selected group of reactor trains, G2. Since such recycle method would lead to a buildup of the excess monomers in G2 in these embodiments, the excess monomer flows need to be removed by phase separation before mixing the product streams originated from G1 and G2 and thus before they are recycled to G2. Therefore, in embodiments where the combined effluents of G1 carry one or more monomers in excess, the disclosed processes remove the excess monomer streams from the effluents of G1 prior to mixing the effluents with the product streams of G2. The removed excess monomer streams are recycled to their corresponding G1 reactor trains without separating and recovering the individual monomers present in their essentially pure forms. The said excess monomer recovery is achieved by phase separation performed in high-pressure separators as described in U.S. Patent Application No. 60/876,193. It comprises the removal of enough monomers from the one or more effluents of the first group of reactor trains (G1) to ensure that after the reduction, the combined polymer-containing streams originated from G1 bring in no excess monomer flows into the recycle streams sent to G2. It means that after removing the monomer excesses, the combined polymer-containing product streams originated from G1 deliver monomers to the blending point with the effluent streams of G2 at rates that are not higher than the combined purge rates of the corresponding monomers for the entire process plus the combined conversion rates of the same monomers in the second group of reactor trains (G2). The monomer-rich recycle streams emerging downstream of the mixing point of G1 and G2 product streams are recycled to G2. Consequently, at least a part of the monomer content of the product streams from G1 will be delivered to G2. Note that since no excess monomer is brought in by streams mixed with the effluents of G2, no excess inventory of those monomers builds up in G2 even without recovering some or all of the said monomers from the monomer-rich recycle streams recovered downstream of the said mixing point between the product streams of G1 and G2. Typically, the high-pressure phase separators applied to reduce one or more effluent streams of reactor trains of G1 are used to treat the effluents of individual reactor trains of G1. However, when G1 has more than one trains with the same monomer pools, their effluent streams may optionally be combined before phase separation to remove the excess monomer flow. In no instances, however, may two or more reactor train effluent streams of G1 be combined to perform the removal of the excess monomer streams for recycle to a reactor train in G1 if the monomer pools of the reactor effluents involved were not identical. If the effluents of two or more reactor trains of G1 are combined before the removal of the excess monomer flow, the recovered monomer stream can be recycled to any one of the originator reactor trains of G1 or can be split among them. The proper choice can be determined by mass balance calculations well known in the art of chemical engineering. As mentioned before, the separation processes disclosed herein achieve the removal of excess monomers from the reactor effluents of G1 by performing phase separations during which a monomer-rich phase and a reduced polymer-containing (polymer-enriched) phase are recovered from the effluents of one or more reactor trains belonging to G1. Since these phase separations are performed on streams originated exclusively from reactor trains of G1, they will be referred to as G1 phase separators, or G1 separators throughout the current disclosure. Recycling the thus-separated one or more monomer-rich streams to G1 ensures that no excess monomer stream is directed toward G2. Naturally, since no foreign monomers are present in these monomer-rich G1 recycle streams, there is no need for monomer separation before their recycle to the appropriate reactor trains of G1. The reduced polymer-enriched streams along with other (unreduced) product streams of G1 in turn are mixed with the (unreduced) product streams of G2 to ultimately yield an in-line polymer blend product. The reduction of the effluents originated from the first group of reactor trains (G1), i.e. the recovery of excess monomer streams recycled to their corresponding reactor trains belonging to G1, is controlled by adjusting the temperature and pressure of the phase separator so that the combined flow rate of each monomer component derived from G1 and blended with the product streams of G2 is not higher than the combined purge rate of each said monomer component for the entire process plus the combined conversion rate of each said monomer component in G2. The adjustment of the conditions of the phase separators for recovering the G1 monomer recycle streams can be readily performed by using standard chemical engineering techniques, including phase behavior measurements, well known in the art. The product-containing streams of G1 and G2 are combined upstream of or in the high-pressure separator downstream of the last G1 phase separator as described in described in U.S. Patent Application No. 60/876,193. Since this high-pressure separator has a dual function separating a monomer-rich stream from a polymer-rich stream while blending the monomer and polymer components originated from G1 and G2, it is also referred to as separator-blender. The monomer-rich stream emerging from the separator-blender is recycled to G2. A part of this and other monomer recycle streams of the process may be purged to control the buildup of undesirable heavy and light components, such as excess solvents, catalyst killers, light alkanes, etc. The polymer-rich stream emerging from the separator-blender is sent to the finishing section of the in-line blending process disclosed in U.S. Patent Application No. 60/876,193. The monomer-rich streams emerging downstream of the separator-blender may be combined with the monomer-rich stream emerging from the separator-blender for recycle to G2. They may also be partially or fully be purged from the system to control the buildup of undesirable components. Note that this embodiment corrects for the monomer excesses present in the combined effluent streams of G1 and G2 by partially recovering the excess monomers by phase separation prior to blending the polymer-containing product streams of G1 and G2 in the separator-blender of the process described in U.S.

Patent Application No. 60/876,193. Note also that the said separator-blender of the process described in U.S. Patent Application No. 60/876,193 is the first high-pressure separator among the serially connected separators that combine all the polymer-containing effluents of G1 and G2. It is also important to emphasize that the monomer-rich effluents originated from and downstream of the said separator-blender are recycled to the second group of trains (G2) and not to the first group of reactor trains (G1). The monomer-rich streams recovered by the single-line G1 separators upstream of the said separator-blender, on the other hand, are always recycled directly to their own reactor trains belonging to G1 (also without monomer separation). The destination of the recycled monomer stream recovered in a high-pressure separator, therefore, divides the high-pressure separators into two groups: one sends back the recovered monomer-rich streams to G1, while the other one to G2. The first among the serially connected separators of the novel monomer recycle processes described herein that send their monomer-rich recycle streams to G2 is also the first that combines all polymer-containing product streams. Since it combines the functions of polymer-monomer separation and polymer-polymer blending, it is also referred to as separator-blender. We need to point out that in our descriptions the separator-blender designation is reserved to this one unique, readily identifiable high-pressure separator. Therefore, the earlier mentioned optional separators sending monomer-enriched streams to reactor trains in G1 are never called separator-blenders in our descriptions even if their function is to combine two or more reactor train effluents. Instead, they are referred to as G1 phase separators or G1 separators. It is important to point out that monomer recoveries in the disclosed processes are achieved by phase separations as opposed to the conventional cryogenic distillation required for the separation of monomer recycle streams emerging downstream of the point where the product streams of G1 and G2 are mixed. Phase separations are simpler, require lower investment, and operate with less energy, making the processes disclosed herein advantageous over the conventional recycle methods requiring costly distillative separation and recovery of the individual monomers.

In other embodiments of the novel recycle processes operating in conjunction with the in-line fluid phase polymer blending processes described in detail in U.S. Patent Application No. 60/876,193, the feed monomer pool of each reactor train of the first group of reactor trains (G1) has only one monomer member. The monomers fed to the different trains of the first group of reactor trains (G1) may be the same or different. In these embodiments, the members of the first group of reactor trains (G1) are also referred to as homopolymer reactor trains or homopolymer trains or homopolymerization reactor trains or homopolymerization trains. The homopolymers made in the homopolymer trains can have the same or different average molecular weights, molecular weight distributions, melting and crystallization behaviors, melt viscosities, compositions, or combination thereof. The second group of reactor trains (G2), the members of which are also referred to as copolymer reactor trains or copolymer trains or copolymerization reactor trains or copolymerization trains, makes copolymers that all comprise identical monomer pools (i.e., composed of the exact same monomers) and the monomer pool of said copolymerization trains (G2) comprises each monomer present in the combined monomer pool of the homopolymer trains (G1). The polymers made in the copolymer trains are composed of the same monomer units and may have the same or different average molecular weights, molecular weight distributions, melting and crystallization behaviors, melt viscosities, average monomer concentrations, composition distributions, or combination thereof. For example, the homopolymer could be polypropylene and the copolymer could be ethylene-propylene or propylene-butene-1, or propylene-hexene-1, or propylene-octene-1, or propylene-decene-1 copolymer, etc. The flow rate for each monomer is not more in the combined effluents of the first group of reactor trains (G1) than the combined purge rates of the corresponding monomers for the entire process plus the combined conversion rates of the corresponding monomers in the second group of reactor trains (G2). The monomer-rich recycle streams emerging downstream of the mixing point of the polymer-containing effluent streams of G1 and G2 are recycled to the second group of reactor trains (G2). Optionally, some parts of the monomer recycle streams are purged from the system to control the buildup of light inert components, such as light alkanes (methane, ethane, propane, etc.), nitrogen, etc. Since these purge streams typically also contain monomers, the rate at which monomers are recycled to G2 are typically somewhat lower than the combined reactor effluent flow rates of those monomers. Note that since at least as much of the monomers common to the first (G1) and second (G2) groups of reactor trains is consumed in G2 or removed in the optional purge streams as much brought in by the effluents from G1, there is no excess monomer inventory buildup in G2 even without separating and recovering some or all of the monomers from the reactor effluents or from the streams derived from the reactor effluents before recycling them to G2. These embodiments are the simpler ones among the novel recycle processes disclosed herein in that they apply a single high-pressure separator to separate and recover a monomer-rich and a polymer-rich phase while blending the monomer and polymer components originated from G1 and G2. Since this high-pressure separator serves both as a separator and a blender, it is also referred to as separator-blender. The monomer-rich stream emerging from the separator-blender is recycled to G2 while the polymer-rich stream emerging from the separator-blender is sent to the finishing section for further monomer and lights removal. The monomer recycle streams emerging from and downstream of the separator-blender may be purged to control undesirable heavy and light components, such as solvents, inert alkanes, $N_2$, excess catalyst killers, etc., before they are sent back to feed the second group of reactor trains. Note that in such embodiments, the monomers are recycled without recovering them individually before or after the product streams of G1 and G2 are mixed saving substantial capital and operating costs as compared to methods that separate and recover the individual monomers from the recycle streams. These embodiments, however, require the combined unreduced effluents of the first group of reactor trains (G1) deliver monomers at rates not higher than the combined purge rates of the corresponding monomers for the entire process plus the combined conversion rates of the corresponding monomers in the second group of reactor trains (G2).

In other embodiments of the novel recycle processes operating in conjunction with the in-line fluid phase polymer blending processes described in detail in U.S. Patent Application No. 60/876,193, the feed monomer pool of each reactor train of the first group of reactor trains (G1) has only one monomer member. The monomers fed to the different trains of the first group of reactor trains (G1) may be the same or different. In these embodiments, the members of the first group of reactor trains (G1) are also referred to as homopolymer reactor trains or homopolymer trains or homopolymerization reactor trains or homopolymerization trains. The homopolymers made in the homopolymer trains can have the same or different average molecular weights, molecular weight distributions, melting and crystallization behaviors, melt viscosities, compositions, or combination thereof. The second group of reactor trains (G2), the members of which are also referred to as copolymer reactor trains or copolymer trains or copolymerization reactor trains or copolymerization trains, makes copolymers that all comprise identical monomer pools (i.e., composed of the exact same monomers) and the monomer pool of said copolymerization trains (G2) comprises each monomer present in the combined monomer pool of the homopolymer trains (G1). The polymers made in the copolymer trains are composed of the same monomer units and may have the same or different average molecular weights, molecular weight distributions, melting and crystallization behaviors, melt viscosities, average monomer concentrations, composition distributions, or combination thereof. For example, the homopolymer could be polypropylene and the copolymer could be ethylene-propylene or propylene-butene-1, or propylene-hexene-1, or propylene-octene-1, or propylene-decene-1 copolymer, etc. The combined effluents of the earlier-described first group of reactor trains (G1) carry one or more monomers at rates higher than the combined purge rates of the corresponding monomers for the entire process plus the combined conversion rates of the same monomers in the second group of reactor trains (G2). Stating it differently, one or more monomers are present in excess in the effluents of G1. As in all embodiments of the novel recycle processes disclosed herein, the monomer recycle streams recovered after mixing all the product streams originated from G1 and G2 are recycled to only one selected group of reactor trains, G2. Since such recycle method would lead to a buildup of the excess monomers in G2 in these embodiments, the excess monomer flows need to be removed by phase separation before mixing the product streams originated from G1 and G2 and thus before they are recycled to G2. Therefore, in embodiments where the combined effluents of G1 carry one or more monomers in excess, the disclosed processes remove the excess monomer streams from the effluents of G1 prior to mixing the effluents with the product streams of G2. The removed excess monomer streams are recycled to their corresponding G1 reactor trains without separating and recovering the individual monomers present in their essentially pure forms. The said excess monomer recovery is achieved by phase separation performed in high-pressure separators as described in U.S. Patent Application No. 60/876,193. It comprises the removal of enough monomers from the one or more effluents of the first group of reactor trains (G1) to ensure that after the reduction, the combined polymer-containing streams originated from G1 bring in no excess monomer flows into the recycle streams sent to G2. It means that after removing the monomer excesses, the combined polymer-containing product streams originated from G1 deliver monomers to the blending point with the effluent streams of G2 at rates that are not higher than the combined purge rates of the corresponding monomers for the entire process plus the combined conversion rates of the same monomers in the second group of reactor trains (G2). The monomer-rich recycle streams emerging downstream of the mixing point of G1 and G2 product streams are recycled to G2. Consequently, at least a part of the monomer content of the product streams from G1 will be delivered to G2. Note that since no excess monomer is brought in by streams mixed with the effluents of G2, no excess inventory of those monomers builds up in G2 even without recovering some or all of the said monomers from the monomer-rich recycle streams recovered downstream of the said mixing point between the product streams of G1 and G2. Typically, the high-pressure phase separators applied to reduce one or more effluent streams of reactor trains of G1 are used to treat the effluents of individual reactor trains of G1. However, when G1 has more than one trains with the same monomer pools, their effluent streams may optionally be combined before phase separation to remove the excess monomer flow. In no instances, however, may two or more reactor train effluent streams of G1 be combined to perform the removal of the excess monomer streams for recycle to a reactor train in G1 if the monomer pools of the reactor effluents involved were not identical. If the effluents of two or more reactor trains of G1 are combined before the removal of the excess monomer flow, the recovered monomer stream can be recycled to any one of the originator reactor trains of G1 or can be split among them. The proper choice can be determined by mass balance calculations well known in the art of chemical engineering. As mentioned before, the separation processes disclosed herein achieve the removal of excess monomers from the reactor effluents of G1 by performing phase separations during which a monomer-rich phase and a reduced polymer-containing (polymer-enriched) phase are recovered from the effluents of one or more reactor trains belonging to G1. Since these phase separations are performed on streams originated exclusively from reactor trains of G1, they will be referred to as G1 phase separators, or G1 separators throughout the current disclosure. Recycling the thus-separated one or more monomer-rich streams to G1 ensures that no excess monomer stream is directed toward G2. Naturally, since no foreign monomers are present in these monomer-rich G1 recycle streams, there is no need for monomer separation before their recycle to the appropriate reactor trains of G1. The reduced polymer-enriched streams along with other (unreduced) product streams of G1 in turn are mixed with the (unreduced) product streams of G2 to ultimately yield an in-line polymer blend product. The reduction of the effluents originated from the first group of reactor trains (G1), i.e. the recovery of excess monomer streams recycled to their corresponding reactor trains belonging to G1, is controlled by adjusting the temperature and pressure of the phase separator so that the combined flow rate of each monomer component derived from G1 and blended with the product streams of G2 is not higher than the combined purge rate of each said monomer component for the entire process plus the combined conversion rate of each said monomer component in G2. The adjustment of the conditions of the phase separators for recovering the G1 monomer recycle streams can be readily performed by using standard chemical engineering techniques, including phase behavior measurements, well known in the art. The product-containing streams of G1 and G2 are combined upstream of or in the high-pressure separator downstream of the last G1 phase separator as described in described in U.S. Patent Application No. 60/876,193. Since this high-pressure separator has a dual function separating a monomer-rich stream from a polymer-rich stream while blending the monomer and polymer components originated from G1 and G2, it is also referred to as separator-blender. The monomer-rich stream emerging from the separator-blender is recycled to G2. A part of this and other monomer recycle streams of the process may be purged to control the buildup of undesirable heavy and light components, such as excess solvents, catalyst killers, light alkanes, etc. The polymer-rich stream emerging from the separator-blender is sent to the finishing section of the in-line blending process disclosed in U.S. Patent Application No. 60/876,193. The monomer-rich streams emerging downstream of the separator-blender may be combined with the monomer-rich stream emerging from the separator-blender for recycle to G2. They may also be partially or fully be purged from the system to control the buildup of undesirable components. Note that this embodiment corrects for the monomer excesses present in the combined effluent streams of G1 and G2 by partially recovering the excess monomers by phase separation prior to blending the polymer-containing product streams of G1 and G2 in the separator-blender of the process described in U.S. Patent Application No. 60/876,193. Note also that the said separator-blender of the process described in U.S. Patent Application No. 60/876,193 is the first high-pressure separator among the serially connected separators that combine all the polymer-containing effluents of G1 and G2. It is also important to emphasize that the monomer-rich effluents originated from and downstream of the said separator-blender are recycled to the second group of trains (G2) and not to the first group of reactor trains (G1). The monomer-rich streams recovered by the single-line G1 separators upstream of the said separator-blender, on the other hand, are always recycled directly to their own reactor trains belonging to G1 (also without monomer separation). The destination of the recycled monomer stream recovered in a high-pressure separator, therefore, divides the high-pressure separators into two groups: one sends back the recovered monomer-rich streams to G1, while the other one to G2. The first among the serially connected separators of the novel monomer recycle processes described herein that send their monomer-rich recycle streams to G2 is also the first that combines all polymer-containing product streams. Since it combines the functions of polymer-monomer separation and polymer-polymer blending, it is also referred to as separator-blender. We need to point out that in our descriptions the separator-blender designation is reserved to this one unique, readily identifiable high-pressure separator. Therefore, the earlier mentioned optional separators sending monomer-enriched streams to reactor trains in G1 are never called separator-blenders in our descriptions even if their function is to combine two or more reactor train effluents. Instead, they are referred to as G1 phase separators or G1 separators. It is important to point out that monomer recoveries in the disclosed processes are achieved by phase separations as opposed to the conventional cryogenic distillation required for the separation of monomer recycle streams emerging downstream of the point where the product streams of G1 and G2 are mixed. Phase separations are simpler, require lower investment, and operate with less energy, making the processes disclosed herein advantageous over the conventional recycle methods requiring costly distillative separation and recovery of the individual monomers.

In some other embodiments of the novel recycle processes operating in conjunction with the in-line fluid phase polymer blending processes described in detail in U.S. Patent Application No. 60/876,193, the feed monomer pools of the first group of reactor trains (G1) have one member and they are the same in each monomer pool. The first group of reactor trains, the members of which are also referred to as homopolymer reactor trains or homopolymer trains or homopolymerization reactor trains or homopolymerization trains. The homopolymers made in the homopolymer trains can have the same or different average molecular weights, molecular weight distributions, or combination thereof. The second group of reactor trains (G2), the members of which are also referred to as copolymer reactor trains or copolymer trains or copolymerization reactor trains or copolymerization trains, makes copolymers that all comprise identical monomer pools (i.e., composed of the exact same monomers) and the monomer pool of said copolymerization trains (G2) comprises the monomer present in the homopolymer trains (G1). The polymers made in the copolymerization trains are composed of the same monomers and may have the same or different average molecular weight, molecular weight distribution, average monomer concentration, composition distribution, or combination thereof. For example, the homopolymer could be polypropylene and the copolymer could be ethylene-propylene or propylene-butene-1, or propylene-hexene-1, or propylene-octene-1, or propylene-decene-1 copolymer, etc. The flow rate for the monomer is not more in the combined effluents of the first group of reactor trains (G1) than the combined purge rates of the corresponding monomer for the entire process plus the combined conversion rates of the corresponding monomer in the second group of reactor trains (G2). As in each embodiment of the novel recycle processes disclosed herein, the monomer-rich recycle streams emerging downstream of the mixing point of the polymer-containing effluent streams of G1 and G2 are recycled to the second group of reactor trains (G2). Optionally, some parts of the monomer recycle streams are purged from the system to control the buildup of light inert components, such as light alkanes (methane, ethane, propane, etc.), nitrogen, etc. Since these purge streams typically also contain monomers, the rate at which monomers are recycled to G2 are typically somewhat lower than the combined reactor effluent flow rates of those monomers. Note that since at least as much of the monomer common to the first (G1) and second (G2) groups of reactor trains is consumed in G2 or removed in the optional purge streams as much brought in by the effluents from G1, there is no excess monomer inventory buildup in G2 even without separating and recovering some or all of the monomer from the reactor effluents or from the streams derived from the reactor effluents before recycling them to G2. These embodiments are the simpler ones among the novel recycle processes disclosed herein in that they apply a single high-pressure separator to separate and recover a monomer-rich and a polymer-rich phase while blending the monomer and polymer components originated from G1 and G2. Since this high-pressure separator serves both as a separator and a blender, it is also referred to as separator-blender. The monomer-rich stream emerging from the separator-blender is recycled to G2 while the polymer-rich stream emerging from the separator-blender is sent to the finishing section for further monomer and lights removal. The monomer recycle streams emerging from and downstream of the separator-blender may be purged to control undesirable heavy and light components, such as solvents, inert alkanes, $N_2$, excess catalyst killers, etc., before they are sent back to feed the second group of reactor trains. Note that in such embodiments, the monomers are recycled without recovering them individually before or after the product streams of G1 and G2 are mixed saving substantial capital and operating costs as compared to methods that separate and recover the individual monomers from the recycle streams. These embodiments, however, require the combined unreduced effluents of the first group of reactor trains (G1) deliver the monomer at rates not higher than the combined purge rates of the corresponding monomer for the entire process plus the combined conversion rates of the corresponding monomer in the second group of reactor trains (G2).

In some other embodiments of the novel recycle processes operating in conjunction with the in-line fluid phase polymer blending processes described in detail in U.S. Patent Application No. 60/876,193, the feed monomer pools of the first group of reactor trains (G1) have one member and they are the same in each monomer pool. The first group of reactor trains, the members of which are also referred to as homopolymer reactor trains or homopolymer trains or homopolymerization reactor trains or homopolymerization trains. The homopolymers made in the homopolymer trains can have the same or different average molecular weights, molecular weight distributions, or combination thereof. The second group of reactor trains (G2), the members of which are also referred to as copolymer reactor trains or copolymer trains or copolymerization reactor trains or copolymerization trains, makes copolymers that all comprise identical monomer pools (i.e., composed of the exact same monomers) and the monomer pool of said copolymerization trains (G2) comprises the monomer present in the homopolymer trains (G1). The polymers made in the copolymerization trains are composed of the same monomers and may have the same or different average molecular weight, molecular weight distribution, average monomer concentration, composition distribution, or combination thereof. For example, the homopolymer could be polypropylene and the copolymer could be ethylene-propylene or propylene-butene-1, or propylene-hexene-1, or propylene-octene-1, or propylene-decene-1 copolymer, etc. The combined effluents of the earlier-described first group of reactor trains (G1) carry the monomer at rates higher than the combined purge rates of the corresponding monomer for the entire process plus the combined conversion rates of the same monomer in the second group of reactor trains (G2). Stating it differently, the monomer is present in excess in the effluents of G1. As in all embodiments of the novel recycle processes disclosed herein, the monomer recycle streams recovered after mixing all the product streams originated from G1 and G2 are recycled to only one selected group of reactor trains, G2. Since such recycle method would lead to a buildup of the excess monomers in G2 in these embodiments, the excess monomer flow need to be removed by phase separation before mixing the product streams originated from G1 and G2 and thus before they are recycled to G2. Therefore, in embodiments where the combined effluents of G1 carry the monomer in excess, the disclosed processes remove the excess monomer stream from the effluents of G1 prior to mixing the effluents with the product streams of G2. The removed excess monomer stream is recycled to their corresponding G1 reactor trains without separating and recovering the individual monomer present in its essentially pure forms. The said excess monomer recovery is achieved by phase separation performed in high-pressure separators as described in U.S. Patent Application No. 60/876,193. It comprises the removal of enough monomer from the one or more effluents of the first group of reactor trains (G1) to ensure that after the reduction, the combined polymer-containing streams originated from G1 bring in no excess monomer flows into the recycle streams sent to G2. It means that after removing the monomer excess, the combined polymer-containing product streams originated from G1 deliver monomer to the blending point with the effluent streams of G2 at a rate not higher than the combined purge rates of the corresponding monomer for the entire process plus the combined conversion rates of the same monomer in the second group of reactor trains (G2). The monomer-rich recycle streams emerging downstream of the mixing point of G1 and G2 product streams are recycled to G2. Consequently, at least a part of the monomer content of the product streams from G1 will be delivered to G2. Note that since no excess monomer is brought in by streams mixed with the effluents of G2, no excess inventory of those monomers builds up in G2 even without recovering some or all of the said monomer from the monomer-rich recycle streams recovered downstream of the said mixing point between the product streams of G1 and G2. Typically, the high-pressure phase separators applied to reduce one or more effluent streams of reactor trains of G1 are used to treat the effluents of individual reactor trains of G1. However, when G1 has more than one trains, their effluent streams may optionally be combined before phase separation to remove the excess monomer flow. If the effluents of two or more reactor trains of G1 are combined before the removal of the excess monomer flow, the recovered monomer stream can be recycled to any one of the reactor trains of G1 or can be split among them. The proper choice can be determined by mass balance calculations well known in the art of chemical engineering. As mentioned before, the separation processes disclosed herein achieve the removal of excess monomers from the reactor effluents of G1 by performing phase separations during which a monomer-rich phase and a reduced polymer-containing (polymer-enriched) phase are recovered from the effluents of one or more reactor trains belonging to G1. Since these phase separations are performed on streams originated exclusively from reactor trains of G1, they will be referred to as G1 phase separators, or G1 separators throughout the current disclosure. Recycling the thus-separated one or more monomer-rich streams to G1 ensures that no excess monomer stream is directed toward G2. Naturally, since no foreign monomer is present in these monomer-rich G1 recycle streams, there is no need for monomer separation before their recycle to the appropriate reactor trains of G1. The reduced polymer-enriched streams along with other (unreduced) product streams of G1 in turn are mixed with the (unreduced) product streams of G2 to ultimately yield an in-line polymer blend product. The reduction of the effluents originated from the first group of reactor trains (G1), i.e. the recovery of excess monomer stream recycled to their corresponding reactor trains belonging to G1, is controlled by adjusting the temperature and pressure of the phase separator so that the combined flow rate of the monomer component derived from G1 and blended with the product streams of G2 is not higher than the combined purge rate of the said monomer component for the entire process plus the combined conversion rate of the said monomer component in G2. The adjustment of the conditions of the phase separators for recovering the G1 monomer recycle streams can be readily performed by using standard chemical engineering techniques, including phase behavior measurements, well known in the art. The product-containing streams of G1 and G2 are combined upstream of or in the high-pressure separator downstream of the last G1 phase separator as described in described in U.S. Patent Application No. 60/876,193. Since this high-pressure separator has a dual function separating a monomer-rich stream from a polymer-rich stream while blending the monomer and polymer components originated from G1 and G2, it is also referred to as separator-blender. The monomer-rich stream emerging from the separator-blender is recycled to G2. A part of this and other monomer recycle streams of the process may be purged to control the buildup of undesirable heavy and light components, such as excess solvents, catalyst killers, light alkanes, etc. The polymer-rich stream emerging from the separator-blender is sent to the finishing section of the in-line blending process disclosed in U.S. Patent Application No. 60/876,193. The monomer-rich streams emerging downstream of the separator-blender may be combined with the monomer-rich stream emerging from the separator-blender for recycle to G2. They may also be partially or fully be purged from the system to control the buildup of undesirable components. Note that this embodiment corrects for the monomer excesses present in the combined effluent streams of G1 and G2 by partially recovering the excess monomers by phase separation prior to blending the polymer-containing product streams of G1 and G2 in the separator-blender of the process described in U.S. Patent Application No. 60/876,193. Note also that the said separator-blender of the process described in U.S. Patent Application No. 60/876,193 is the first high-pressure separator among the serially connected separators that combine all the polymer-containing effluents of G1 and G2. It is also important to emphasize that the monomer-rich effluents originated from and downstream of the said separator-blender are recycled to the second group of trains (G2) and not to the first group of reactor trains (G1). The monomer-rich streams recovered by the single-line G1 separators upstream of the said separator-blender, on the other hand, are always recycled directly to their own reactor trains belonging to G1 (also without monomer separation). The destination of the recycled monomer stream recovered in a high-pressure separator, therefore, divides the high-pressure separators into two groups: one sends back the recovered monomer-rich streams to G1, while the other one to G2. The first among the serially connected separators of the novel monomer recycle processes described herein that send their monomer-rich recycle streams to G2 is also the first that combines all polymer-containing product streams. Since it combines the functions of polymer-monomer separation and polymer-polymer blending, it is also referred to as separator-blender. We need to point out that in our descriptions the separator-blender designation is reserved to this one unique, readily identifiable high-pressure separator. Therefore, the earlier mentioned optional separators sending monomer-enriched streams to reactor trains in G1 are never called separator-blenders in our descriptions even if their function is to combine two or more reactor train effluents. Instead, they are referred to as G1 phase separators or G1 separators. It is important to point out that monomer recoveries in the disclosed processes are achieved by phase separations as opposed to the conventional cryogenic distillation required for the separation of monomer recycle streams emerging downstream of the point where the product streams of G1 and G2 are mixed. Phase separations are simpler, require lower investment, and operate with less energy, making the processes disclosed herein advantageous over the conventional recycle methods requiring costly distillative separation and recovery of the individual monomers.

In another embodiment of the novel recycle processes operating in conjunction with the in-line fluid phase polymer blending processes described in detail in U.S. Patent Application No. 60/876,193, there is one homopolymer train (G1) and one copolymer train (G2), i.e., both G1 and G2 have one reactor train each and the feed monomer pool of G1 has one monomer. The monomer pool of the copolymer comprises the monomer of the homopolymer. As stated earlier, the number of different monomers for the combined process yielding the polymer blend is equal to the number of monomer components used in making the copolymer component of the in-line product blend. For example, the homopolymer could be polypropylene and the copolymer could be ethylene-propylene or propylene-butene-1, or propylene-hexene-1, or propylene-octene-1, or propylene-decene-1 copolymer, etc. The present disclosure does not comprehend polymerization processes that would make blends of homopolymers and copolymers where there is not a single monomer common to the homopolymer and copolymer (i.e. blends of polypropylene and ethylene-butene-1 copolymer or polyethylene and propylene-hexene-1 copolymer). Hence the monomer recycle process for use with fluid phase in-line polymer blending disclosed herein, the number of different monomers in the overall process is equal to the number of monomers in the copolymerization reactor train. The flow rate for the monomer is not more in the first reactor train (G1) than the combined purge rates of the corresponding monomer for the entire process plus the combined conversion rates of the corresponding monomer in the second reactor train (G2). As in each embodiment of the novel recycle processes disclosed herein, the monomer-rich recycle streams emerging downstream of the mixing point of the polymer-containing effluent streams of G1 and G2 are recycled to the second group of reactor trains (G2). Optionally, some parts of the monomer recycle streams are purged from the system to control the buildup of light inert components, such as light alkanes (methane, ethane, propane, etc.), nitrogen, etc. Since these purge streams typically also contain monomers, the rate at which monomers are recycled to G2 are typically somewhat lower than the combined reactor effluent flow rates of those monomers. Note that since at least as much of the monomer common to the first (G1) and second (G2) groups of reactor trains is consumed in G2 or removed in the optional purge streams as much brought in by the effluents from G1, there is no excess monomer inventory buildup in G2 even without separating and recovering some or all of the monomer from the reactor effluents or from the streams derived from the reactor effluents before recycling them to G2. These embodiments are the simpler ones among the novel recycle processes disclosed herein in that they apply a single high-pressure separator to separate and recover a monomer-rich and a polymer-rich phase while blending the monomer and polymer components originated from G1 and G2. Since this high-pressure separator serves both as a separator and a blender, it is also referred to as separator-blender. The monomer-rich stream emerging from the separator-blender is recycled to G2 while the polymer-rich stream emerging from the separator-blender is sent to the finishing section for further monomer and lights removal. The monomer recycle streams emerging from and downstream of the separator-blender may be purged to control undesirable heavy and light components, such as solvents, inert alkanes, $N_2$, excess catalyst killers, etc., before they are sent back to feed the second group of reactor trains. Note that in such embodiments, the monomers are recycled without recovering them individually before or after the product streams of G1 and G2 are mixed saving substantial capital and operating costs as compared to methods that separate and recover the individual monomers from the recycle streams. These embodiments, however, require the unreduced effluent of the homopolymerization train (G1) delivers the monomer at a rate not higher than the combined purge rates of the corresponding monomer for the entire process plus the combined conversion rate of the corresponding monomer in the copolymerization reactor train (G2).

In another embodiment of the novel recycle processes operating in conjunction with the in-line fluid phase polymer blending processes described in detail in U.S. Patent Application No. 60/876,193, there is one homopolymer train (G1) and one copolymer train (G2), i.e., both G1 and G2 have one reactor train each and the feed monomer pool of G1 has one monomer. The monomer pool of the copolymer comprises the monomer of the homopolymer. As stated earlier, the number of different monomers for the combined process yielding the polymer blend is equal to the number of monomer components used in making the copolymer component of the in-line product blend. For example, the homopolymer could be polypropylene and the copolymer could be ethylene-propylene or propylene-butene-1, or propylene-hexene-1, or propylene-octene-1, or propylene-decene-1 copolymer, etc. The present disclosure does not comprehend polymerization processes that would make blends of homopolymers and copolymers where there is not a single monomer common to the homopolymer and copolymer (i.e. blends of polypropylene and ethylene-butene-1 copolymer or polyethylene and propylene-hexene-1 copolymer). Hence the monomer recycle process for use with fluid phase in-line polymer blending disclosed herein, the number of different monomers in the overall process is equal to the number of monomers in the copolymerization reactor train. The effluent of the homopolymerization reactor train (G1) carries the monomer at rates higher than the combined purge rates of the corresponding monomer for the entire process plus the combined conversion rate of the same monomer in the copolymerization train (G2). Stating it differently, the monomer is present in excess in the effluent of G1. As in all embodiments of the novel recycle processes disclosed herein, the monomer recycle streams recovered after mixing the product streams originated from G1 and G2 are recycled to only one selected group of reactor trains, G2. Since such recycle method would lead to a buildup of the excess monomers in G2 in these embodiments, the excess monomer flow need to be removed by phase separation before mixing the product streams originated from G1 and G2 and thus before they are recycled to G2. Therefore, in embodiments where the combined effluents of G1 carry the monomer in excess, the disclosed processes remove the excess monomer stream from the effluent of G1 prior to mixing the effluent with the product stream of G2. The removed excess monomer stream is recycled to their corresponding G1 reactor train without separating and recovering the individual monomer present in its essentially pure form. The said excess monomer recovery is achieved by phase separation performed in a high-pressure separator as described in U.S. Patent Application No. 60/876,193. It comprises the removal of enough monomer from the effluent of G1 to ensure that after the reduction, the polymer-containing stream originated from G1 bring in no excess monomer flow into the recycle streams sent to G2. It means that after removing the monomer excess, the polymer-containing product stream originated from G1 delivers monomer to the blending point with the effluent stream of G2 at a rate not higher than the combined purge rates of the corresponding monomer for the entire process plus the conversion rate of the same monomer in G2. The monomer-rich recycle streams emerging downstream of the mixing point of G1 and G2 product streams are recycled to G2. Consequently, at least a part of the monomer content of the product stream from G1 will be delivered to G2. Note that since no excess monomer is brought in by stream mixed with the effluent of G2, no excess inventory of the monomer builds up in G2 even without recovering some or all of the said monomer from the monomer-rich recycle streams recovered downstream of the said mixing point between the product streams of G1 and G2. As mentioned before, the separation processes disclosed herein achieve the removal of excess monomer from the reactor effluent of G1 by performing phase separation during which a monomer-rich phase and a reduced polymer-containing (polymer-enriched) phase are recovered from the effluent of G1. Since these phase separation is performed on a stream originated exclusively from G1, it will be referred to as G1 phase separator, or G1 separator throughout the current disclosure. Recycling the thus-separated monomer-rich stream to G1 ensures that no excess monomer stream is directed toward G2. Naturally, since no foreign monomer is present in this monomer-rich G1 recycle stream, there is no need for monomer separation before its recycle to G1. The reduced polymer-enriched stream is mixed with the (unreduced) product stream of G2 to ultimately yield an in-line polymer blend product. The reduction of the effluent originated from G1, i.e. the recovery of excess monomer stream recycled to G1, is controlled by adjusting the temperature and pressure of the phase separator so that the combined flow rate of the monomer component derived from G1 and blended with the product streams of G2 is not higher than the combined purge rate of the said monomer component for the entire process plus the combined conversion rate of the said monomer component in G2. The adjustment of the conditions of the phase separator for recovering the G1 monomer recycle streams can be readily performed by using standard chemical engineering techniques, including phase behavior measurements, well known in the art. The product-containing streams of G1 and G2 are combined upstream of or in the high-pressure separator downstream of the G1 phase separator as described in U.S. Patent Application No. 60/876,193. Since this high-pressure separator has a dual function separating a monomer-rich stream from a polymer-rich stream while blending the monomer and polymer components originated from G1 and G2, it is also referred to as separator-blender. The monomer-rich stream emerging from the separator-blender is recycled to G2. A part of this and other monomer recycle streams of the process may be purged to control the buildup of undesirable heavy and light components, such as excess solvents, catalyst killers, light alkanes, etc. The polymer-rich stream emerging from the separator-blender is sent to the finishing section of the in-line blending process disclosed in U.S. Patent Application No. 60/876,193. The monomer-rich streams emerging downstream of the separator-blender may be combined with the monomer-rich stream emerging from the separator-blender for recycle to G2. They may also be partially or fully be purged from the system to control the buildup of undesirable components. Note that this embodiment corrects for the monomer excess present in the combined effluent streams of G1 and G2 by partially recovering the excess monomer by phase separation prior to blending the polymer-containing product streams of G1 and G2 in the separator-blender of the process described in U.S. Patent Application No. 60/876,193. Note also that the said separator-blender of the process described in U.S. Patent Application No. 60/876,193 is the first high-pressure separator among the serially connected separators that combine all the polymer-containing effluents of G1 and G2. It is also important to emphasize that the monomer-rich effluents originated from and downstream of the said separator-blender are recycled to G2 and not to G1. The monomer-rich streams recovered by the single-line G1 separator upstream of the said separator-blender, on the other hand, is always recycled directly to its own reactor train belonging to G1 (also without monomer separation). The destination of the recycled monomer stream recovered in a high-pressure separator, therefore, divides the high-pressure separators into two groups: one sends back the recovered monomer-rich streams to G1, while the other one to G2. The first among the serially connected separators of the novel monomer recycle processes described herein that send their monomer-rich recycle streams to G2 is also the first that combines all polymer-containing product streams. Since it combines the functions of polymer-monomer separation and polymer-polymer blending, it is also referred to as separator-blender. We need to point out that in our descriptions the separator-blender designation is reserved to this one unique, readily identifiable high-pressure separator. Therefore, the earlier-mentioned separator sending monomer-enriched stream to the reactor train in G1 is never called separator-blender in our descriptions. Instead, its is referred to as G1 phase separator or G1 separator. It is important to point out that monomer recoveries in the disclosed processes are achieved by phase separations as opposed to the conventional cryogenic distillation required for the separation of monomer recycle streams emerging downstream of the point where the product streams of G1 and G2 are mixed. Phase separations are simpler, require lower investment, and operate with less energy, making the processes disclosed herein advantageous over the conventional recycle methods requiring costly distillative separation and recovery of the individual monomers.

In all embodiments of the novel monomer recycle process operated in conduction with the in-line fluid phase polymer blending processes described in detail in U.S. Patent Application No. 60/876,193, the polymer-rich stream emerging from the bottom of the above-described separator blender is further processed in the finishing section where the remaining of the lights are removed to ultimately yield the in-line produced polymer blend product. The first stage of the said finishing section typically comprises one or more phase separators, often referred to as low-pressure separators, from which the volatiles, such as monomers and solvents, emerge as monomer-rich streams at the top, while the polymer-containing stream emerges as further-enriched polymer blend at the bottom. Some or all of the monomer-rich streams emerging from the product finishing section, i.e., downstream of the separator-blender, may be combined with the monomer-rich phase of the separator-blender for recycle to G2 and some or all of these monomer-rich streams may be purged from the process to control the buildup of volatile inerts, such as light alkanes, $N_2$, solvent, etc., in G2. Since the separators in the finishing section operate at lower pressures than the separator-blender, the monomer-rich recycle streams recovered in the finishing section are compressed/pumped to higher pressure before merging them with the monomer-rich recycle stream of the separator-blender. The last separator of the finishing stage is typically followed by a devolatalizer to remove the last traces of the volatile residues to yield the product polymer blend. The devolatalizer typically operates under vacuum and sometimes also serves as an extruder.

Optionally, in any embodiment of the novel recycle processes operating in conjunction with the in-line fluid phase polymer blending processes described in detail in U.S. Patent Application No. 60/876,193, the undesired heavy components present in the monomer recycle streams and typically comprising excess solvents, catalyst killers (e.g., water, methanol, ethanol, etc.), low molecular weight oligomeric side-products, etc. can be separated from one or more monomer recycle streams to prevent the buildup of inert (e.g., solvents, low molecular weight polymers, etc.) or harmful components (such as excess catalyst killers, etc.) in the reactor trains receiving monomer recycle streams. The separation of heavy components is typically simple due to the large differences between the boiling points of the light monomers, like ethylene, ethylene, propylene, and butenes and that of the heavy components and thus may simply require a knock-out pot or a simple separation tower.

Similarly, in order to prevent the buildup of undesired light components, such as, e.g., inerts originated from the fresh olefin feeds, an optional light purge stream may be removed from any or all recycle streams. The one or more light purge streams may advantageously be taken from the lowest-pressure monomer recoveries coming from vessels downstream of the high-pressure separator-blender described earlier, i.e., from the finishing section of the in-line blending process of U.S. Patent Application No. 60/876,193. Such purge methods save the cost of recompression of those lower-pressure monomer-containing recovery streams. Note that also common to all embodiments of the recycle processes disclosed herein is that the blended monomer streams emerging from and downstream of the separator-blender (i.e., downstream of the point where the polymer-containing effluents originated from G1 and G2 are mixed) are combined and recycled to only one of the reactor trains (i.e., to G2) of the in-line blending process of U.S. Patent Application No. 60/876,193 without separating and recovering the individual monomers from the said combined monomer recycle stream.

In all embodiments that apply phase separators to recover monomer recycle streams for reactor trains in G1, said G1 high-pressure separators may also serve as buffer vessels to improve the control of the polymer blend component ratio. The use and operation of separators as buffer vessels is described in detail in U.S. Patent Application No. 60/876,193, incorporated herein in its entirety.

In all embodiments of the novel monomer recovery and recycle processes disclosed herein, the phase separators need to operate in the fluid-fluid two phase regime but need to avoid conditions at which polymeric solids would separate. Since prior to the phase separation step the streams to be separated are in their single fluid phase state, their process conditions need to be changed to bring them to their fluid-fluid two phase state while avoiding conditions that would lead to the formation of a solid polymer phase. U.S. Patent Application No. 60/876,193 teaches that the desired transition from a single fluid state to a fluid-fluid two-phase state may be advantageously achieved by pressure letdown. However, in some embodiments, when the temperatures of the streams brought to the phase separators are not high enough, such pressure letdowns may cross the fluid-solid phase transition line in the phase diagrams of the fluid stream leading to the formation of polymer solids and thus ultimately causing fouling. In these embodiments, the heat content of a fluid stream to be separated is increased by passing it through a heat exchanger prior to the pressure letdown.

Two or more polymer-containing product streams of the process may be blended upstream of or in the separators. When product streams are brought directly to the separators for blending, the separators advantageously have a mixing zone or a mixing chamber to enhance especially the blending of the polymeric components of the blended streams. When two or more product streams are blended upstream of the separators, static mixers may be optionally employed between the mixing point and the downstream separator to facilitate the blending of the components of the blended streams. Also, when two or more product streams are blended upstream of the separators, a letdown valve may also be deployed downstream of the mixing point, i.e., in the line carrying the combined streams. The deployment of a pressure letdown valve downstream of the mixing point may be advantageous for (a) bringing the different streams to a common pressure that is above the cloud point, thus affording the mixing of the phases before fluid-fluid phase separation begins, or (b) providing a high-shear mixing of streams that are already in the fluid-fluid two-phase zone at the point of mixing. When the mixing point is upstream of a letdown valve, there may or may not be additional letdown valves in some or all stream lines being directed to the mixing point. These additional letdown valves may be deployed to stage the pressure letdown process and/or to bring the streams to be mixed to a common intermediate pressure that is lower than the corresponding upstream (e.g., reactor) pressure but higher than the downstream separator pressure. Such pressure staging may afford advantages in heat exchange (by, for example, allowing heat exchange at lower pressure and thus at lower cost) or in mixing efficiency (see above).

The monomer recycle process of the present disclosure offers an improved, lower-cost separation-recycle method in which the monomers from one or more effluents of the first group of reactor trains (G1) of the in-line fluid phase polymer blending process are partially recovered by phase separation in the form of olefin-enriched streams. The said partially recovered monomers are directly recycled to the said first group of reactor trains (G1). The one or more polymer-enriched reduced effluent streams originated from the first group of reactor trains (G1) are then blended with the other (unreduced) effluent streams of the first (G1) and second (G2) groups of reactor trains of the in-line fluid phase polymer blending process. The volume and composition of the monomer blend streams recovered after mixing the effluents of G1 and G2 can be adjusted by the degree of (partial) monomer recovery from the effluents of the first group of reactor trains (G1) and are set such that they can be recycled to the second group of reactor trains (G2) without building an excess inventory of the monomers common to both the first (G1) and second (G2) group of reactor trains. Thus, the processes of the present disclosure combine the advantages of solution blending of resin components without the need for costly separation and recovery of individual, pure monomer streams before their recycle to the polymerization reactors. The main advantage of the novel recycle processes disclosed herein is that they balance the monomer flows of an in-line polymer blending process and thus enable monomer recycle without the application of costly cryogenic monomer separations. Instead of the expensive separation of individual monomer streams, the processes disclosed herein employ phase separators that cost less to install, maintain, and operate.

In essence, the monomer recycle methods for use with fluid phase in-line polymer blending processes disclosed herein comprise a polymerization section and one or more monomer-polymer separator vessels, one of which combines all polymer-containing effluent streams of G1 and G2 and serves both as polymer-polymer blender and polymer-monomer separator, called the separator-blending vessel, or separator-blender. The separation vessels sometimes are also referred to high-pressure separators. As mentioned above, the separator-blender serves as both a separator and as a blender for the reactor effluents of the two or more parallel reactor trains in the reactor bank comprising G1 and G2. Although any and all combinations of reactor operation modes may be included in the monomer recycle methods for use with fluid phase in-line polymer blending processes disclosed herein, it is advantageous when at least one of the reactor trains operates in a homogeneous fluid phase and more advantageous when all reactors operate in the homogenous fluid phase for economic and process simplicity reasons. Bulk homogeneous fluid phase polymerizations such as bulk homogeneous supercritical or bulk solution polymerizations are particularly advantageous.

The monomer recycle methods for use with fluid phase in-line polymer blending disclosed herein offer significant advantages relative to prior art methods of recycling monomers. One or more of the advantages of the monomer recycle process of the present disclosure include, but are not limited to, reduced capital investment cost by averting the need for refrigerated monomer separation towers, reduced operating costs by averting the need for utility requirements associated with operating refrigerated monomer separation towers, and reduced maintenance costs due to process simplicity. In addition, the fluid phase in-line polymer blending process offers one or more of the advantages including, but are not limited to, improved polymer blend homogeneity because of molecular-level mixing of blend components, improved cost of manufacture because of savings from avoidance of the reprocessing cost associated with conventional off-line blending processes that start with the separately produced solid, pelletized polymer blend components, and because of the ease and simplicity of blending polymers at substantially reduced viscosities due to the presence of substantial amounts of monomers and optionally solvents in the blending step; flexibility of adjusting blend ratios and therefore blend properties in-line; flexibility in adjusting production rates of the blend components; flexibility in independently controlling for each reactor the residence time, monomer composition and conversion, catalyst choice, catalyst concentration, temperature and pressure; improved blend quality; flexibility in making a broader slate of blended products in the same plant; reduced process cost by utilizing the monomer-polymer separator(s) for product blending and, in some embodiments, for product buffering to allow better control of blend ratio.

In-Line Blending Process Overview for Use with Monomer Recycle Process:

Polyolefins are used in a large number of different applications. Each of these applications requires a different balance between the stiffness, elasticity, and toughness of the polymer. Ideally, polymers would be custom-tailored to the different needs of each customer. One of the methods enabling product tailoring involves the blending of individual polymer components. The ability to adjust the stiffness-elasticity-toughness balance of polyolefins provides for the ability to meet the needs of a broad range of applications and thus to expand the potential of polyolefins in delivering desired performance at reduced cost. The stiffness-elasticity-toughness balance may be altered by changing the molecular structure of polymers by changing their composition (i.e. making copolymers), stereoregularity, molecular weight, etc. The stiffness-elasticity-toughness may also be readily shifted by making blends of polymers or by producing composites. The in-line blending processes disclosed herein relate to making polymer blends.

Disclosed herein are advantageous monomer recycle processes for use with direct in-line polymer blend production in an integrated multi-reactor polymerization wherein the blending step is achieved downstream of the reactors in a separator-blending vessel (also referred to as the high-pressure separator). The production of polymer blends in the polymerization plant is facilitated when the polymer blend components are dissolved in the polymerization system since the small-molecule component(s), such as monomer(s) and optional solvent(s)/diluent(s) of the polymerization system reduce(s) viscosity thus allowing molecular level blending in a low shear process. Hence, using the reactor effluents wherein the polymer blending components are present in a dissolved fluid state may be advantageous to downstream blending operations. The polymerization reactors advantageously may be of the homogeneous supercritical process, the solution process type, or a combination thereof in order to provide the precursor polymer for blending in a fluid state in the direct reactor effluents suitable for the in-line blending process. Bulk homogeneous supercritical and bulk solution polymerization processes are particularly useful for producing blend components due to the simplicity of the monomer recycle loop and due to the enhancements in reactor productivity and product properties, such as molecular weight and melting behavior, as will become apparent from the following discussions. The in-line blending processes disclosed herein can also utilize certain other polymerization reactors making in-line blend components, for example, in the form of a slurry, wherein the polymers form solid pellets in a dense fluid polymerization system. When some of the in-line polymer blending components are made in slurry reactor trains, a dissolution stage is added between the polymerization reactor train and the separator-blending vessel. This dissolution stage typically consists of a pump followed by a heater to bring the reactor effluent above the solid-fluid phase transition conditions affording a stream that contains the polymer blending component homogeneously dissolved in the dense fluid polymerization system. In order to facilitate the dissolution of the polymer pellets, increased shearing may be applied, which typically is provided by stirring or by pumping. For embodiments, in which excess monomers need to be taken out from the slurry reactor effluents, the recovery of the desired fraction of the monomer can simply be performed by filtration or by gravimetric separation of the monomer and the polymer-enriched fraction prior to the polymer dissolution step. In general, however, because of the added processing and investment costs of such slurry reactor operations, homogeneous polymerization processes, such as homogeneous supercritical or solution polymerization, are typically cost-advantaged and thus advantageous to produce the in-line polymer blending components.

As described before, in certain embodiments of the in-line blending processes for use with the monomer recycle process disclosed herein, one or more reactor effluent streams containing the dissolved polymer blend components are fed to independent separators or separation vessels (also referred to as single-stream high-pressure separators, or Group 1 separators, or Group 1 high-pressure separators, or G1 separators, or G1 high-pressure separators) upstream of the separator-blending vessel for separation of a polymer-enriched stream from some fraction of the monomer and the optional solvent/diluent content of the said streams. Such single-stream (G1) high-pressure separators deployed upstream of the separator-blending vessel in essence afford a partial recovery of one or more monomers and the optional solvents present in the effluents of the first group of reactor trains (G1) thus allowing their recovery and recycle before being mixed with monomers and optional solvents used in the reactor trains of the second group of reactor trains (G2). Such processes may be advantageous by eliminating the need for cryogenically separating mixed monomer and optional solvent streams before recycling them to the appropriate reactor trains of G2. The polymer-enriched streams from each of these single-stream (G1) separators are blended in one of the high-pressure separator vessels that serves both as a polymer-monomer separator and as a polymer-polymer blender (separator-blending vessel). In this embodiment, the operation conditions of the single-stream (G1) separator(s) upstream of the separator-blending vessel may be adjusted to yield polymer-enriched stream(s) that still contain(s) enough low molecular weight component(s), such as monomer(s) and optional inert solvent(s) to keep the viscosity of these streams much below that of the essentially pure molten polymer(s) thus facilitating the mixing of the blending polymer components in the separator-blender. Optionally, the G1 separator(s) feeding the separator-blending vessel may also serve as buffer vessel(s) affording an improved control of the blend ratio by compensating for the small but inevitable fluctuations in the production of the individual in-line blend components. The buffer capacity of these vessels is defined by the volume between the operationally allowed maximum and minimum levels of the separated polymer-enriched lower phase.

As opposed to using a cascade of series reactors for the in-line blending of polymers, the blending processes disclosed herein provide for the individual components of the polymer blend to be made in a bank of parallel reactors. Such direct blend production may be advantageously achieved in polymerization processes that operate in a homogeneous dense fluid phase, i.e. above the fluid-solid phase transition limits. The invention process has at least one reactor train that operates in the homogeneous dense fluid phase. Polymerization processes that operate in a homogenous dense fluid phase use either inert solvent(s) or monomer(s) or their mixtures as a solvent/diluent in their liquid or supercritical state. Hence, such parallel reactors operate with polymerization systems in their homogeneous dense supercritical or in their liquid state. In both the supercritical and liquid operation modes, the process may be a bulk polymerization process operating with less than 40 wt %, or less than 30 wt %, or less than 20 wt %, or less than 10 wt %, or less than 5 wt % of inert solvent present in the feed to the reactor, and in some embodiments, essentially free (less than 1 wt %) of inert solvents. In one embodiment of the disclosed process, the reactors operate at bulk homogeneous supercritical conditions as has been disclosed in U.S. patent application Ser. Nos. 11/433,889, now U.S. Pat. No. 7,429,634, and 11/177,004, now abandoned, herein incorporated by reference in their entirety.

In another embodiment of in-line blending process for use with the monomer recycle process disclosed herein, optionally one or more reactor trains operate at conditions where the polymer dissolution is substantially aided by an inert solvent (solution process where the polymerization medium contains more than 40 wt % solvent, typically more than 60 wt % solvent) as has been disclosed in PCT Publication No. WO 2006/044149, herein incorporated by reference in its entirety. In yet another embodiment, one or more of the reactors included in the bank of reactors operate in the homogeneous supercritical state and one or more of the reactors included in the bank of reactors operate in the solution state (combination of solution process and homogeneous supercritical process reactors). Both solution and homogeneous supercritical polymerization processes provide polymers dissolved in a fluid state, which is required for the downstream in-line blending of polymers. Both solution and homogeneous supercritical polymerization processes providing polymers in a homogeneous fluid state may be performed in a bulk monomer phase using essentially pure monomer(s) as solvent or may keep the polymer in the homogeneous fluid state by employing an inert solvent in substantial concentrations (i.e., 60 wt % or more). The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

The parallel reactor configuration disclosed herein permits for flexibility in independently controlling for each reactor the residence time, monomer composition and conversion, catalyst choice, and catalyst concentration not available in a series reactor configuration for blending of polymers. It also makes the independent control of reaction temperature and pressure easier thus enhancing the control of the polymerization processes yielding the individual in-line polymer blend components.

U.S. patent application Ser. Nos. 11/433,889, now U.S. Pat. No. 7,429,634, and 11/177,004 now abandoned, disclose a flexible homogeneous polymerization platform for the homogeneous supercritical propylene polymerization process (also referred to herein as the "supercritical process"). In the referred supercritical propylene polymerization process, polymerization is carried out in a substantially supercritical monomer medium, thus it is a bulk homogeneous supercritical polymerization process. The polymer is in a homogeneously dissolved state in the reactor and in the reactor effluent thus making the reactor effluent suitable for a direct downstream blending operation prior to recovering the polymeric products in their solid pelletized or baled form. U.S. patent application Ser. Nos. 11/433,889, now U.S. Pat. No. 7,429,634, and 11/177,004 now abandoned, also teach that the supercritical polymerization process provides an advantageous means to the so-called solution processes in its ability to produce highly crystalline, high molecular weight (i.e. low melt-flow rate) isotactic propylene homopolymers. Unlike gas phase and slurry polymerization processes, the supercritical process may also produce ethylene-propylene copolymers and propylene homopolymers with reduced tacticity, and thus reduced polymer melting point without fouling. As previously referenced, U.S. patent application Ser. Nos. 11/433,889, now U.S. Pat. No. 7,429,634, and 11/177,004 now abandoned, are incorporated by reference in their entirety herein.

Advantageous polymer blends are often composed of a blend of (a) highly crystalline component(s) and (a) low crystallinity component(s). In particular, solution polymerization processes may provide for low crystallinity products because the polymer is present in solution in the reactor, and therefore cannot foul it. However, the solution process has limitations in producing highly crystalline, high molecular weight products with higher melting point. One particularly relevant limitation of the solution process is that it typically cannot produce high MW products that also have high melting point, and if it could, such products tend to crystallize in the reactor and cause fouling. In contrast, the homogeneous supercritical process may provide for both high crystallinity/high melting point and low crystallinity/low melting point polymers without fouling. It also generates the polymer blend components in a dissolved state in the polymerization system allowing direct blending without the need for a dissolution step. These attributes make it a particularly advantageous polymerization process for the in-line blending processes disclosed herein. Notwithstanding, any combination of polymerization processes operating with dense polymerization systems may be deployed in the in-line blending processes disclosed herein as long as at least one of the reactor trains operates with a homogeneous polymerization system. Homogeneous operation is ensured by operating above the solid-fluid phase transition point, advantageously not lower than 10 MPa, or not lower than 1 MPa, or not lower than 0.1 MPa, or not lower than 0.01 MPa below the cloud point of the polymerization system.

The monomers for use in the bank of parallel reactors disclosed herein may be any olefinic compounds containing at least one aliphatic double bond. The olefin group may be unsubstituted or substituted by one or more aliphatic or aromatic group(s) and may be part of an open chain or a non-aromatic ring. Exemplary, but not limiting, olefins include alpha and internal linear or branched olefins and their blends, such as ethylene, propylene, butenes, pentenes, hexenes, heptenes, octenes, nonenes, decenes, styrenes, non-conjugated dienes, cyclohexene, norbornene, and the like. Exemplary, but not limiting, non-polymerizing (inert) fluid components serving as diluents/solvents include light paraffinic and aromatic hydrocarbons and their blends, such as butanes, pentanes, hexanes, heptanes, octanes, toluene, xylenes, cyclopentane, cyclohexane, fluorocarbons, hydrofluorocarbons, etc.

The conditions in the polymerization reactors of the aforementioned olefin polymerization process may be established such that the entire reactor content, including the monomer(s), optional non-polymerizing fluid, catalyst system(s), optional scavenger(s) and polymeric products, is in a homogeneous fluid, and advantageously in a single homogeneous fluid state. In certain embodiments, the conditions in the reactors of the aforementioned process may be set such that the reactor contents are in their supercritical fluid state, and advantageously in a single homogeneous supercritical fluid state.

Figure 2:
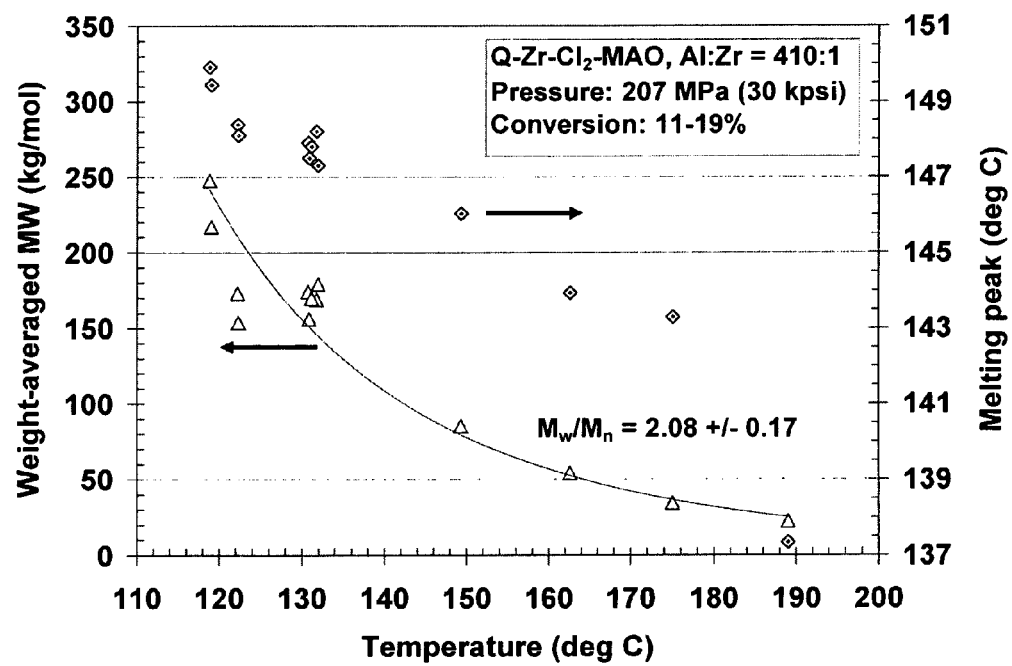
FIG. 2 presents the effect of polymerization temperature on the molecular weight and melting point of polypropylene made in supercritical polypropylene using MAO-activated (µ-dimethylsilyl)bis(2-methyl-4-phenylindenyl)zirconium dichloride (Q-Zr-MAO) catalyst at 207 MPa (30 kpsi)

The upper limit for temperature is determined by the product properties that are strongly influenced by the reaction temperature (for an example, see FIG. 2). Since often polymers with higher molecular weights and/or higher melting points are desired, high polymerization temperatures (>250° C.) are generally not advantageous. Increased temperatures can also degrade most known catalytic systems, providing another reason for avoiding excessive polymerization temperatures. At the current state of the art of polymerization, polymerization temperatures above 350° C. are not recommended. For the slurry polymerization processes, the upper temperature limits of polymerization are also influenced by the solid-fluid phase transition conditions since running near the solid-fluid phase transition line leads to fouling. For that reason, slurry operations not higher than 5° C. below the solid-fluid phase transition are advantageous, not higher than 10° C. below the solid-fluid phase transition are particularly advantageous.

The lower limits of reaction temperature are determined by the desired polymer properties. Lower temperatures generally favor higher crystallinity and higher molecular weight (for an example, see FIG. 2). For homogeneous polymerization processes, the lower limits of reaction temperature are also determined by the solid-fluid phase transition temperature. Running the reactors below the solid-fluid phase transition temperature of the reaction mixture may lead to operation problems due to fouling. For the production of highly crystalline polypropylenes (melting peak temperatures >150° C.) in bulk homogeneous supercritical polymerization processes, the minimum operating temperature is about 95-100° C. In the production of lower melting copolymers, such as ethylene-propylene and ethylene-hexene-1 copolymers, significantly lower reactor temperatures, e.g., 90° C. or even lower (80 or 70, or 60, or 50, or 40° C.), may be readily used without fouling. The application of certain inert solvents may further reduce the minimum operation temperature of the fouling-free operation regime, although, as discussed earlier, the substantial presence of inert solvents also tends to limit the product molecular weight and often the melting peak temperature. It also increases production cost due to the need for solvent handling.

The critical temperature and pressure of the polymerization systems are different from the critical values of pure components, and thus supercritical operations at temperatures lower than the critical temperature of pure propylene and C4 plus monomers (e.g., 92° C. for propylene) are possible and disclosed herein. Additionally, near-amorphous and amorphous materials with low melting points may be produced without fouling even below the critical temperature of the reactor blends, i.e., at temperatures that correspond to the condensed liquid state of the polymerization system in the reactor. In these instances, the operation temperature may be below the bubble point of the reaction mixture and thus the reactor operates at what is often referred to as liquid-filled conditions. In some instances, such operation mode could be desired to achieve high molecular weight (MW) and thus low melt flow rate (MFR), particularly in the manufacture of copolymers, such as propylene-ethylene or ethylene-higher olefin or propylene-higher olefin copolymers. Thus, reactor operations under conditions at which the polymeric products are dissolved in the monomer or monomer blend present in its liquid state, also known as bulk solution polymerization, are also disclosed herein.

Polymerization Temperature for Homogeneous Fluid Phase Polymerizations:

The polymerization process temperature should be above the solid-fluid phase transition temperature of the polymer-containing fluid polymerization system at the reactor pressure, or at least 2° C. above the solid-fluid phase transition temperature of the polymer-containing fluid polymerization system at the reactor pressure, or at least 5° C. above the solid-fluid phase transition temperature of the polymer-containing fluid polymerization at the reactor pressure, or at least 10° C. above the solid-fluid phase transformation point of the polymer-containing fluid polymerization system at the reactor pressure. In another embodiment, the polymerization process temperature should be above the cloud point of the single-phase fluid polymerization system at the reactor pressure, or 2° C. or more above the cloud point of the fluid polymerization system at the reactor pressure. In still another embodiment, the polymerization process temperature should be between 40 and 350° C., or between 50 and 250° C., or between 60 and 250° C., or between 70 and 250° C. or between 80 and 250° C. Exemplary lower polymerization temperature limits are 40, or 50, or 60, or 70, or 80, or 90, or 95, or 100, or 110, or 120° C. Exemplary upper polymerization temperature limits are 350, or 250, or 240, or 230, or 220, or 210, or 200, or 190, or 180, or 170, or 160° C.

In certain embodiments, polymerization is performed in a supercritical polymerization system. In such embodiments, the reaction temperature is above the critical temperature of the polymerization system. In some embodiments, some or all reactors operate at homogeneous supercritical polymerization conditions. Said homogeneous supercritical polymerizations of the in-line blending processes disclosed herein may be carried out at the following temperatures. In one embodiment, the temperature is above the solid-fluid phase transition temperature of the polymer-containing fluid reaction medium at the reactor pressure or at least 5° C. above the solid-fluid phase transition temperature of the polymer-containing fluid reaction medium at the reactor pressure, or at least 10° C. above the solid-fluid phase transformation point of the polymer-containing fluid reaction medium at the reactor pressure. In another embodiment, the temperature is above the cloud point temperature of the single-phase fluid reaction medium at the reactor pressure, or 2° C. or more above the cloud point temperature of the fluid reaction medium at the reactor pressure. In yet another embodiment, the temperature is between 50 and 350° C., between 60 and 250° C., between 70 and 250° C., or between 80 and 250° C. In one form, the temperature is above 50, 60, 70, 80, 90, 95, 100, 110, or 120° C. In another form, the temperature is below 350, 250, 240, 230, 220, 210, or 200° C. In another form, the cloud point temperature is above the supercritical temperature of the polymerization system or between 50 and 350° C., between 60 and 250° C., between 70 and 250° C., or between 80 and 250° C. In yet another form, the cloud point temperature is above 50, 60, 70, 80, 90, 95, 100, 110, or 120° C. In still yet another form, the cloud point temperature is below 350, 250, 240, 230, 220, 210, or 200° C.

Polymerization Pressure for Homogeneous Fluid Phase Polymerizations:

The maximum reactor pressure may be determined by process economics, since both the investment and operating expenses increase with increasing pressure. The minimum pressure limit for the production of the individual blend components disclosed herein is set by the desired product properties, such as molecular weight (MW) and melt flow rate (MFR) (see, for example, FIG. 3).

Reducing process pressures in homogeneous polymerizations may lead to phase separation creating a polymer-rich and a polymer-lean fluid phase. In well-stirred reactors, where mass transport is sufficiently high due to efficient mixing of the two phases, product qualities may not be impacted by such fluid-fluid phase separation. Therefore, polymerization process conditions under which there is a polymer-rich and a polymer-lean phase are provided herein as long as both phases are above the solid-fluid phase separation limit thus preventing fouling and are well mixed thus preventing substantial mass transfer limitation leading to poorly controlled increases in molecular weight and/or compositional distributions.

Exemplary, but not limiting, process pressures, are between 1 MPa (0.15 kpsi) to 1500 MPa (217 kpsi), and more particularly between 1 and 500 MPa (0.15 and 72.5 kpsi). Advantageously, the process pressure is between 5 and 100 MPa (725 and 14,500 psi) In one embodiment, the polymerization process pressure should be no lower than the solid-fluid phase transition pressure of the polymer-containing fluid polymerization system at the reactor temperature. In another embodiment, the polymerization process pressure should be no lower than 10 MPa (or no lower than 1 MPa, or no lower than 0.1 MPa, or no lower than 0.01 MPa) below the cloud point of the fluid polymerization system at the reactor temperature and less than 1500 MPa. In still another embodiment, the polymerization process pressure should be between 5 and 500 MPa, or between 10 and 500 MPa, or between 10 and 300 MPa, or between 20 and 250 MPa, or between 10 and 100 MPa. Exemplary lower pressure limits are 1, 5, 10, 20, and 30 MPa (0.15, 0.75, 1.45, 2.9, 4.35 kpsi, respectively). Exemplary upper pressure limits are 1500, 1000, 500, 300, 250, 200, and 100 MPa (217, 145, 72.5, 43.5, 36.3, 29, and 14.5 kpsi, respectively).

In certain embodiments, polymerization is performed in a supercritical polymerization system. In such embodiments, the reaction pressure is above the critical the pressure of the polymerization system. In some embodiments, some or all reactors operate at homogeneous supercritical polymerization conditions. Said homogeneous supercritical polymerizations of the in-line blending processes disclosed herein may be carried out at the following pressures. The supercritical polymerization process of the in-line blending processes disclosed herein may be carried out at the following pressures. In one embodiment, the pressure is no lower than the crystallization phase transition pressure of the polymer-containing fluid reaction medium at the reactor temperature or no lower than 10 MPa below the cloud point of the fluid reaction medium at the reactor temperature. In another embodiment, the pressure is between 10 and 500 MPa, or between 10 and 300 MPa, or between 10 and 200 MPa, or between 10 and 100 MPa, or between 20 and 250 MPa. In one form, the pressure is above 10, 20, or 30 MPa. In another form, the pressure is below 1500, 500, 300, 250, 200, or 100 MPa. In another form, the cloud point pressure is between 1 and 500 MPa, or between 1 and 300 MPa, or between 1 and 200, or between 1 and 100, or between 5 and 250 MPa. In yet another form, the cloud point pressure is above 1, 5, 10, 20, or 30 MPa. In still yet another form, the cloud point pressure is below 1500, 500, 300, 250, 200, or 100 MPa.

Figure 4:
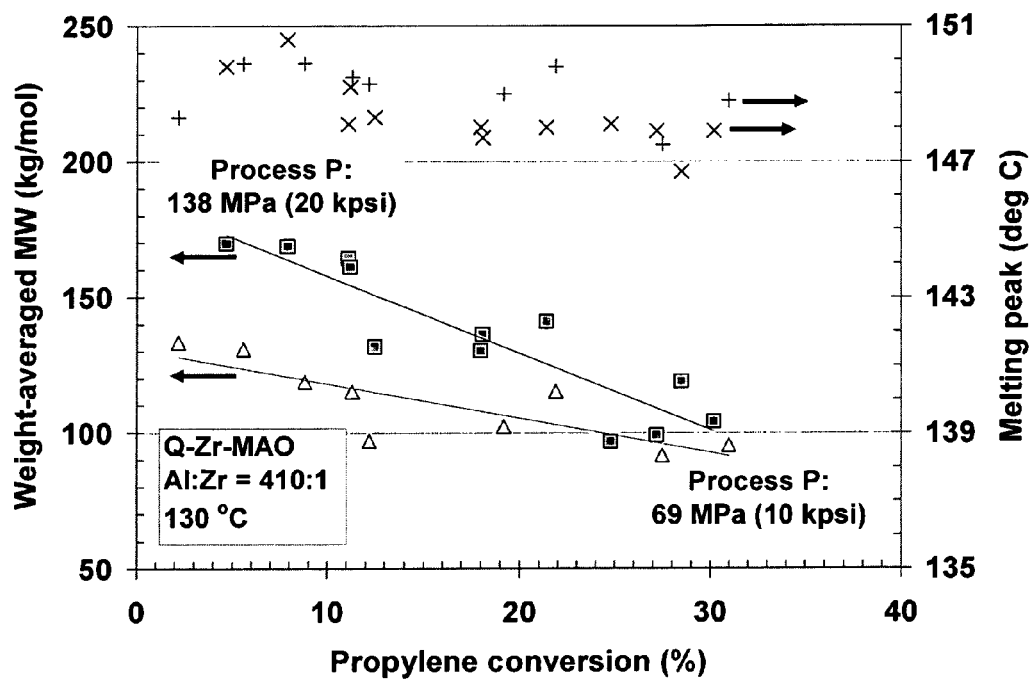
FIG. 4 presents the effect of propylene conversion in the polymerization of supercritical propylene using MAO-activated (µ-dimethylsilyl)bis(2-methyl-4-phenylindenyl)zirconium dichloride (Q-Zr-MAO) at 130° C. and 69 and 138 MPa (10 or 20 kpsi, respectively)

Total Monomer Conversion for Homogeneous Fluid Phase Polymerizations:

Increasing the conversion of the total monomer feed in a single-pass in the individual reactor trains of the parallel reactor bank can reduce the monomer recycle ratio thus can reduce the cost of monomer recycle. Increasing monomer recycle ratios (i.e., the ratio of recycled/total monomer feed to the reactor train) require the treatment and recycle of larger monomer volumes per unit polymer production, which increases production cost. Therefore, higher monomer conversion (lower recycle ratios) often provides for improved process economics. However, because high polymer content in the polymerization system, particularly in homogeneous polymerization systems, yields high viscosities, which correspondingly may make reactor mixing, heat transfer, and downstream product handling difficult, the monomer conversion in a single pass has practical operation limits. The viscosity of monomer-polymer blends and thus the practical conversion limits can be readily established by standard engineering methods known in the art (M. Kinzl, G. Luft, R. Horst, B. A. Wolf, J. Rheol. 47 (2003) 869). Single-pass conversions also depend on operating conditions and product properties. For example, FIG. 4 shows how increasing conversion reduces the polymer molecular weight. Therefore, monomer conversion may also be constrained by the desire to increase the molecular weight of the blend component made in the given reactor train. Exemplary, but not limiting, total monomer single pass conversions are below 90%, more particularly below 80% and still more particularly below 60%. Total monomer conversion is defined as the weight of polymer made in a reactor or in a reactor train divided by the combined weight of monomers and comonomers in the feed to the reactor or reactor train. It should be understood that while high total monomer conversion is often limited by product viscosity or by product property targets, the conversion of some highly reactive monomer components present in some monomer feed blends may be higher than 90%. For example, the single-pass conversion of ethylene in ethylene-propylene or in ethylene-higher olefin feed blends may be nearly complete (approaching 100%) and is disclosed herein.

As mentioned above, another factor limiting the total monomer conversion is the MW-decreasing effect of conversion (see FIG. 4). Therefore, the production of polymer blend components with high MW requires the moderation of monomer conversion in a single pass beyond that of what viscosity and other practical operation considerations would dictate. Hence, for the production of blend components with high molecular weight (particularly those with higher than >200 kg/mol weight-averaged molecular weight $-M_w$), the total monomer conversion may need to be below 30%. Again, the conversion of some highly reactive components in a monomer feed blend may be higher, and may even approach 100%.

The single-pass conversion in the polymerization reactors disclosed herein may be adjusted by the combination of catalyst concentration and total feed flow rate. The total feed rate determines the average residence time (in a back-mixed reactor equal to the reactor volume divided by the total volumetric flow rate of the effluent). The same conversion may be achieved at lower residence time by increasing the catalyst concentration in the feed and vice versa. Lower catalyst concentration may reduce catalyst cost, but may also reduce volumetric productivity thus requiring higher residence times, and ultimately a larger reactor and thus higher investment cost for the same polymer production capacity. The optimum balance between residence time/reactor volumes and catalyst concentration may be determined by standard engineering methods known in the art. A wide-range of polymer blend components may be produced in the reactors disclosed herein at reactor residence times ranging from 1 sec to 120 min, particularly from 1 sec to 60 min, more particularly from 5 sec to 30 min, still more particularly from 30 sec to 30 min, and yet still more particularly from 1 min to 30 min. In yet another form of the in-line blending process embodiments disclosed herein, the residence time in the reactors disclosed herein may be less than 120, or less than 60, or less than 30, or less than 20, or less than 10, or less than 5, or less than 1 minute(s).

In certain embodiments, some or all reactor trains of the invention process operate at supercritical conditions advantageously at homogeneous supercritical conditions, or bulk homogeneous supercritical conditions. The residence times in the supercritical polymerization reactors, particularly in the bulk homogeneous supercritical reactors disclosed herein are generally lower than the residence times in solution, gas phase, and slurry processes due to the high reaction rates achieved at the conditions of the supercritical polymerization process. In-line blending processes disclosed herein applying bulk homogeneous supercritical polymerization often choose residence times between 1 and 60 min, and more particularly between 1 and 30 min.

The polymerization reactors of the monomer recycle process for fluid phase in-line polymer blending may be grouped into reactor(s) making a single blending component, called the reactor train. The reactors of the parallel reactor trains producing all the polymer blend components are referred to as reactor bank. The reactors in the individual trains and in the entire bank can be of any type useful for making polymers (for a review of different polymerization reactors see Reactor Technology by B. L. Tanny in the Encyclopedia of Polymer Sci. and Eng., Vol. 14, H. F. Mark et al., Eds., Wiley, New York, 1988, and J B P Soares, L C Simon in the Handbook of Polymer Reaction Engineering, T. Meyer and J. Keurentjes, Eds., Wiley-VCH, Weinheim, 2005, p. 365-430.) and can be constructed the same way or can be different. The optimal reactor type and configuration can be determined by standard techniques well known in the art of polymer reactor engineering.

It should be recognized that the catalytic activity and thus the volumetric productivity in the individual reactors may be different. If the reactor effluents for in-line blending are directly blended, the catalytic activity and the volumetric productivity may determine the reactor sizes required for the production of the individual polymer blend components. In order to reduce cost, a single plant may need to produce several polymer blends with different polymer components blended over a range of blend ratios. Consequently, a parallel reactor bank will often have reactors of different sizes allowing for a flexible and thus more cost effective configuration for the production of different polymer blend grades. The optimal reactor volumes may be determined from the combination of the composition of the target polymer blends and the volumetric reactor productivity data using optimization methods known in the art of chemical engineering.

In commercial practice, reactor productivity tends to vary to some degree, which in turn may lead to the corresponding level of variability in polymer blend ratios. In one embodiment, buffer tanks may be added to the process downstream of the reactors comprising the bank of parallel reactors, but before the polymer mixing or blending point to compensate for the fluctuations of the volumetric productivity in each reactor train producing the individual blend components. The buffer tanks may improve the compositional control of the final product blends by homogenizing the individual reactor effluents and by allowing a more independent metering of the polymer blend components. When an individual reactor train effluent is stored in the buffer tank in its liquid state at a pressure below its bubble point, essentially the entire volume of the buffer tank is available for compensating for the differences in the blending and production rates. However, when the individual reactor effluent is stored in the buffer tank in its supercritical state or in its liquid state but at pressures above its bubble point, the dense liquid or supercritical fluid fills the entire tank. In such operation modes, the buffering capacity, i.e. the capacity to deviate from the instant reactor flow rate, is more limited and is associated with the pressure/density changes allowed in the buffer tank and with the size of the buffer tank. In the latter case, the process streams may be driven by a gradual pressure drop downstream of the reactor to avoid the cost of installing and operating booster pumps. However, booster pumps may be alternatively installed and operated within the process to increase the pressure range and thus the buffering capacity of the system. When no booster pumps are deployed, the pressure of the buffer tank should be lower than that of the reactor, but higher than that of the lines downstream of the blending point.

Apparently, while feasible, controlling this kind of buffer system is difficult and it is not very efficient. Thus, in another embodiment, when the individual reactor effluent is stored in the buffer tank in its supercritical state or in its liquid state but at pressures above its bubble point, the conditions in the buffer tanks may be set to achieve fluid-fluid phase separation (separator-buffer tank operation). Buffering in this mode can be achieved by allowing the fluid level of the denser polymer-rich phase to move up and down between the minimum and maximum levels allowed for the desired level of separation while taking the monomer-rich upper phase out of the separator buffer via a pressure control valve. One skilled in the art can see that this operation mode is analogous to the operation of a buffer tank filled with a liquid phase containing the polymeric product and a vapor phase containing the more volatile components, such as monomer(s) and solvent(s). In the supercritical regime, the upper phase is a polymer-lean supercritical fluid, while the lower phase is a polymer-rich supercritical fluid, the latter of which can be withdrawn for blending at a controlled rate required for making a constant blend ratio, independent of the short-term fluctuations in the production ratios of the individual blend components. A similar analogy may be derived for liquid-filled operations. The polymer content, and thus the viscosity of the polymer-rich phase can be controlled by properly adjusting the temperature at constant pressure or by adjusting the pressure at constant temperature in the separator-buffer tank(s). In this embodiment, the polymer-rich effluent(s) of the separator-buffer tank(s) are combined with the direct, unseparated effluent of one of the reactor trains upstream of the separator-blending vessel that recovers the monomer of the direct reactor effluent as a supernatant and the in-line polymer blend as the bottom phase. In this particular embodiment, one of the separators serves as a separator-blender, while the rest of the separators serve as separator-buffers. Advantageously, the separator-blender is connected to a reactor train making a copolymer blending component while the separator-buffer vessels are connected to the homopolymer trains. This configuration allows the recovery and recycle of a significant portion of unmixed monomer(s) without the need for separations from monomers foreign to the corresponding polymerization train. This form of the fluid-phase in-line blending process for improved monomer recycle will be described in greater detail below under the sub-heading "Monomer Recycle Process Configuration for Use with Fluid Phase In-Line Polymer Blending."

In another embodiment of the processes disclosed herein, polymer additives may be added to the polymer blend at ratios of up to 40 wt %, or up to 30 wt %, or up to 20 wt %, or up to 10 wt %, or up to 5 wt % to further improve product quality and product properties. Exemplary, but not limiting polymer additives, include specialty polymers including polar polymers, waxes, polyalfaolefins, antioxidants, plasticizers, clarifiers, slip agents, flame retardants, heat and uv stabilizers, antiblocking agents, fillers, reinforcing fibers, antistatic agents, lubricating agents, coloring agents, foaming agents, tackifiers, organically modified clays such as are available from Southern Clay, and master batches containing above components. Hence, one or more polymer additive storage tanks containing liquid, molten, or dissolved polymer components and polymer additives may be added to the processes disclosed herein. If solvent(s) is used in these polymer additive storage tanks, it should be the same as used in the polymerization reactors previously described in order to avoid an increase in separation costs in the solvent recovery and recycle section of the process. For example, when the polymer synthesis process is performed in supercritical propylene, the off-line produced polymer additives may also be advantageously dissolved in supercritical propylene. Solvent-free introduction of the polymer additive components may be used when the additive component is brought into its molten state or when the additive component is a liquid at ambient temperatures.

The homogeneous supercritical polymerization and the solution polymerization processes are particularly suitable for providing the product polymer in a dissolved fluid state. In one particular embodiment, the supercritical polymerization process is performed in the substantial absence of an inert solvent/diluent (bulk homogeneous supercritical polymerization) and provides the product in a dissolved supercritical state for the downstream in-line separation-blending process. More particularly, the supercritical polymerization of propylene is performed in the substantial absence of an inert solvent/diluent (bulk homogeneous supercritical propylene polymerization) and provides the product in a dissolved supercritical state for the downstream in-line separation-blending process.

The total amount of inert solvents is generally not more than 80 wt % in the reactor feeds of the invention process. In some embodiments, where the feed essentially comprises the monomer or monomer blend, like for example, bulk slurry, or bulk supercritical, or bulk solution polymerizations, the minimization of solvent use is desired to reduce the cost of monomer recycling. In these cases, the typical solvent concentration in the reactor feed is often below 40 wt %, or below 30 wt %, or below 20 wt %, or below 10 wt %, or below 5 wt % or even below 1 wt %. In one form disclosed herein, the polymerization system comprises less than 40 wt % aromatic hydrocarbons and advantageously less than 40 wt % toluene. In another form disclosed herein, the polymerization system comprises less than 40 wt % saturated aliphatic hydrocarbons and advantageously less than 40 wt % of hexanes, or pentanes, or butanes, and propane, or their mixtures.

Monomer Recycle Process Configuration for Use with Fluid Phase In-Line Polymer Blending:

As previously described in Detailed Description, the improved monomer recycle process for use with the fluid phase in-line polymer blending may have different detailed process configurations. For example, the number of parallel reactor trains and their configurations in the parallel reactor bank may be varied. Typically, each reactor train serves to produce a single in-line blend component. A given train of the parallel reactor bank may be configured as a single reactor, or two or more reactors in series. From a practical commercial plant design standpoint, however, there should be a minimum number of reactors for a given train of the parallel reactor bank in order to make a given polymer blend component. Generally, not more than ten series reactors are utilized and more particularly not more than three series reactors are generally utilized in a given reactor train. The number of trains comprising the earlier-defined first (G1) and second (G2) group of reactor trains may be two, three, four or five or more in each group. The number of reactors in the parallel reactor bank comprising G1 and G2 may be any number, although for economic reasons the number of reactors should be maintained as low as the desired product grade slate and plant capacity allows. The optimum number of parallel reactor trains (also referred to as legs or branches of the reactor bank) may be determined by standard chemical engineering optimization methods well known in the art. Most typically, the polymerization-blending plant will have two or three parallel polymerization reactor trains or legs or branches in the reactor bank producing product blends with the corresponding number of in-line polymer blend components. In the embodiments of the improved recycle methods disclosed herein, the reactor trains of the in-line blending process are divided between the earlier-defined first group of reactor trains (G1) and the earlier-defined second group of reactor trains (G2). At least one of the reactor trains of the in-line blending processes employing the improved recycle methods disclosed herein belongs to the said first group of reactor trains (G1) and at least one other reactor train belongs to the said second group of reactor trains (G2). For example, and as described before, in one exemplary embodiment, the number of parallel trains in the reactor bank is two with one parallel train producing an olefin homopolymer and the second parallel train producing an olefin copolymer wherein the olefin copolymer has one comonomer in common with the monomer in the olefin homopolymer parallel train. Three or more parallel reactors/legs may be employed if the production of the target product blends so requires. Besides the in-line polymer blend components, the final polymer blends often contain additives and modifiers that are not produced within the same polymerization process. Therefore, it should be understood that the number of components in the final product polymer blend typically is higher than the number of reactor trains or the number of in-line polymer blend components.

As mentioned above, the fluid phase in-line blending processes for use with the monomer recycle processes disclosed herein may also optionally incorporate other polymers, and polymer additives that were produced outside the reactor bank of the processes disclosed herein. The optional other polymer and polymer additive components may first be transferred into solution or molten fluid state before being blended with the in-line produced polymer blend components. These other polymer and polymer additive components may be stored in polymer additive storage tanks containing liquid, molten, or dissolved polymer components and polymer additives prior to being transferred and metered to the separation-blending vessel (if dissolved in a monomer solvent common to the homopolymerization and copolymerization trains) or to a mixing point upstream (if again dissolved in a monomer solvent common to the homopolymerization and copolymerization trains) or downstream of the separation-blending vessels. Polymer and polymer additive components may be accurately metered to the blending vessel or to another mixing point by one or more pumps or if the downstream pressure is lower, through the use of one or more pressure letdown valves. The optional additives and modifiers can be mixed into the product upstream of or directly in the separator-blending vessel or downstream of the separator-blending vessel of the processes disclosed herein. In order to simplify monomer treatment in the monomer recycle train and thus to reduce the cost of monomer recycle, it is often advantageous to add the additives and modifiers downstream of the separator-blending vessel. In such embodiments, the additives and modifiers may be mixed with the in-line produced polymer blend in dedicated pieces of equipment or in the hardware of the product finishing section of the processes disclosed herein, for example, in the devolatizer extruders.

Figure 5:
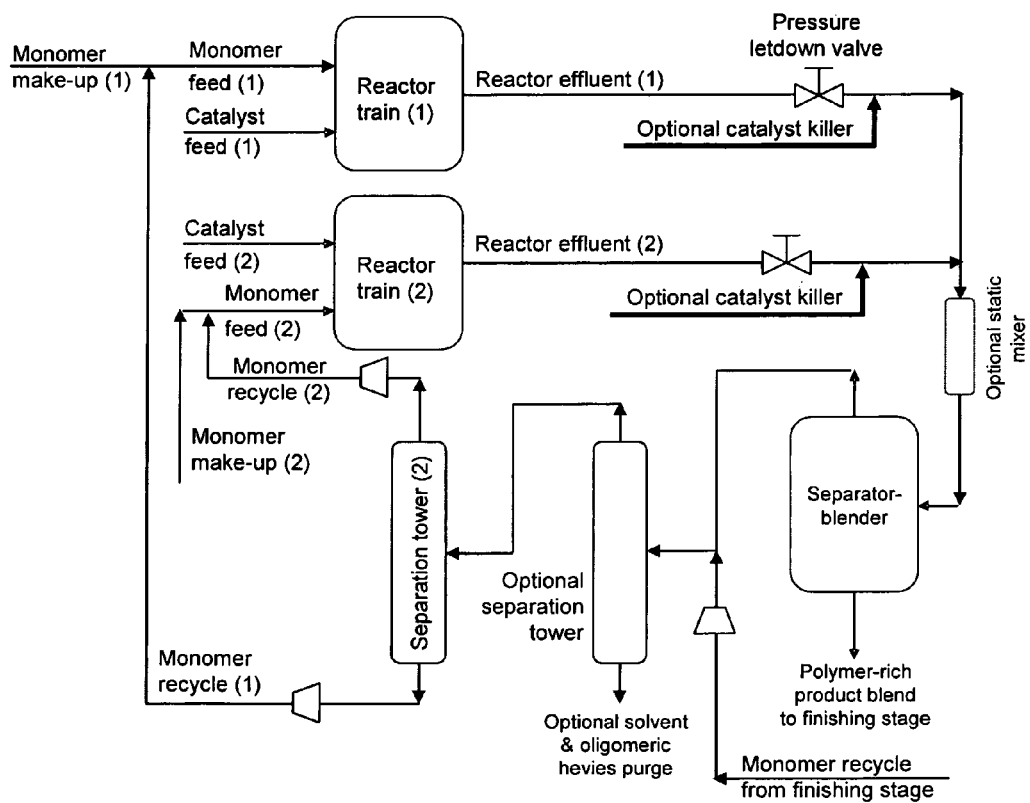
FIG. 5 presents a prior art monomer recycle process with full recovery of individual monomer components used in conjunction with a fluid phase in-line polymer blending process.

FIG. 5 exemplifies the prior art recycle process with two reactor trains (1 and 2) in which the effluents of the two reactor trains are brought to the separator-blender for recovering the bulk of the monomers present in the combined effluents of the two reactor trains. The polymer-rich effluent of the separator-blender containing the in-line polymer blend components is sent to the finishing stage to remove the remaining monomers and other volatiles before recovering the in-line polymer blend in a form suitable for shipping and sales. The monomer-rich effluent of the separator-blender is sent to a cryogenic separation section to recover the individual monomer components before recycling them to Reactor trains 1 and 2. The distillation train also employs a tower or a knock-out vessel to separate a heavy purge stream that comprises solvents, oligomeric side products, excess catalyst killers, etc. The distinctive feature of this prior art form is the application of one or more cryogenic distillation towers to enable the rebalancing of the monomer feeds thus rendering the compositions of the feeds to Reactor trains 1 and 2 suitable for making the desired in-line polymer blending components. This separation step is costly because it requires one or more refrigerated (or chilled) towers to fractionate the two or more monomers in the combined monomer recycle stream based upon differences in boiling point temperatures (FIG. 5 exemplifies a case for two monomers separated in Separation tower (2)). It should be understood that the exemplary process scheme depicted in FIG. 5 serves only to highlight the differences between the prior art processes and thus is a simplified conceptual version of the processes encompassing prior art recycle methods.

Figure 3:
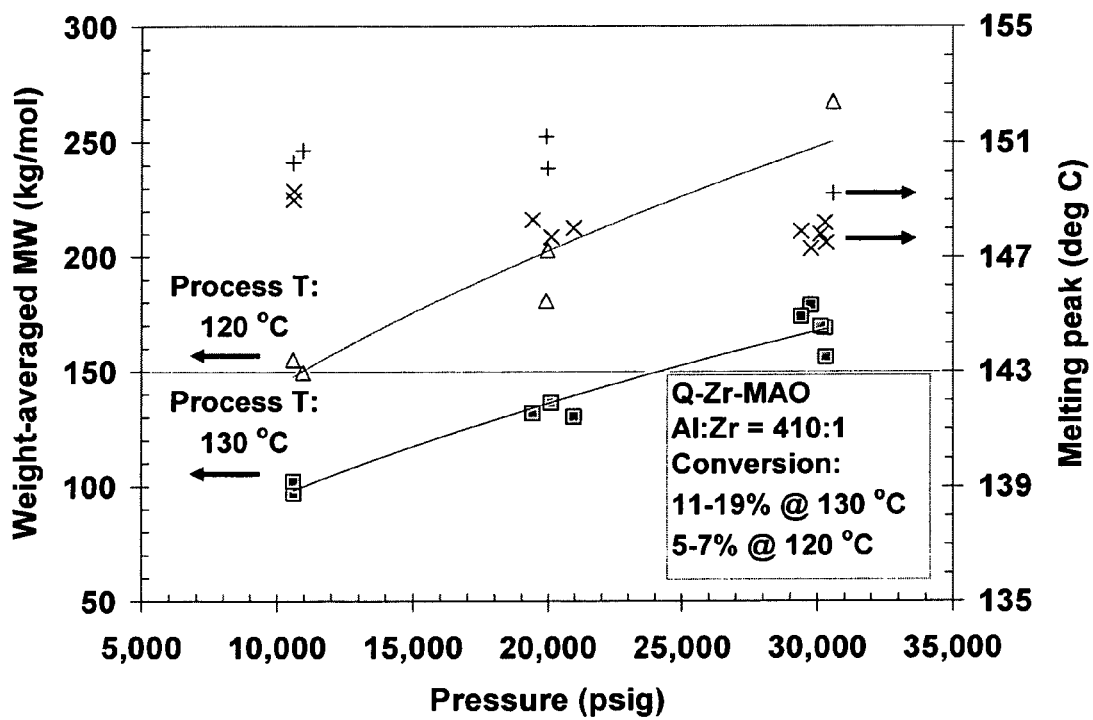
FIG. 3 presents the effect of polymerization pressure on the molecular weight and melting point of polypropylene made in supercritical propylene using MAO-activated (µ-dimethylsilyl)bis(2-methyl-4-phenylindenyl)zirconium dichloride (Q-Zr-MAO) catalyst at 120 and 130° C.
Figure 6:
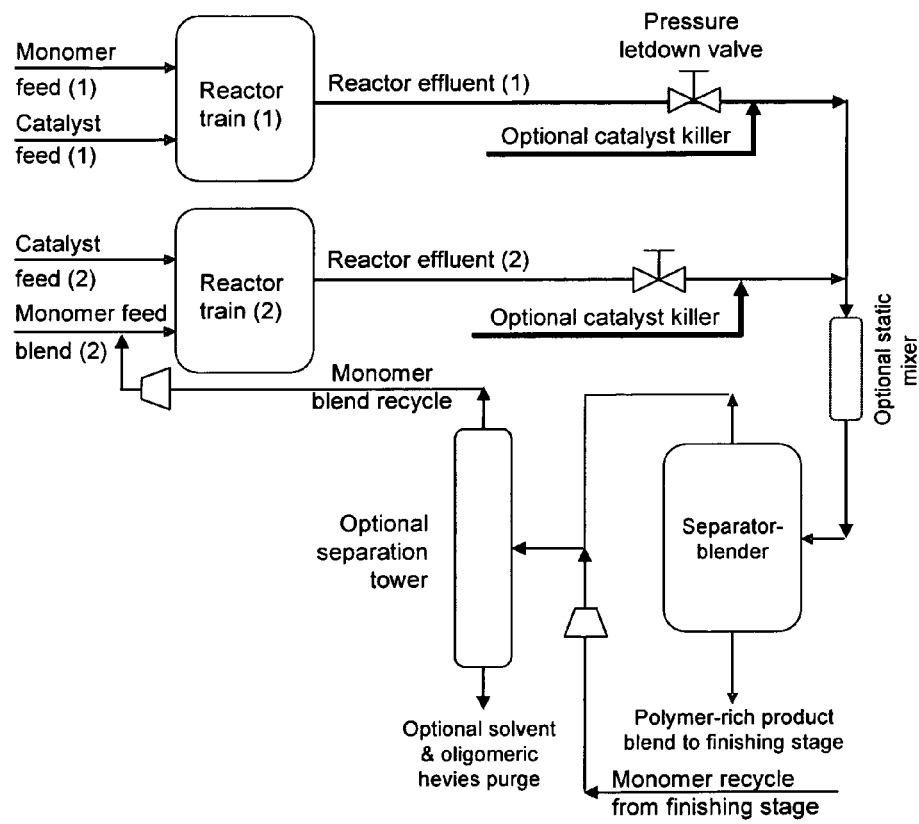
FIG. 6 presents an exemplary monomer recycle process for fluid phase in-line blending of polymers with one separator vessel (separator-blender), the combined monomer recycle stream of reactor trains (1) and (2) recycled to train (2) without recovering individual monomer components.

FIG. 6 exemplifies the embodiments in which the monomer components in the effluent of Reactor (1) are all present also in Reactor effluent (2) and the monomer flows in Reactor effluent (1) are not higher than the purge rates plus the conversion rates of the corresponding monomers in Reactor (2). As described earlier in detail, such embodiments allow the recycle of the combined monomer flows of Reactor effluents (1) and (2) to Reactor (2) without building an excess inventory of any of the monomers present in Reactors (1) and (2). The polymer-containing unreduced Reactor effluents (1) and (2) are optionally treated with catalyst killers to stop the polymerization downstream of the reactor, where the conditions are not the same as those in the reactors and thus would yield polymer fractions with different polymer properties (c.f. FIGS. 2, 3, and 4). Such polymer fractions may lead to undesired changes in the performance of the final polymer blend product and thus the application of catalyst killers may be advantageous. Although in FIG. 6 the optional catalyst killers are added to the reactor effluents after the pressure letdown valves, they can be added to the reactor effluents at any point of the process downstream of the reactors. Thus, certain embodiments would add the catalyst killer at the exit of the reactor or some other parts of the process. Also, catalyst killers may be introduced at multiple injection ports to improve their efficiency or to control their stoichiometry if so desired. Reactor effluents (1) and (2) are brought to the high-pressure separator, called Separator-blender, optionally via one or more static mixers for polymer-monomer separation and for polymer-polymer blending. Optionally (not shown in FIG. 6), one or both of the reactor train effluents may be heated before the pressure letdown in order to maintain the temperature in the downstream lines and in the Separator-blender at the desired value, i.e., above the solid-fluid phase transition temperature of the polymer-rich phase but below the cloud point of the streams entering the separators, including the separator-blender, to allow the formation of a polymer-rich denser fluid phase and a monomer-rich lighter fluid phase. The Separator-blender recovers a monomer-rich phase that is recycled to Reactor (2). As depicted in FIG. 6, this monomer recycle stream may be combined with other monomer-rich streams recovered downstream of the Separator-blender in the product finishing stage. Since the low-pressure separators downstream of the Separator-blender operate at lower pressure than the Separator-blender, the streams recovered from those separators and in the finishing section are pressurized before they are combined with the monomer-rich stream emerging from the Separator-blender. The monomer recycle streams (or as depicted in FIG. 6, the single combined monomer recycle stream) may be optionally passed through a separation tower or knock-out pot that removes a heavy purge stream comprising undesired heavy components present in the recovered monomer recycle streams, such as oligomeric heavies, excess solvent and/or catalyst killer, etc. Not shown in FIG. 6, a light purge stream may also be optionally removed from the monomer recycle stream going to Reactor (2) to control the buildup of light inert components, like methane, ethane, propane, nitrogen, etc., typically introduced with the monomer feeds as impurities. The optional light purge stream may be advantageously taken from the low-pressure monomer recoveries in the finishing section thus saving the compression cost associated with bringing the lower-pressure streams to the pressure of Monomer blend recycle stream. Before feeding the optionally purified Monomer blend recycle stream to Reactor (2), it is pumped to the pressure of the fresh reactor feed. Note that Reactor (1) receives only fresh feeds, while Reactor (2) receives fresh makeup monomer feeds and the Monomer blend recycle stream. Both reactors also receive catalyst feeds.

Figure 7:
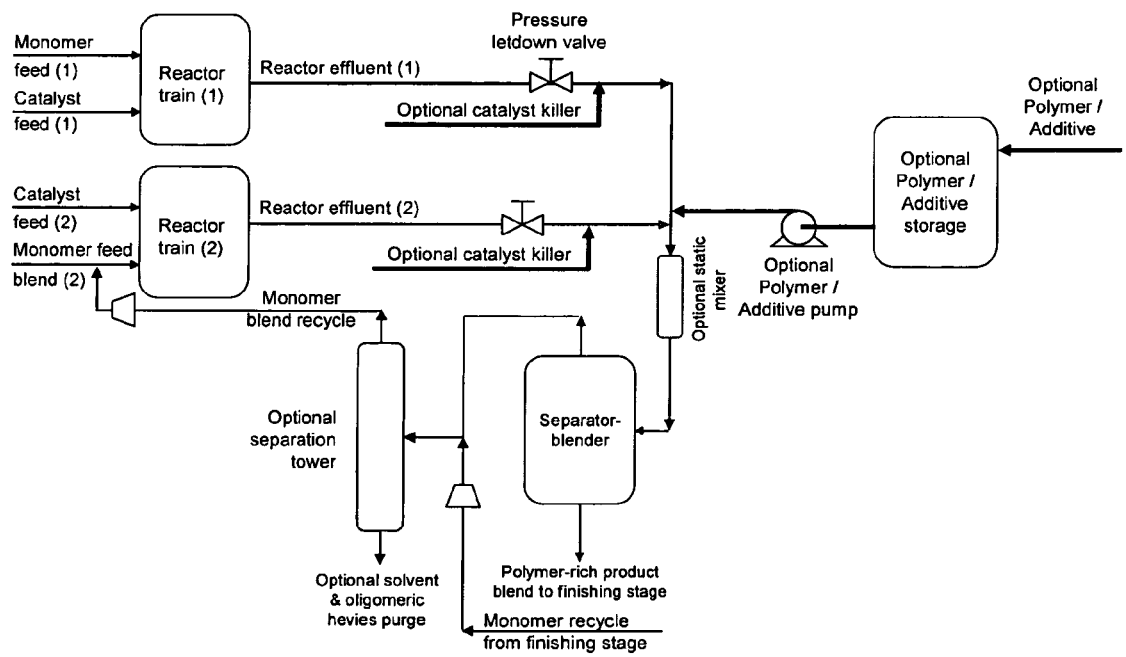
FIG. 7 presents an exemplary monomer recycle process for fluid phase in-line blending of polymers with one separator vessel (separator-blender) and with additive/polymer blending component option, the combined monomer recycle stream of reactor trains (1) and (2) recycled to train (2) without recovering individual monomer components.

FIG. 7 exemplifies the same process scenario as described above for the process shown in FIG. 6, except that facilities are provided for feeding optional polymer and other additives to the product stream. FIG. 7 shows an example in which the additives are all introduced at one point, upstream of the optional static mixer. It should be understood, however, that the processes disclosed herein may introduce additives at multiple points and may also introduce them at one or more points anywhere downstream of the first pressure letdown valves after the polymerization reactors. The point of introduction of additives is selected based on the best engineering compromise between easier mixing in the presence of viscosity-reducing light components, such as the monomers, and simpler, more robust monomer recycle achieved when the additives are introduced closer to the final finishing step thus reducing their carryover into the monomer recycle streams or even avoiding that carryover altogether by introducing them downstream of the recovery of the last monomer recycle stream. Naturally, the optimum point will also depend on the nature of the additives. Some, like polymers, would be carried with the polymer-rich fraction and would not harm the catalyst, thus advantageously are introduced more upstream. Some, particularly inhibitors, could harm the catalyst, and thus care must be taken with their introduction to avoid negative impact on catalyst activity and the overall process stability.

Figure 8:
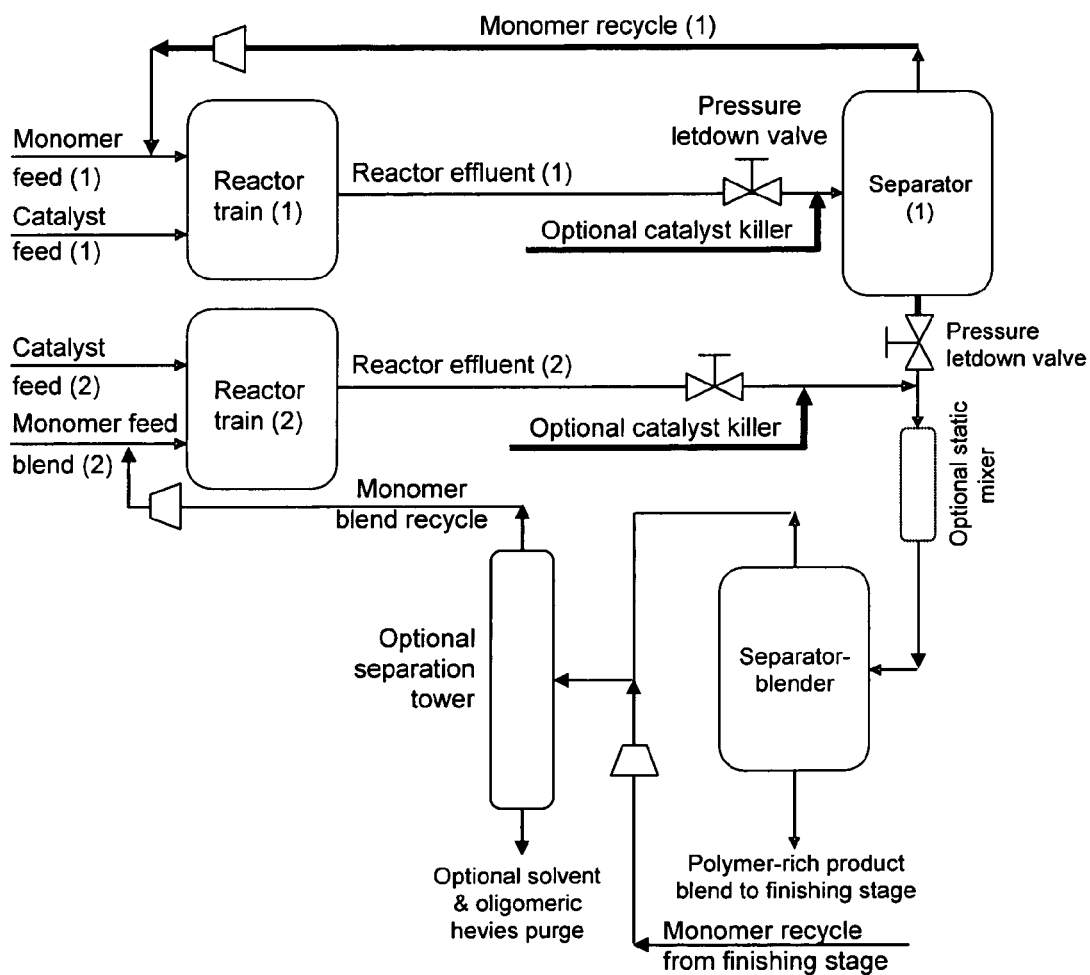
FIG. 8 presents an exemplary monomer recycle process for fluid phase in-line blending of polymers with two separation vessels.

FIG. 8 depicts another exemplary embodiment of the monomer recycle process for use with fluid phase in-line polymer blending disclosed herein in which there are two parallel Reactor trains (1 and 2). Reactor train 1, representing G1, has a dedicated separator vessel (Separator (1)) and may be used to produce, for example, an olefin homopolymer (for example polypropylene, polyethylene or polybutene). It may also produce a copolymer, for example ethylene-propylene or ethylene-hexene-1, etc. However, in the latter case, Reactor (2) needs to have at least three monomers, two of which need to be common with the two used in Reactor (1). Reactor (2), representing G2, has a separator-blender associated with it where the polymer-rich phases from the two parallel reactor trains are combined. In this embodiment, Reactor effluent (1) delivers more monomer than what is purged from the process plus consumed in Reactor train (2) of the same monomer. Thus, a (G1) single-stream high-pressure separator (Separator (1)) employed to recover the excess monomer flow as a monomer-rich stream from the Reactor effluent (1) and thus to balance the monomer recycle streams to avoid the buildup of excess monomers in Reactor (2). The monomer-rich phase recovered in Separator (1) is recycled to Reactor (1). In order to control the rate of monomer recovery in Separator (1), it typically operates at a somewhat higher pressure than the one downstream high-pressure separator that serves both as a separator and as a blender (Separator-blender). Therefore, there is an optional pressure letdown valve between Separator (1) and the Separator-blender. Catalyst killing agent may be optionally introduced prior to or into Separator 1 and/or the Separator-blender to minimize further polymerization outside the polymerization reactors. Optionally, one or more static mixers positioned before the Separator-blender vessel, but downstream of the mixing point, may be utilized to enhance mixing between the polymer-rich phases of Reactor trains (1) and (2) associated with the Separator-blender. Optionally (not shown in FIG. 8), one or both of the reactor train effluents may be heated before the first pressure letdown in order to maintain the temperature in the downstream lines and in the separators, including the separation-blending vessel, at the desired value, i.e., above the solid-fluid phase transition temperatures of the polymer-rich phases but below the cloud point of the streams entering the separators, including the separator-blender, to allow the formation of polymer-enriched or polymer-rich denser fluid phases and monomer-rich lighter fluid phases. The process of this embodiment may be advantageous in the production of polymer blends since the monomer(s) recovered in the separator dedicated to G1 may be recycled to the corresponding G1 reactor train(s) without the complex separation from other monomers as was associated with single separation-blending vessel operation previously described in FIG. 5. Hence, one advantage of this embodiment is that monomer recycle is simplified and thus affords lower cost in the monomer recycle loop. While multiple separation vessel operation increases cost in the separator section, it adds flexibility and reduces costs in the monomer recycle loops. As mentioned before, the novel application of G1 separators disclosed herein is advantageous because it applies lower-cost monomer recovery by phase separation performed before monomer pools are merged to balance monomer streams in the recycle loop as opposed to the prior art cryogenic separation necessary once the monomer pools merged. It should be understood that for the sake of avoiding unnecessary complexity of the examples provided herein, the process depicted in FIG. 8 has only one train in both groups (G1 and G2) of reactor trains. However, the operations for multiple parallel trains in either or both groups of reactor trains can be readily derived from the scheme shown in FIG. 8.

Referring again to FIG. 8, Separator (1) separates a monomer-rich phase from a polymer-rich phase for Reactor train (1). Reactor train (1) typically makes one or more olefin-based homopolymers, although in general, one or more trains of G1 may also produce copolymers with two or more monomers. In the specific case depicted in FIG. 8, the monomer-rich phase from Separator (1) is recycled directly to Reactor train (1) without the need for one or more separation towers and the associated costs and complexity. The polymer-enriched phase from Separator (1) is combined with Reactor effluent (2) emerging from Reactor train (2) and then fed to the Separator-blender. Reactor train (2) is typically producing an olefin-based copolymer the monomer pool of which comprises at least all the monomers of Reactor train (1) (but may have a larger monomer pool than the monomer pool of G1). In the specific embodiment shown in FIG. 8, the Separator-blender separates a monomer-rich phase containing residual monomer from Reactor train (1) and comonomers from Reactor train (2) from the polymer-rich blend phase containing a blend of olefin based homopolymer and olefin based copolymer. In cases when Reactor train (1) comprises two or more reactor trains (not shown in FIG. 8) and two or more of them uses the same monomer pool, the effluents of the trains with the same monomer pools may optionally be combined before the said effluents are sent to the G1 phase separator for partial monomer recovery and recycle to one or more of the corresponding trains in G1. It should be noted that as other trains in G1, the monomer pools of said parallel reactor trains with the same monomer pool may have not only one, but also more than one members. A special case of the above configuration is when all reactor trains of G1 have the same monomer pool. In these embodiments the effluents of all G1 reactor trains may optionally be combined before bringing them for partial monomer recovery for recycle to G1.

As shown in FIG. 8, the monomer-rich phase emerging from the Separator-blender may be fed to a single separation tower or knock-out pot to remove undesired heavy components, such as excess solvent and catalyst killer, oligomeric side-products, etc. from the monomer recycle stream at the bottom of the said tower or knock-out pot. The monomer stream emerging from the top of the tower is then recycled back to the copolymerization Reactor train (2). Optionally (not shown in FIG. 8), a light purge stream can also be removed from the recycle stream before feeding it to Reactor (2). Advantageously, light purge streams may also be taken from the streams emerging downstream of the Separator-blender. Such purge configuration can reduce the compression cost associated with bringing the monomer recycle streams recovered in the finishing section to the pressure of the optional heavies separation tower/Monomer blend recycle stream. Overall, the embodiment depicted in FIG. 8 may be more complicated and higher cost in the separator section relative to FIG. 5, but may be simpler and lower cost in the monomer recycle loops because of the decreased need for separation towers.

Figure 9:
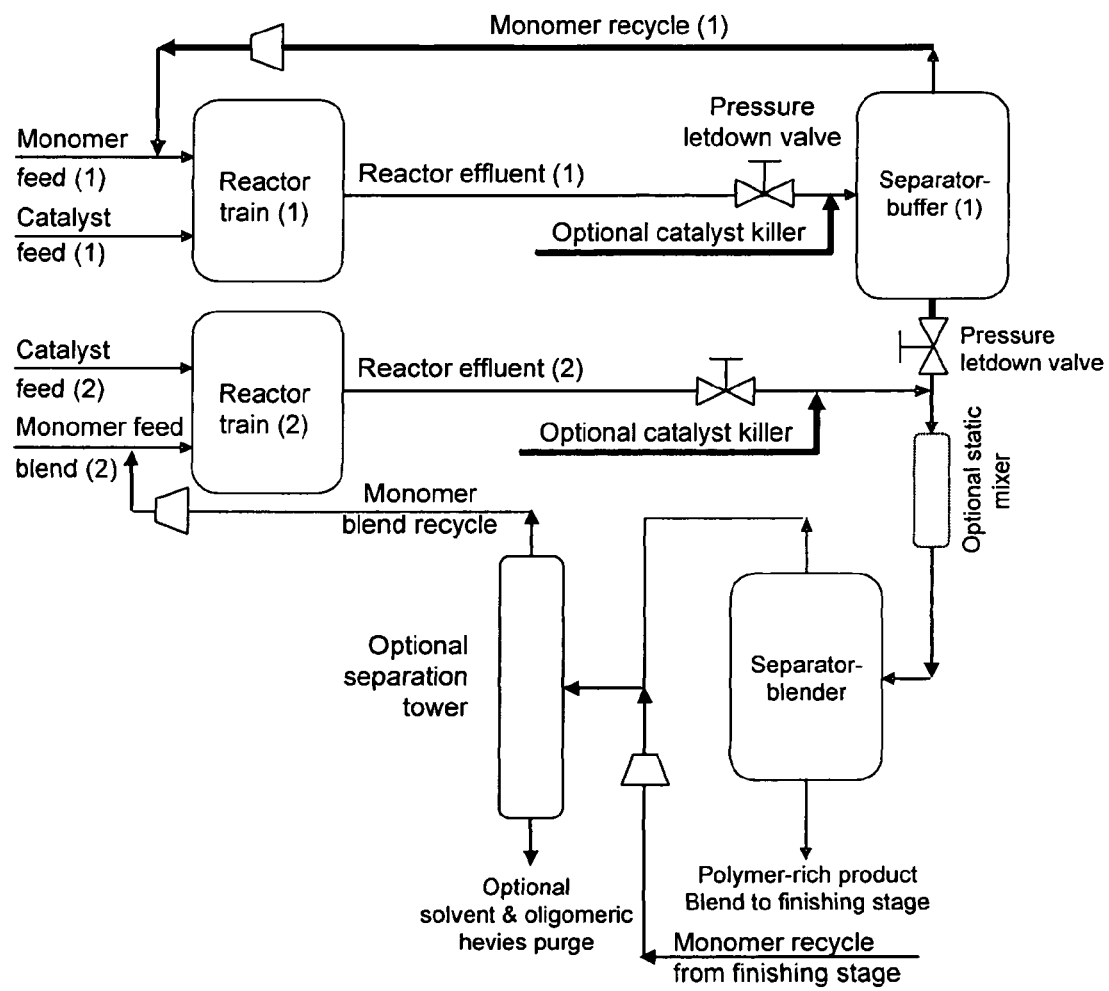
FIG. 9 presents another exemplary monomer recycle process for fluid phase in-line blending of polymers with two separation vessels with a product effluent buffer tank that also serves as monomer/product separator for improved blend ratio control.

FIG. 9 depicts an embodiment that is configured and operates as the process shown in FIG. 8, except that the separator serving Reactor train (1) serves also as a buffer vessel. The use and operation of separators as buffer vessels is described in detail in U.S. Patent Application No. 60/876,193, incorporated herein in its entirety.

Figure 10:
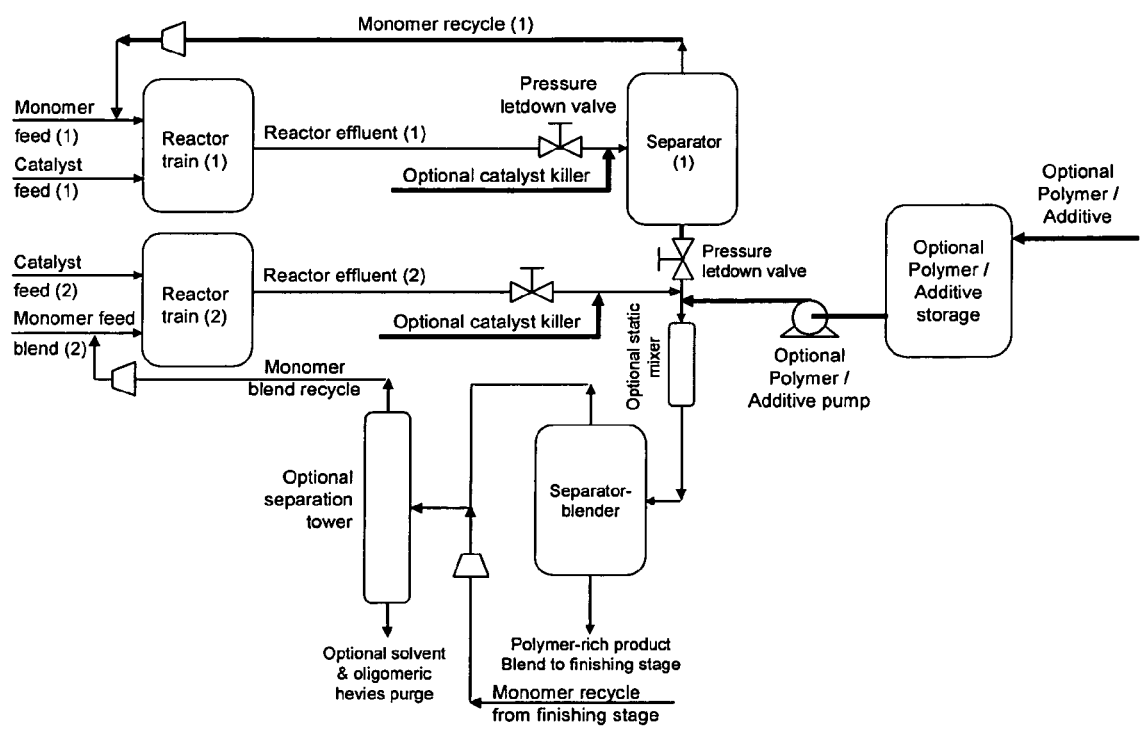
FIG. 10 presents an exemplary monomer recycle process for fluid phase in-line blending of polymers with two separation vessels and with additive/polymer blending component option.
Figure 11:
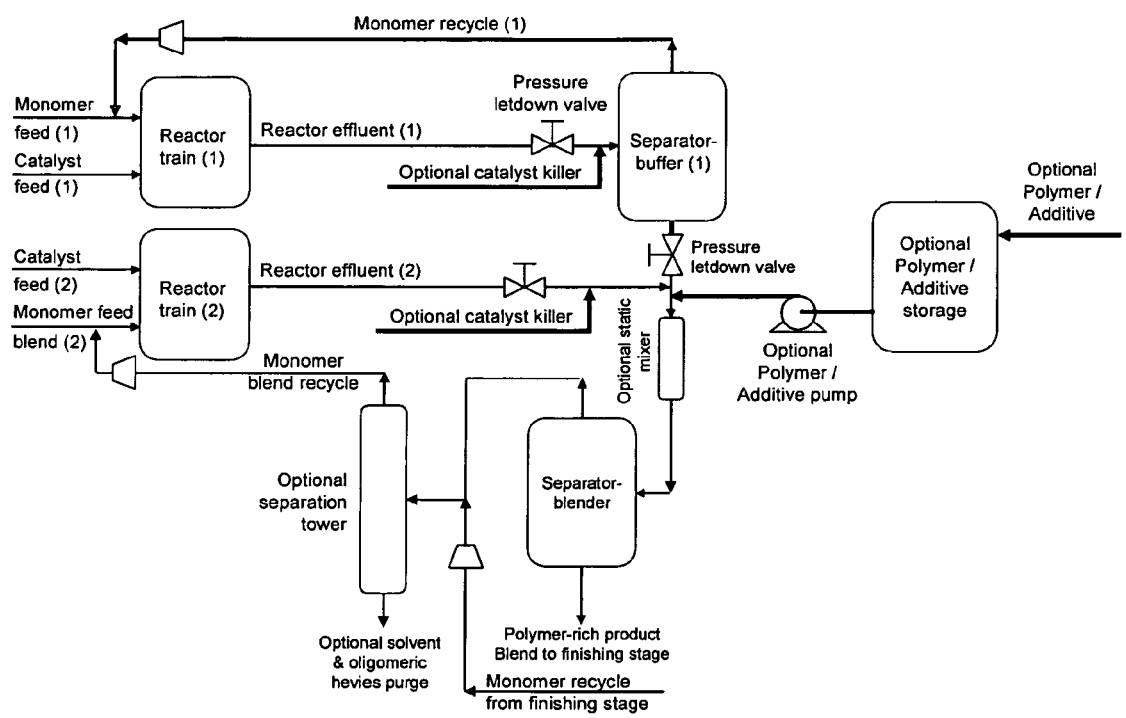
FIG. 11 presents an exemplary monomer recycle process for fluid phase in-line blending of polymers with two separation vessels, one also serving as buffer, and with additive/polymer blending component option.
Figure 12:
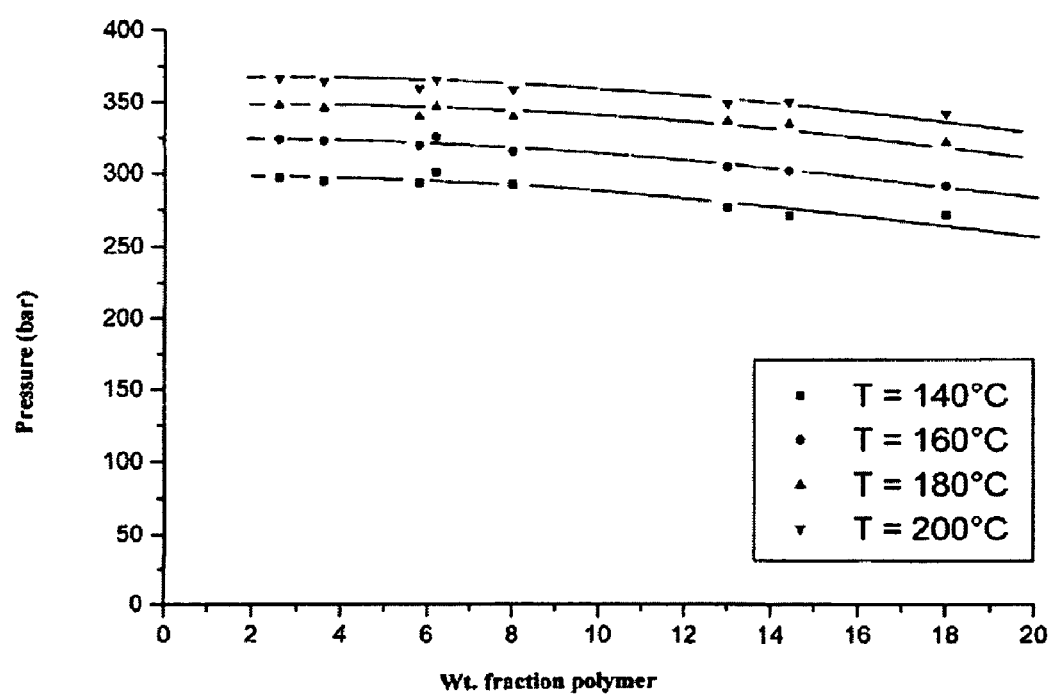
FIG. 12 presents cloud point isotherms for Polymer Achieve™ 1635.
Figure 13:
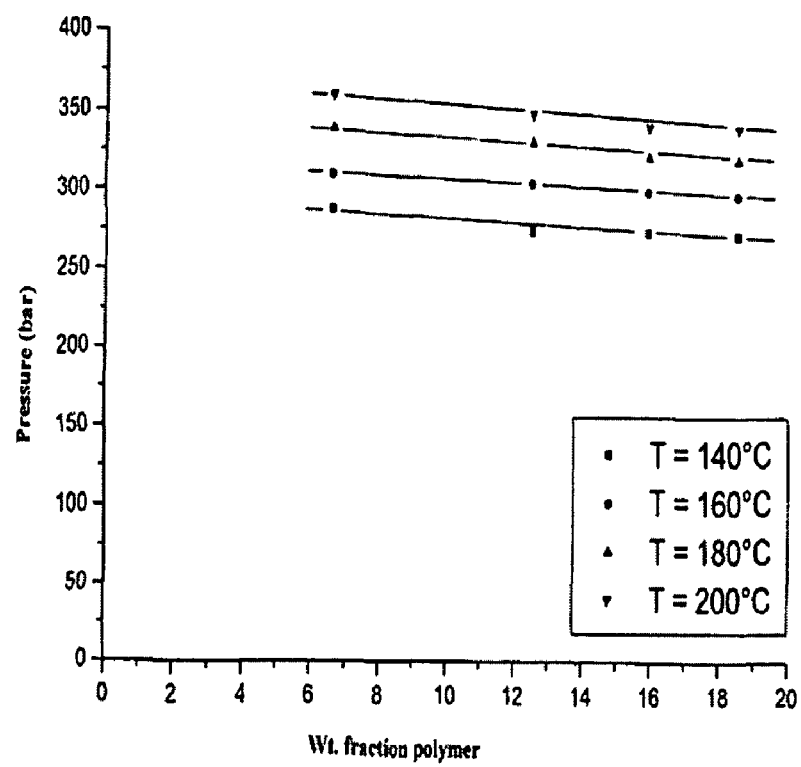
FIG. 13 presents cloud point isotherms for Polymer PP 45379 dissolved in bulk propylene.
Figure 14:
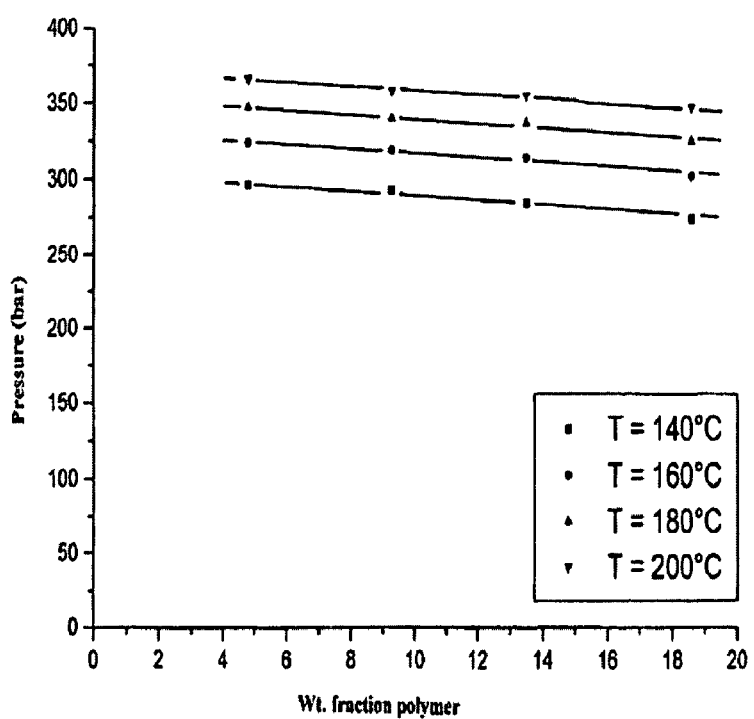
FIG. 14 presents cloud point isotherms for Polymer PP 4062 dissolved in bulk propylene.
Figure 15:
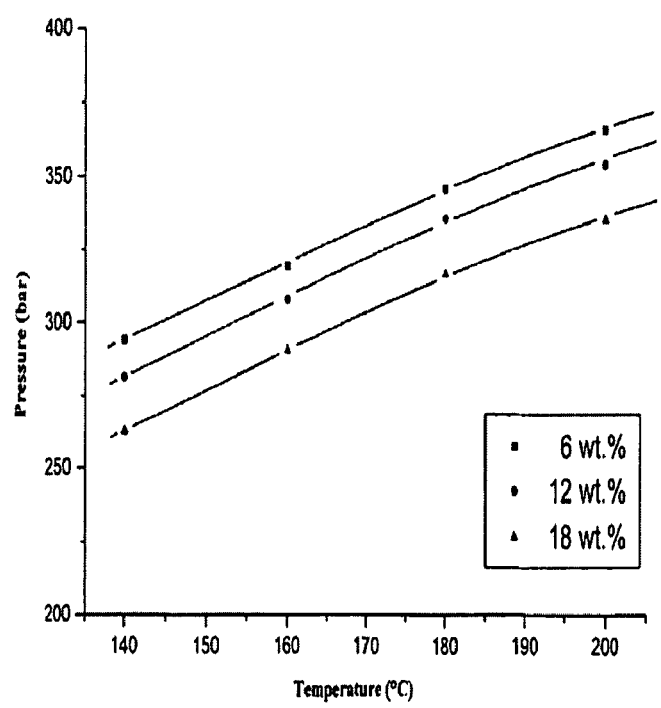
FIG. 15 presents cloud point isotherms for Polymer Achieve™ 1635 dissolved in bulk propylene.
Figure 16:
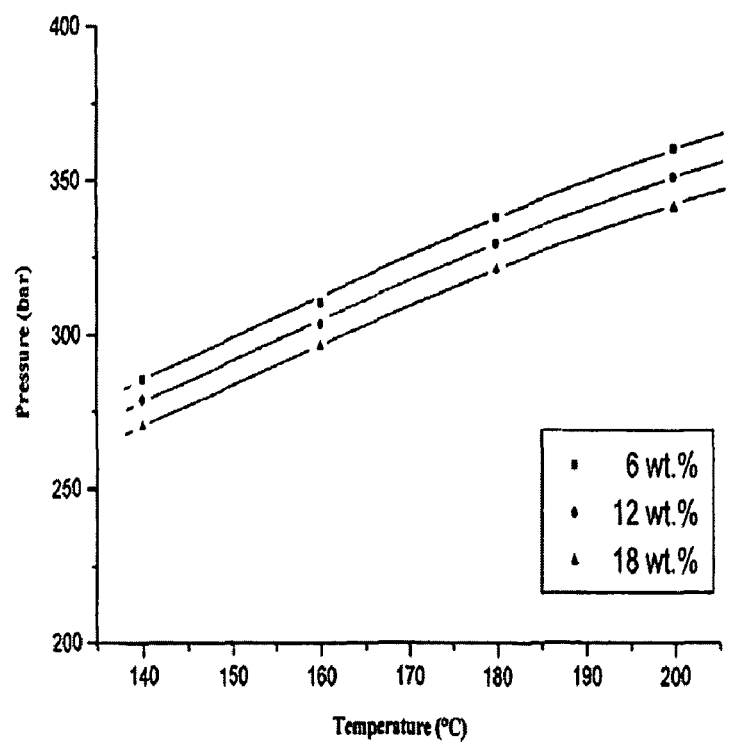
FIG. 16 presents cloud point isotherms for Polymer PP 45379 dissolved in bulk propylene.
Figure 17:
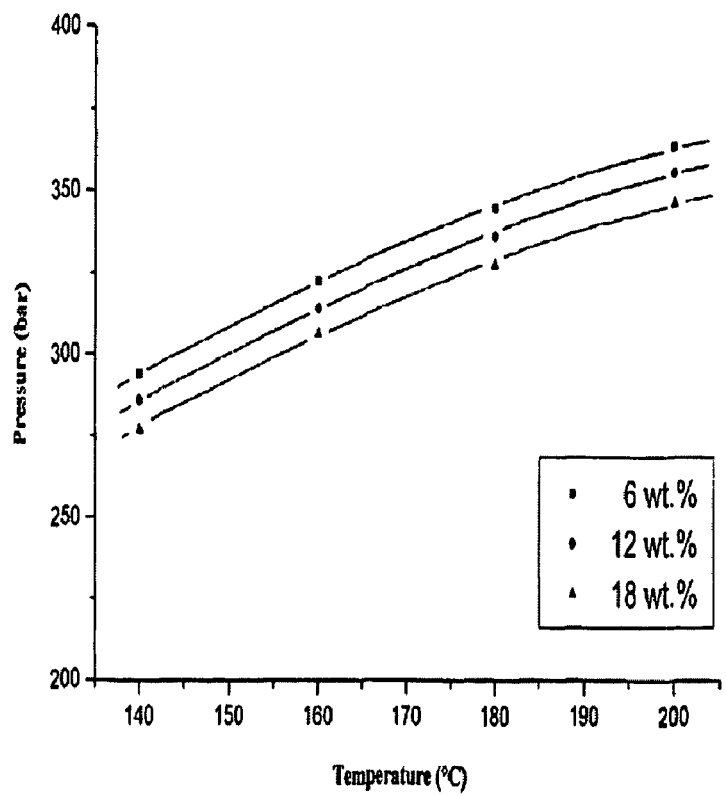
FIG. 17 presents cloud point isotherms for Polymer PP 4062 dissolved in bulk propylene.
Figure 18:
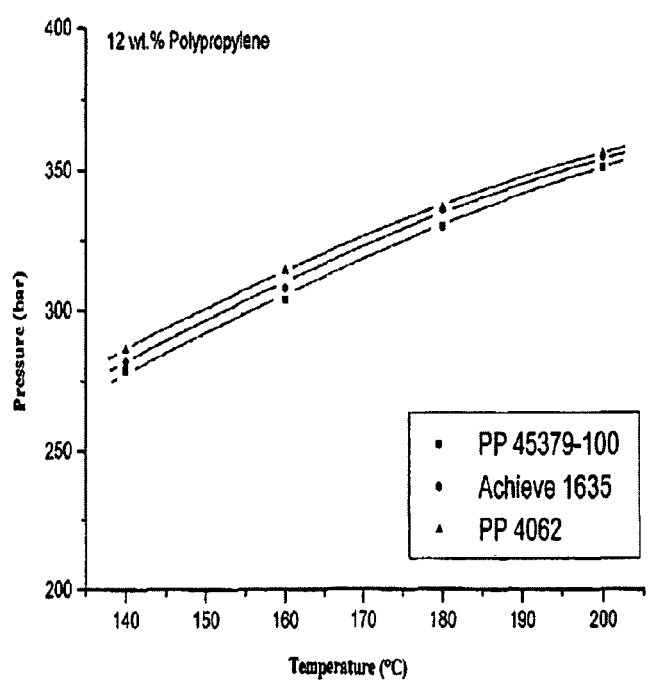
FIG. 18 presents a comparison of isopleths for PP 45379, Achieve™ 1635, and PP 4062 dissolved in bulk propylene.
Figure 19:
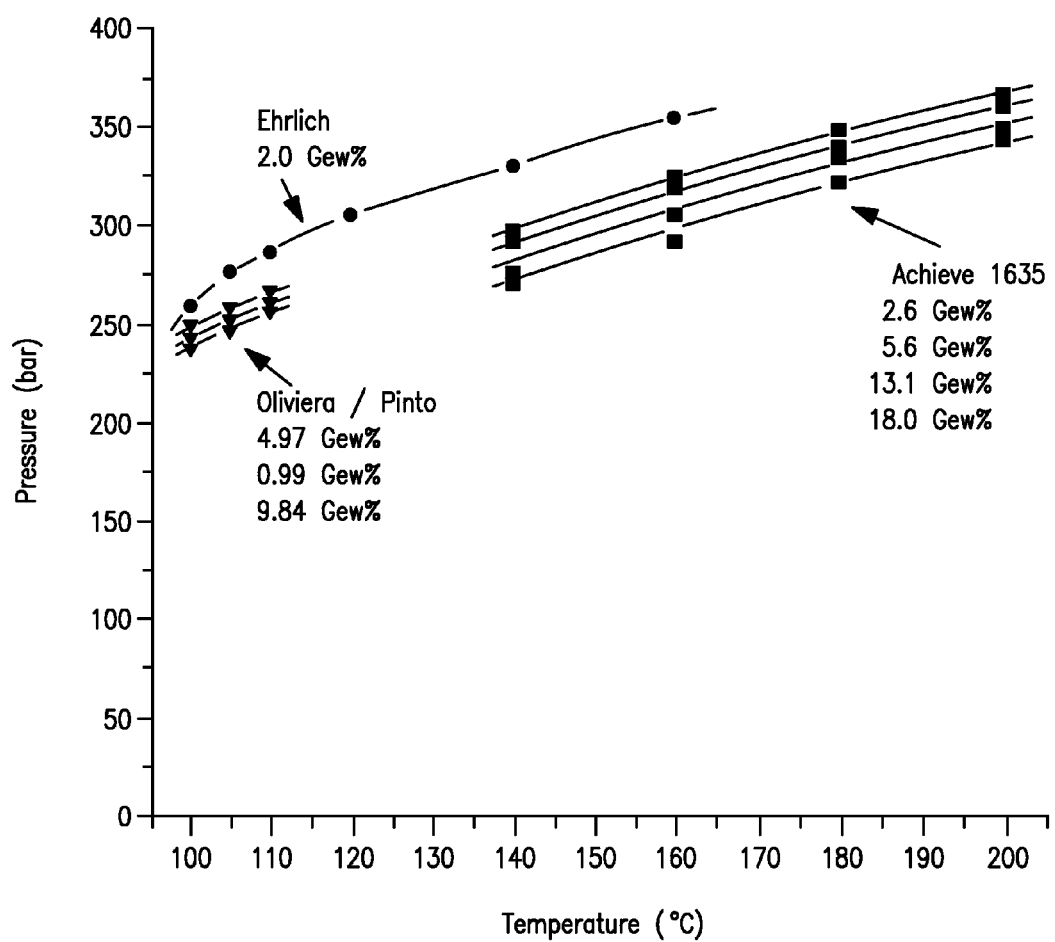
FIG. 19 presents a comparison of isopleths for Achieve™ 1635 and literature data as described in J. Vladimir Oliveira, C. Dariva and J. C. Pinto, Ind. Eng. Chem. Res. 29, 2000, 4627.
Figure 20:
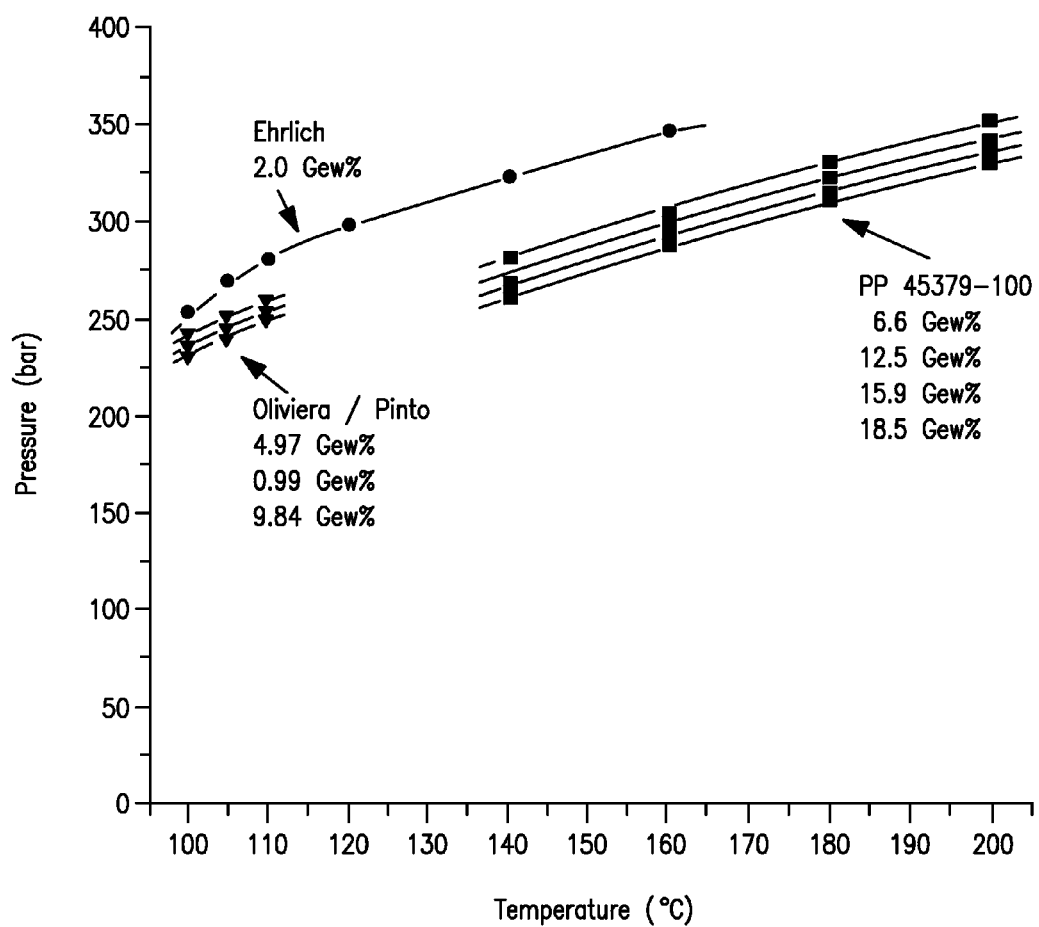
FIG. 20 presents a comparison of isopleths for PP 45379 and literature data as described in J. Vladimir Oliveira, C. Dariva and J. C. Pinto, Ind. Eng. Chem. Res. 29 (2000), 4627.
Figure 21:
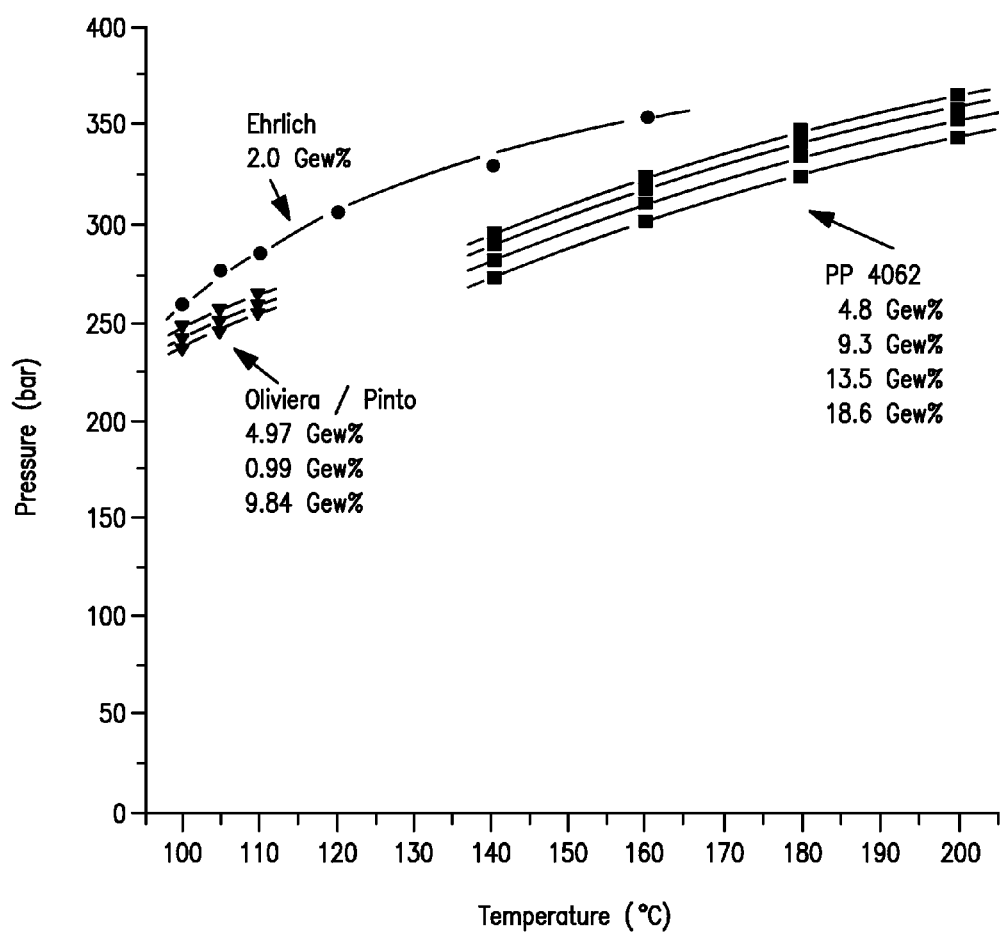
FIG. 21 presents a comparison of isopleths for PP 4062 and literature data as described in J. Vladimir Oliveira, C. Dariva and J. C. Pinto, Ind. Eng, Chem. Res. 29, 2000, 4627.

FIGS. 10 and 11 show specific embodiments that operate as the processes demonstrated in FIG. 8 or 9, respectively, except for the facilities for storing and feeding polymeric and other additives in solution or in molten form for blending with the polymer blend product made by the process. The processes in FIGS. 10 and 11 bring in the additives upstream of the optional static mixer. In practice, additives may be blended in at different points downstream of the reactor trains and may be mixed in at one or more than one locations. Generally, the earlier, i.e., the further upstream, these additives are mixed with the process streams, the easier the mixing is due to the lower viscosity of the process streams. However, many of the additives may be poisonous to the catalyst or may cause other complications in the operations of the in-line blending process. For that reason, they may be brought in later, i.e., further downstream, to minimize or even eliminate the possibility of such negative process impacts. As it will be appreciated by those experienced in the art of polymerization technology, the optimal mixing point for additives is specific to the additive-process combinations and can be determined by applying standard chemical and polymer engineering methods.

As will be appreciated by one skilled in the art of chemical engineering, the process schematic details of the design of the monomer recycle processes for use with fluid phase in-line polymer blending disclosed herein in terms of reactor configuration, separator configuration, valving, heat management, etc. may be set differently without deviating from the spirit of the monomer recycle and in-line blending processes disclosed herein. The choice between different embodiments of the processes disclosed herein will be driven by product performance requirements and process economics, which can be readily determined by standard engineering techniques. However, the monomer recycle processes for use with fluid phase in-line polymer blending disclosed herein are advantageous-relative to the prior art by the virtue of reduced capital costs for monomer separation towers, reduced operating costs due to reduced utility expenses, and reduced maintenance costs due to process simplification while still maintaining all the benefits associated with in-line polymer blending (reduced blending cost due to savings in investment and operation costs, and enabling well-controlled and cost-effective molecular-level blending to yield enhanced polymer blend performance).

The processes disclosed herein provide an effective recycle pathway for making in-line polymer blends made by homogeneous olefin polymerization processes, particularly for bulk homogeneous polymerization processes, such as bulk supercritical and bulk solution olefin polymerization, an example of which is bulk homogeneous supercritical propylene polymerization in combination with propylene-ethylene or propylene-butene-1 or propylene-hexene-1 or propylene-octene-1, etc. copolymerization. As will be discussed in more detail below, the efficient separation of monomer and polymer is achieved by advantageously utilizing the cloud point pressure and temperature relationships for the relevant (polymer/olefinic monomer) or (copolymer/olefinic monomer blend); e.g. (polypropylene/propylene monomer), (ethylene-propylene copolymer/ethylene-propylene monomer blend), etc. mixtures.

For illustration, cloud point curves are shown in FIGS. 12-21 for three different polypropylene samples having different molecular weights and crystallinities dissolved in propylene (at 18 wt %). (Achieve 1635 PP is a commercially available metallocene-catalyzed isotactic polypropylene having a Melt Flow Rate, MFR, ($I_{10}/I_2$-ASTM 1238, 230° C., 2.16 kg) of 32 dg/min (dg=decigram=0.1 g) available from ExxonMobil Chemical Company, Houston, Tex. ESCORENE PP 4062 is a commercially available isotactic polypropylene having an MFR of 3.7 dg/min, available from ExxonMobil Chemical Company, Houston, Tex. PP 45379 is an isotactic polypropylene having an MFR of 300 dg/min produced using a supported metallocene in a slurry polymerization process.

Polymer Blend Formulations and Products:

Many different types of polymer blends may be made by the monomer recycle processes for use with fluid phase in-line polymer blending disclosed herein. A major fraction of a blend is defined as 50% or more by weight of the blend. A minor fraction of a blend is defined as less than 50% by weight of the blend. The monomer recycle processes for use with fluid phase in-line polymer blending disclosed herein are advantageous for producing olefin-based polymer blends in which the polymers can be divided into two groups, P1 and P2, for which the following conditions satisfied:

$$N(P1+P2)=N(P2) \text{ and } N(P2) \geqq N(P1)$$

where N(P1+P2) is the number of monomers in the combined monomer pool of P1 and P2 polymer groups, and N(P1) and N(P2) are the number of monomers in the first (P1) and second (P2) group of polymers, respectively.

In particular, the monomer recycle processes for use with fluid phase in-line polymer blending disclosed herein are advantageous for producing olefin based polymer blends of a homopolymer and a copolymer or blends of a homopolymer and terpolymer or blends of a copolymer and a terpolymer, etc. Still more particularly, the monomer recycle processes for use with fluid phase in-line polymer blending disclosed herein are advantageous for producing olefin based polymer blends of a homopolymer and a copolymer wherein the homopolymer and copolymer have a common monomer. That is the number of feed monomers of the copolymerization reactor train is equal to the number of feed monomers of the combined homo- and copolymerization reactor trains. Non-limiting exemplary homopolymer-copolymer blends include polypropylene (PP) homopolymer—ethylene-propylene (EP) copolymer, PP homopolymer—propylene-butene-1 (PB) copolymer, polyethylene (PE)—EP copolymer, polybutene—PB copolymer, polybutene—ethylene-butene-1 copolymer, etc.

The monomer recycle processes for use with fluid phase in-line polymer blending disclosed herein are also advantageous for producing olefin based polymer blends of a homopolymer or a copolymer and a terpolymer. Still more particularly, the monomer recycle processes for use with fluid phase in-line polymer blending disclosed herein are advantageous for producing olefin-based polymer blends of a homopolymer or copolymer and a terpolymer wherein the homopolymer or copolymer and terpolymer have one or two common monomers, respectively. That is the number of feed monomers of the terpolymerization reactor train is equal to the number of feed monomers of the combined homo- or copolymerization and terpolymerization reactor trains. Non-limiting exemplary homopolymer-terpolymer blends include PP homopolymer—ethylene-propylene-butene-1 (EPB) terpolymer, PE—EPB terpolymer, polybutene—EPB terpolymer, etc. Non-limiting exemplary copolymer-terpolymer blends include EP copolymer—ethylene-propylene-butene-1 (EPB) terpolymer, PB copolymer—EPB terpolymer, ethylene-butene-1 (EB)—EPB terpolymer, etc.

The weight fractions of the individual polymer components in the blends made by the monomer recycle processes for use with fluid phase in-line polymer blending disclosed herein may be similar or different. The polymer blends disclosed herein may also derive similar improvements from combinations of different materials in similar or different proportions. One non-limiting example of a useful polymer blend made by the fluid phase in-line blending process disclosed herein includes a major fraction of a highly crystalline moderate molecular weight polymer and a minor fraction of a very high molecular weight, elastomeric polymer with low or no inherent crystallinity. Another non-limiting example of a useful polymer blend made by the monomer recycle processes disclosed herein includes a major fraction of a soft, tough, low melting polymer with a minor fraction of a highly crystalline, high melting polymer. Still another non-limiting example of a useful polymer blend made by the fluid phase in-line blending process disclosed herein includes a major fraction of a highly crystalline polymer with a minor fraction of a low or non-crystalline polymer where the low or non-crystalline polymer is non-elastomeric.

The polymer blends made by the monomer recycle processes for use with fluid phase in-line polymer blending disclosed herein may provide for improved properties, and hence use in a wide array of applications. One such exemplary, but non-limiting application, is in medical applications requiring improved resistance to sterilizing doses of high-energy radiation. A polymer blend useful for this particular application may include from 75 to 99 wt % moderate molecular weight propylene homopolymer with 1 to 25 wt % of an ethylene plastomer (EP copolymer). Alternatively, the ethylene plastomer may be replaced by a propylene-ethylene copolymer containing from 8-16 wt % ethylene. The plastomer or high propylene copolymer component of the blend provides superior initial ductility as well as retention of ductility and tolerance of the sterilizing radiation to the blend while the homopolymer component imparts excellent strength, stiffness and resistance to deformation at elevated temperature to the blend. Polymer blends of propylene homopolymer and ethylene plastomer or propylene-ethylene copolymer are generally clearer or nearly as clear as the unblended propylene homopolymer component.

Still another exemplary, but non-limiting application of where the polymer blends made by the monomer recycle processes for use with fluid phase in-line polymer blending disclosed herein find application is in devices and packaging materials requiring good impact resistance, and particularly in low temperature environments. Polymer blends useful for this particular application may include from 60 to 99 wt % of a stiff propylene homopolymer and/or a relatively stiff, low comonomer containing propylene copolymer and 1-40 wt % of an ethylene plastomer, propylene copolymer containing 5-20 wt % of comonomer, or comonomer-propylene elastomer (like ethylene-propylene rubber). In applications requiring clarity, incorporating into the polymer blend a minor fraction of a highly compatible ethylene plastomer or propylene copolymer known to have a minimal deleterious effect or even a positive effect on the clarity of blends with polypropylene may provide for such. Such plastomers comprise those with a refractive index and viscosity similar to the polypropylene with which they are to be blended. Compatible propylene copolymers are exemplified by propylene-ethylene copolymers containing less than 16 wt %, less than 11 wt %, or less than 6 wt % ethylene units.

Still yet another exemplary, but non-limiting application of where the polymer blends made by the monomer recycle processes for use with fluid phase in-line polymer blending disclosed herein find application are those where materials requiring a combination of stiffness and impact resistance and/or a combination of heat resistance and impact resistance. A polymer blend useful for these applications are similar in composition to the blends specified for impact resistant devices and packages. More particularly, polymer blends useful for this particular application may include from 60 to 99 wt % of a stiff propylene homopolymer and/or a relatively stiff, low comonomer containing propylene copolymer and 1-40 wt % of an ethylene plastomer, propylene copolymer containing 5-20 wt % of comonomer, or comonomer-propylene elastomer (like ethylene-propylene rubber). The stiffness and heat resistance may be increased by increasing the homopolymer or stiff copolymer portion of the polymer blend. Correspondingly, the impact resistance may be improved by increasing the plastomer, propylene copolymer or ethylene-propylene rubber portion of the blend. The desired balance of product attributes may be accomplished by a careful balancing of the two components.

Still yet another exemplary, but non-limiting application of where the polymer blends made by the monomer recycle processes for use with fluid phase in-line polymer blending disclosed herein find application are those where a device and/or package must be sterilized by high temperature and also must be soft and able to withstand impact abuse even at low temperatures. Polymer blends useful for this particular application may include from 75-99 wt % of one or more stiff homopolymer and/or copolymer components and 1-25 wt % of one or more plastomers, low to no crystallinity propylene copolymers, and ethylene-propylene rubbers. Where increasing softness of packages and device is desired, one may use a greater fraction of the one or more soft components in the blend and smaller fraction of the one or more stiff components in the blend. Polymer blends useful for this particular application may also include a major fraction of the soft components and minor fraction of the stiff components. Hence the range of polymer blends may include 5-90 wt % of the stiff polymer component and 10-95 wt % of the soft polymer component.

Still yet another exemplary, but non-limiting application of where the polymer blends made by the monomer recycle processes for use with fluid phase in-line polymer blending disclosed herein find application are films which are required to melt and form a seal at relatively low elevated temperature yet still maintain integrity at much higher temperature. The range of blend compositions previously specified for soft, elevated temperature resistant devices and/or packages would apply for this particular type of film application. Similar relationships between competing properties and the relative usages of the relative components would also apply for this application. More particularly, a greater fraction of the stiff polymer component may increase the seal integrity at higher temperatures, whereas a greater fraction of the soft polymer component may improve seal formation at lower temperatures and seal strength at normal temperatures.

Other polymeric materials may also be utilized as the soft component for the applications previously described. For example, propylene homopolymers and low comonomer copolymers containing relatively large quantities of chain defects such as stereo- and/or regio-defects may be used in the aforementioned blends in place of or along with the plastomers, ethylene-propylene copolymers and other modifiers. However, one distinction between the high defect propylene homopolymers and low comonomer copolymers and the previously described plastomers, ethylene-propylene copolymers and other modifiers is that high defect propylene homo- and copolymers provide relatively less improvement of low temperature ductility in the blends because their glass transition temperatures are not depressed below the norm for propylene polymers in the absence of significant amounts of ethylene comonomer incorporated into their chains.

As will be appreciated by one skilled in the art of polymer engineering, variations to the aforementioned polymer blends and their advantageous applications may be made without deviating from the spirit of the polymer blends provided by fluid phase in-line blending process disclosed herein.

Catalyst System Overview:

The monomer recycle processes for use with fluid phase in-line polymer blending disclosed herein may utilize any number of catalyst systems (also referred to as catalysts) in any of the reactors of the polymerization reactor section of the process. The monomer recycle processes for use with fluid phase in-line polymer blending disclosed herein may also utilize the same or different catalysts or catalyst mixtures in the different individual reactors of the reactor bank of the present invention. It should be understood that by using different catalyst systems we mean that any part of the catalyst system can vary and any combination is allowed. For example, the disclosed process may use unsupported catalyst systems in some trains while using supported catalyst systems in other trains. In other embodiments, the catalyst systems in some reactor trains may comprise aluminoxane (for example, MAO) activator, while comprising non-coordinating anion activators in some other trains. In another embodiments, the catalyst systems in some reactor trains may comprise Ziegler-Natta catalysts, while the catalyst systems in other reactor trains of the invention process may comprise metallocenes or nonmetallocene metal-centered, heteroaryl ligand catalyst compounds (where the metal is chosen from the Group 4, 5, 6, the lanthanide series, or the actinide series of the Periodic Table of the Elements) catalysts activated by aluminoxane or non-coordinating anion activators or any combinations thereof.

As disclosed herein, Ziegler-Natta catalysts are those referred to as first, second, third, fourth, and fifth generation catalysts in the Propylene Handbook, E. P. Moore, Jr., Ed., Hanser, N.Y., 1996. Metallocene catalysts in the same reference are described as sixth generation catalysts.

As disclosed herein, nonmetallocene metal-centered, heteroaryl ligand catalyst compounds (where the metal is chosen from the Group 4, 5, 6, the lanthanide series, or the actinide series of the Periodic Table of the Elements), are defined as the class of nonmetallocene metal-centered, heteroaryl ligand catalyst compounds, where the metal is chosen from the Group 4, 5, 6, the lanthanide series, or the actinide series of the Periodic Table of the Elements. Just as in the case of metallocene catalysts, the nonmetallocene metal-centered, heteroaryl ligand catalyst compounds (where the metal is chosen from the Group 4, 5, 6, the lanthanide series, or the actinide series of the Periodic Table of the Elements) catalysts are typically made fresh by mixing a catalyst precursor compound with one or more activators. Nonmetallocene metal-centered, heteroaryl ligand catalyst compounds (where the metal is chosen from the Group 4, 5, 6, the lanthanide series, or the actinide series of the Periodic Table of the Elements) catalysts are described in detail in PCT Patent Publications Nos. WO 02/38628, WO 03/040095 (pages 21 to 51), WO 03/040201 (pages 31 to 65), WO 03/040233 (pages 23 to 52), and WO 03/040442 (pages 21 to 54), each of which is herein incorporated by reference.

While the number of different catalyst systems deployed in the disclosed processes can be any number, the use of no more than five different catalysts and more particularly, no more than three different catalysts in any given reactor is advantageous for economic reasons. The deployment of no more than ten catalysts or the deployment of no more than six catalysts in the reactor bank of the polymerization process is advantageous for economic reasons. The one or more catalysts deployed in the reactors may be homogeneously dissolved in the fluid reaction medium or may form a heterogeneous solid phase in the reactor. In one particular embodiment, the catalyst(s) is (are) homogeneously dissolved in the fluid reaction medium. When the catalyst is present as a solid phase in the polymerization reactor, it may be supported or unsupported.

The process disclosed herein may use any combination of homogeneous and heterogeneous catalyst systems simultaneously present in one or more of the individual reactors of the polymerization reactor section, i.e., any reactor of the polymerization section of the present invention may contain one or more homogeneous catalyst systems and one or more heterogeneous catalyst systems simultaneously. The process disclosed herein may also use any combination of homogeneous and heterogeneous catalyst systems deployed in the polymerization reactor section. These combinations comprise scenarios when some or all reactors use a single catalyst and scenarios when some or all reactors use more than one catalyst. The one or more catalysts deployed in the process disclosed herein may be supported on particles, which either can be dispersed in the fluid polymerization medium or may be contained in a stationary catalyst bed. When the supported catalyst particles are dispersed in the fluid reaction medium, they may be left in the polymeric product or may be separated from the product prior to its crystallization from the fluid reactor effluent in a separation step that is downstream of the polymerization reactor section. If the catalyst particles are recovered, they may be either discarded or may be recycled with or without regeneration.

The catalyst may also be supported on structured supports, such as for example, monoliths comprising straight or tortuous channels, reactor walls, and internal tubing. When the catalysts are supported, operation may take place on dispersed particles. When the catalyst is supported on dispersed particles, operations may take place without catalyst recovery i.e., the catalyst is left in the polymeric product. In another embodiment, unsupported catalysts may be dissolved in the fluid reaction medium.

Catalyst systems may be introduced into the reactor by any number of methods. For example, the catalyst may be introduced with the monomer-containing feed or separately. Also, the catalyst(s) may be introduced through one or multiple ports to the reactor. If multiple ports are used for introducing the catalyst, those ports may be placed at essentially the same or at different positions along the length of the reactor. If multiple ports are used for introducing the catalyst, the composition and the amount of catalyst feed through the individual ports may be the same or different. Adjustment in the amounts and types of catalyst through the different ports enables the modulation of polymer properties, such as for example, molecular weight distribution, composition, composition distribution, and crystallinity.

Catalyst Compounds and Mixtures:

The processes described herein may use any polymerization catalyst capable of polymerizing the monomers disclosed herein if that catalyst is sufficiently active under the polymerization conditions disclosed herein. Thus, Group-3-10 transition metals may form suitable polymerization catalysts. A suitable olefin polymerization catalyst should be able to coordinate to, or otherwise associate with, an alkenyl unsaturation. Exemplary, but not limiting, polymerization catalysts include Ziegler-Natta catalysts, metallocene catalysts, nonmetallocene metal-centered, heteroaryl ligand catalyst compounds (where the metal is chosen from the Group 4, 5, 6, the lanthanide series, or the actinide series of the Periodic Table of the Elements) catalysts and late transition metal catalysts.

Distinction should be made between active catalysts, also referred to as catalyst systems herein, and catalyst precursor compounds. Catalyst systems are active catalysts comprising one or more catalyst precursor compounds, one or more catalyst activators, and optionally, one or more supports. Catalytic activity is often expressed based on the concentration of the catalyst precursor compounds without implying that the active catalyst is the precursor compound alone. It should be understood that the catalyst precursor is inactive without being contacted or being treated with a proper amount of activator. Similarly, the catalyst activator is inactive without combining it with a proper amount of precursor compound. As will become clear from the following description, some activators are very efficient and can be used stoichiometrically, while some others are used in excess, and in sometimes large excess, to achieve high catalytic activity as expressed based on the concentration of the catalyst precursor compounds. Since some of these activators, for example methylaluminoxane (MAO), increase catalytic activity as expressed based on the concentration of the catalyst precursor compounds, they are sometimes referred to as "cocatalysts" in the technical literature of polymerization.

When utilizing homogeneous supercritical polymerization conditions for making one or more of the in-line blending components, homogenous polymerization catalysts, such as metallocene-based catalysts and other single-site homogenous catalyst systems may be advantageous. For example, when polymerizing propylene under supercritical conditions, particularly useful metallocene catalysts and non-metallocene catalysts are those disclosed in paragraphs [0081] to [0111] of U.S. patent application Ser. No. 10/667,585, now U.S. Pat. No. 7,354,979 and paragraphs [0173] to [0293] of U.S. patent application Ser. No. 11/177,004, now abandoned, the paragraphs of which are herein incorporated by reference.

The processes disclosed herein can employ mixtures of catalyst compounds to tailor the properties that are desired from the polymer. Mixed catalyst systems prepared from more than one catalyst precursor compounds can be employed in the in-line blending processes to alter or select desired physical or molecular properties. For example, mixed catalyst systems can control the molecular weight distribution of isotactic polypropylene when used with the invention processes or for the invention polymers. In one embodiment of the processes disclosed herein, the polymerization reaction(s) may be conducted with two or more catalyst precursor compounds at the same time or in series. In particular, two different catalyst precursor compounds can be activated with the same or different activators and introduced into the polymerization system at the same or different times. These systems can also, optionally, be used with diene incorporation to facilitate long chain branching using mixed catalyst systems and high levels of vinyl terminated polymers.

As disclosed herein, two or more of the above catalyst precursor compounds can be used together.

Activators and Activation Methods for Catalyst Compounds:

The catalyst precursor compounds described herein are combined with activators for use as active catalysts herein.

An activator is defined as any combination of reagents that increases the rate at which a metal complex polymerizes unsaturated monomers, such as olefins. An activator may also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Alkyl aluminoxanes, sometimes called aluminoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and European and PCT Patent Publication Nos. EP 0 561 476 A1, EP 0 279 586 B1, EP 0 516 476 A, EP 0 594 218 A1 and WO 94/10180, all of which are herein incorporated by reference in their entirety.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, neutral or ionic, such as tri(n-butyl)ammonium tetrakis (pentafluorophenyl)boron, a trisperfluorophenyl borone metalloid precursor or a trisperfluoronaphtyl borone metalloid precursor, polyhalogenated heteroborane anions (PCT patent publication no. WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include trisubstituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, preferably fluorinated, aryl groups. Alternately, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European patent publication Nos. EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned, all of which are herein fully incorporated by reference.

C. Non-Ionizing Activators:

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, Ni(1,5-cyclooctadiene)$_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

Other non-ionizing activators include $B(R^{12})_3$, where $R^{12}$ is an arene or a perfluorinated arene. Alternately, non-ionizing activators include $B(C_6H_5)_3$ and $B(C_6F_5)_3$. Another non-ionizing activator is $B(C_6F_5)_3$. Alternately, activators include ionizing and non-ionizing activators based on perfluoroaryl borane and perfluoroaryl borates such as $PhNMe_2H^+$ $B(C_6F_5)_4^-$, $(C_6H_5)_3C^+$ $B(C_6F_5)_4^-$, and $B(C_6F_5)_3$.

Additional activators that may be used with the catalyst compounds disclosed herein include those described in PCT patent publication No. WO 03/064433A1, which is incorporated by reference herein in its entirety.

Additional useful activators for use in the processes disclosed herein include clays that have been treated with acids (such as $H_2SO_4$) and then combined with metal alkyls (such as triethylaluminum) as described in U.S. Pat. No. 6,531,552 and EP Patent No. 1 160 261 A1, which are incorporated by reference herein.

Activators also may be supports and include ion-exchange layered silicate having an acid site of at most −8.2 pKa, the amount of the acid site is equivalent to at least 0.05 mmol/g of 2,6-dimethylpyridine consumed for neutralization. Non-limiting examples include chemically treated smectite group silicates, acid-treated smectite group silicates. Additional examples of the ion-exchange layered silicate include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional non-limiting examples of the ion-exchange layered silicate include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly advantageous. The treated clay may then be contacted with an activator compound, such as TEAL, and the catalyst compound to polymerize olefins.

Polar compounds often act as catalyst poisons. Thus, in another form, the polymerization systems comprise less than 5 weight % polar species, or less than 4 weight %, or less than 3 weight %, or less than 2 weight %, or less than 1 weight %, or less than 1000 wt ppm, or less than 750 wt ppm, or less than 500 wt ppm, or less than 250 wt ppm, or less than 100 wt ppm, or less than 50 wt ppm, or less than 10 wt ppm. Polar species include oxygen containing compounds (except for aluminoxanes) such as alcohols, oxygen, ketones, aldehydes, acids, esters and ethers.

In yet another form, the polymerization systems comprise less than 5 weight % trimethylaluminum and/or triethylaluminum, or less than 4 weight %, or less than 3 weight %, or less than 2 weight %, or less than 1 weight %, or less than 1000 ppm, or less than 750 wt ppm, or less than 500 wt ppm, or less than 250 wt ppm, or less than 100 wt ppm, or less than 50 wt ppm, or less than 10 wt ppm.

In still yet another form, the polymerization systems comprise methylaluminoxane and less than 5 weight % trimethylaluminum and or triethylaluminum, or less than 4 weight %, or less than 3 weight %, or less than 2 weight %, or less than 1 weight %, or less than 1000 wt ppm, or less than 750 wt ppm, or less than 500 wt ppm, or less than 250 wt ppm, or less than 100 wt ppm, or less than 50 wt ppm, or less than 10 wt ppm.

The processes disclosed herein may use finely divided, supported catalysts to prepare propylene/1-hexene copolymers with greater than 1.0 mole % 1-hexene. In addition to finely divided supports, in-line blending processes disclosed herein may use fumed silica supports in which the support particle diameter may range from 200 angstroms to 1500 angstroms, small enough to form a colloid with reaction media.

Catalyst Supports:

In another form, the catalyst compositions of the monomer recycle processes for use with fluid phase in-line polymer blending disclosed herein may include a support material or carrier. For example, the one or more catalyst components and/or one or more activators may be deposited on, contacted with, vaporized with, bonded to, or incorporated within, adsorbed or absorbed in, or on, one or more supports or carriers.

The support material may be any of the conventional support materials. In one form, the supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Useful support materials are inorganic oxides that include those Group 2, 3, 4, 5, 13 or 14 metal oxides. In one form, the supports include silica, which may or may not be dehydrated, fumed silica, alumina (PCT patent publication No. WO 99/60033), silica-alumina and mixtures thereof. Other useful supports include magnesia, titania, zirconia, magnesium chloride (U.S. Pat. No. 5,965,477), montmorillonite (European Patent No. EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in European Patent No. EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

The support material, for example an inorganic oxide, has a surface area in the range of from about 10 to about 700 $m^2/g$, pore volume in the range of from about 0 to about 4.0 cc/g and average particle size in the range of from about 0.02 to about 50 μm. Alternatively, the surface area of the support material is in the range of from about 50 to about 500 $m^2/g$, pore volume of from about 0 to about 3.5 cc/g and average particle size of from about 0.02 to about 20 μm. In another form, the surface area of the support material is in the range is from about 100 to about 400 $m^2/g$, pore volume from about 0 to about 3.0 mL/g and average particle size is from about 0.02 to about 10 μm.

Non-porous supports may also be used as supports in the processes described herein. For example, in a one embodiment the nonporous, fumed silica supports described in U.S. Pat. No. 6,590,055 may be used and is incorporated by reference herein.

Scavengers:

Compounds that destroy impurities are referred to as scavengers by one skilled in the art of polymerization. Impurities may harm catalysts by reducing their activity. Scavengers may be optionally fed to the reactor(s) of the in-line blending process disclosed herein. Catalytic activity may be defined many different ways. For example, catalytic activity can be expressed as turnover frequency, i.e., the number of moles of monomers converted to the product in a unit time by one mole of catalyst precursor employed in preparing the active catalyst system. For a given reactor operating at the same residence time, catalytic activity may also be measured in terms of catalyst productivity, customarily expressed as the weight of polymer made by a unit weight of catalyst precursor with or without the weight of the activator.

The scavengers for use in the processes disclosed herein may be different chemical compound(s) from the catalyst activator. Non-limiting exemplary scavengers include diethyl zinc, and alkyl aluminum compounds, such as trimethyl aluminum, triethyl aluminum, tri-isobutyl aluminum, and trioctyl aluminum. The scavenger may also be the same as the catalyst activator and is generally applied in excess of what is needed to fully activate the catalyst. These scavengers include, but are not limited to, aluminoxanes, such as methyl aluminoxane. The scavenger may also be introduced to the reactor with the monomer feed or with any other feed stream. In one particular embodiment, the scavenger is introduced with the monomer-containing feed. The scavenger may be homogeneously dissolved in the polymerization reaction medium or may form a separate solid phase. In one particular embodiment, scavengers are dissolved in the polymerization medium.

Polymerization Monomers and Comonomers:

The processes disclosed herein may be used to polymerize any monomer having one or more (non-conjugated) aliphatic double bond(s) and two or more carbon atoms. Monomers for use in the in-line blending process include ethylene, propylene, C4 and higher α-olefins (non-limiting examples include butene-1, hexene-1, octene-1, and decene-1); substituted olefins (non-limiting examples include styrene, and vinylcyclohexane); non-conjugated dienes (non-limiting examples include vinylcyclohexene, dicyclopentadiene); α,ω-dienes (non-limiting examples include 1,5-hexadiene, 1,7-octadiene); cycloolefins (non-limiting examples include cyclopentene, cyclohexene); and norbornene.

The processes disclosed herein may be used to polymerize any unsaturated monomer or monomers including $C_3$ to $C_{100}$ olefins, alternatively $C_3$ to $C_{60}$ olefins, alternatively $C_3$ to $C_{40}$ olefins, alternatively $C_3$ to $C_{20}$ olefins, and alternately $C_3$ to $C_{12}$ olefins. The processes disclosed herein may also be used to polymerize linear, branched or cyclic alpha-olefins including $C_3$ to $C_{100}$ alpha-olefins, alternatively $C_3$ to $C_{60}$ alpha-olefins, alternatively $C_3$ to $C_{40}$ alpha-olefins, alternatively $C_3$ to $C_{20}$ alpha-olefins, and alternatively $C_3$ to $C_{12}$ alpha-olefins. Suitable olefin monomers may be one or more of propylene, butene, pentene, hexene, heptene, octene, nonene, decene, dodecene, 4-methyl-pentene-1,3-methyl pentene-1,3,5,5-trimethyl-hexene-1, and 5-ethylnonene-1.

In another embodiment of the processes disclosed herein, the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Other monomers for use with the in-line blending process disclosed herein may also include aromatic-group-containing monomers containing up to 30 carbon atoms. Suitable aromatic-group-containing monomers comprise at least one aromatic structure, alternately from one to three, and alternately a phenyl, indenyl, fluorenyl, or naphthyl moiety. The aromatic-group-containing monomer further comprises at least one polymerizable double bond such that after polymerization, the aromatic structure is pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Aromatic-group-containing monomers may also contain at least one aromatic structure appended to a polymerizable olefinic moiety. Non-limiting exemplary aromatic monomers include styrene, alpha-methylstyrene, para-alkylstyrenes, vinyltoluenes, vinylnaphthalene, allyl benzene, and indene, and alternatively styrene, paramethyl styrene, 4-phenyl-1-butene and allyl benzene.

Non aromatic cyclic group containing monomers may also be used in the processes disclosed herein. These monomers may include up to 30 carbon atoms. Suitable non-aromatic cyclic group containing monomers may have at least one polymerizable olefinic group that is either pendant on the cyclic structure or is part of the cyclic structure. The cyclic structure may also be further substituted by one or more hydrocarbyl groups, for example, but not limited to, $C_1$ to $C_{10}$ alkyl groups. Non-limiting exemplary non-aromatic cyclic group containing monomers include vinylcyclohexane, vinylcyclohexene, vinylnorbornene, ethylidene norbornene, cyclopentadiene, cyclopentene, cyclohexene, cyclobutene, and vinyladamantane.

Diolefin monomers may also be used in the processes disclosed herein. These diolefin monomers include any hydrocarbon structure, or alternatively $C_4$ to $C_{30}$, having at least two unsaturated bonds, wherein at least two of the unsaturated bonds are readily incorporated into a polymer by either a stereospecific or a non-stereospecific catalyst(s). The diolefin monomers may also be selected from alpha, omega-diene monomers (i.e. di-vinyl monomers), alternatively linear di-vinyl monomers containing from 4 to 30 carbon atoms. Non-limiting exemplary dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Non-limiting exemplary cyclic dienes include cyclopentadiene, vinylnorbornene, norbornadiene, ethylidene norbornene, divinylbenzene, dicyclopentadiene or higher ring containing diolefins with or without substituents at various ring positions.

Non-limiting examples of polar unsaturated monomers include 6-nitro-1-hexene, N-methylallylamine, N-allylcyclopentylamine, N-allyl-hexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[9.5.1.1$^{3,9}$.1$^{5,15}$.1$^{7,13}$] octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, allyl disulfide, ethyl acrylate, methyl acrylate.

Polymerizations may be carried out with any suitable feed composition to yield the desired product composition at an economical single-pass conversion. Monomer concentrations are generally lower when substantial amounts of inert solvents/diluents are cofed with the monomers and catalyst. Although inert solvents/diluents may be used if so desired, low solvent/diluent concentration is often advantageous due to reduced solvent and monomer recovery-recycle cost. In one embodiment, olefin polymerization is carried out in the presence of less than 60 wt % of inert solvent/diluent affording olefin concentrations in the combined feeds of the individual reactors of 40 wt % or more, or even 55 wt % or more, and advantageously 75 wt % or more.

In another embodiment, polymerizations yielding the in-line blend components are carried out in bulk monomer phases, i.e., with combined reactor feeds comprising inert solvent/diluent at less than 40 wt %, or less than 30 wt %, less than 20 wt %, or less than 15 wt %, or less than 10 wt %, or less than 5 wt %, or even less than 1 wt %.

In a particular embodiment, ethylene-propylene copolymer blend components are made with essentially diluent-free monomer feeds containing 1-18 wt % ethylene and 75-99 wt % propylene. In another embodiment, ethylene-propylene copolymer blend components are produced with essentially diluent-free monomer feeds containing 5-30 wt % of butene-1, or hexene-1 and 65-95 wt % of propylene or ethylene.

The processes disclosed herein may be used to produce homopolymers or copolymers. A copolymer refers to a polymer synthesized from two, three, or more different monomer units. Polymers produced by the processes disclosed herein include homopolymers or copolymers of any of the above monomers.

In one embodiment of the processes disclosed herein, the polymer is a homopolymer of any $C_3$ to $C_{12}$ alpha-olefin, or a homopolymer of propylene. In another embodiment the polymer is a copolymer comprising propylene and ethylene wherein the copolymer comprises less than 70 weight % ethylene, or less than 60 weight % ethylene, or less than 40 weight % ethylene, or less than 20 weight % ethylene. In another embodiment the polymer is a copolymer comprising propylene and one or more of any of the monomers listed above. In another embodiment, the copolymers comprise one or more diolefin comonomers, alternatively one or more $C_6$ to $C_{40}$ non-conjugated diolefins, alternatively one or more $C_6$ to $C_{40}$ α,ω-dienes.

In another embodiment of the processes disclosed herein, the one or more polymer blend components are a copolymer of ethylene, propylene, or other higher olefin and optionally any third monomer, typically another higher olefin, such as $C_4$ to $C_{20}$ linear, branched or cyclic monomers. In another embodiment, the one or more polymer blend components produced herein are a copolymer of ethylene and one or more of propylene, butene, pentene, hexene, heptene, octene, nonene, decene, dodecene, 4-methyl-pentene-1,3-methyl pentene-1, and 3,5,5-trimethyl hexene 1. In still another embodiment, the one or more polymer blend components produced herein are a copolymer of propylene and one or more of ethylene, butene, pentene, hexene, heptene, octene, nonene, decene, dodecene, 4-methyl-pentene-1,3-methyl-pentene-1, and 3,5,5-trimethyl-hexene-1. In still yet another embodiment, the one or more polymer blend components produced herein are a copolymer of a C4 or higher olefin and one or more of ethylene, propylene, butene, pentene, hexene, heptene, octene, nonene, decene, dodecene, 4-methyl-pentene-1, 3-methyl-pentene-1, and 3,5,5-trimethyl-hexene-1.

In another embodiment of the processes disclosed herein, the copolymers described comprise at least 50 mole % of a first monomer and up to 50 mole % of other monomers. In another embodiment, the polymer comprises: a first monomer present at from 40 to 95 mole %, or 50 to 90 mole %, or 60 to 80 mole %, and a comonomer present at from 5 to 40 mole %, or 10 to 60 mole %, or 20 to 40 mole %, and a termonomer present at from 0 to 10 mole %, or from 0.5 to 5 mole %, or from 1 to 3 mole %. Such copolymer blending components can be readily produced when the comonomer(s) is (are) present between 0.1 and 85 mole % in the combined feeds to the reactor making the copolymers.

In another embodiment of the processes disclosed herein, the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclohexene, cyclooctene, hexadiene, cyclohexadiene and the like.

In another embodiment of the processes disclosed herein, the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In another embodiment of the processes disclosed herein, the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, un-decene, dodecene, hexadecene, butadiene, hexadiene, heptadiene, pentadiene, octadiene, nonadiene, decadiene, dodecadiene, styrene, 3,5,5-trimethyl-hexene-1,3-methylpentene-1,4-methylpentene-1, cyclopentadiene, and cyclohexene.

In another embodiment of the processes disclosed herein, the polymers described above further comprise one or more dienes at up to 10 weight %, or at 0.00001 to 1.0 weight %, or at 0.002 to 0.5 weight %, or at 0.003 to 0.2 weight %, based upon the total weight of the composition. In some embodiments 500 ppm or less of diene is added to the combined feed of one or more polymerization trains, alternately 400 ppm or less, alternately 300 ppm or less. In other embodiments at least 50 ppm of diene is added to the combined feed of one or more polymerization trains, or 100 ppm or more, or 150 ppm or more. In yet another embodiment the concentration of diene in the combined feed to the reactor is between 50 wt ppm and 10,000 wt ppm.

In another embodiment of the processes disclosed herein, the processes used to produce propylene copolymers with other monomer units, such as ethylene, other α-olefin, α-olefinic diolefin, or non-conjugated diolefin monomers, for example $C_4$-$C_{20}$ olefins, $C_4$-$C_{20}$ diolefins, $C_4$-$C_{20}$ cyclic olefins, $C_8$-$C_{20}$ styrenic olefins. Other unsaturated monomers besides those specifically described above may be copolymerized using the processes disclosed herein, for example, styrene, alkyl-substituted styrene, ethylidene norbornene, norbornadiene, dicyclopentadiene, vinylcyclohexane, vinylcyclohexene, acrylates, and other olefinically-unsaturated monomers, including other cyclic olefins, such as cyclopentene, norbornene, and alkyl-substituted norbornenes. Copolymerization can also incorporate α-olefinic macromonomers produced in-situ or added from another source. Some embodiments limit the copolymerization of α-olefinic macromonomers to macromonomers with 2000 or less mer units. U.S. Pat. No. 6,300,451 discloses many useful comonomers. That disclosure refers to comonomers as "a second monomer."

In another embodiment of the processes disclosed herein, when propylene copolymers are desired, the following monomers can be copolymerized with propylene: ethylene, but-1-ene, hex-1-ene, 4-methylpent-1-ene, dicyclopentadiene, norbornene, $C_4$-$C_{2000}$, $C_4$-$C_{200}$, or $C_4$-$C_{40}$ linear or branched, α,ω-dienes; $C_4$-$C_{2000}$, $C_4$-$C_{200}$, or $C_4$-$C_{40}$ cyclic olefins; and $C_4$-$C_{2000}$, $C_4$-$C_{200}$, or $C_4$-$C_{40}$ linear or branched α-olefins.

Other Primary Monomer:

The polymerization processes disclosed herein may polymerize butene-1 ($T_c$=146.5° C.; $P_c$=3.56 MPa), pentene-1 ($T_c$=191.8° C.; $P_c$=3.56 MPa), hex-1-ene ($T_c$=230.8° C.; $P_c$=3.21 MPa), and 3-methyl-butene-1 ($T_c$=179.7° C.; $P_c$=3.53 MPa) using these monomers or mixtures comprising the monomers at supercritical conditions or as a liquid. These processes may employ at least one of butene-1, pentene-1, or 3-methyl-butene-1 as monomer. These processes may also employ reaction media that comprise butene-1, pentene-1, or 3-methyl-butene-1. These processes can employ polymerization feeds that contain greater than 50 mole % of butene-1, pentene-1, or 3-methyl-butene-1 and their concentration can vary between 0.1 and 85 mole %. Of course, these compounds can be freely mixed with each other and with propylene as monomer, bulk reaction media, or both.

Polymerization Solvents/Diluents:

Solvent and or diluent may be present in the polymerization system. Any hydrocarbon, fluorocarbon, or fluorohydrocarbon inert solvent or their mixtures may be used at concentrations not more than 80 wt % in the feeds to any individual polymerization reactor of the in-line blending process disclosed herein. The concentration of the inert solvent in the reactor feed and thus in the polymerization system in certain embodiments utilizing bulk polymerization processes is not more than 40 wt %, alternatively not more than 30 wt %, alternatively not more than 20 wt %, alternately not more than 10 wt %, alternately not more than 5 wt %, and alternately not more than 1 wt %.

Diluents for use in the in-line blending process disclosed herein may include one or more of $C_2$-$C_{24}$ alkanes, such as ethane, propane, n-butane, i-butane, n-pentane, i-pentane, n-hexane, mixed hexanes, cyclopentane, cyclohexane, etc., single-ring aromatics, such as toluene and xylenes. In some embodiments, the diluent comprises one or more of ethane, propane, butane, isobutane, pentane, isopentane, and hexanes. In other embodiments, the diluent is recyclable.

Other diluents may also include $C_4$ to $C_{150}$ isoparaffins, or $C_4$ to $C_{100}$ isoparaffins, or $C_4$ to $C_{25}$ isoparaffins, or $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. The density (ASTM 4052, 15.6/15.6° C.) of these isoparaffins may range from 0.70 to 0.83 g/cm$^3$; the pour point is −40° C. or less, alternately −50° C. or less, the viscosity (ASTM 445, 25° C.) is from 0.5 to 20 cSt at 25° C.; and the average molecular weights in the range of 100 to 300 g/mol. Some suitable isoparaffins are commercially available under the tradename ISOPAR (ExxonMobil Chemical Company, Houston Tex.), and are described in, for example in U.S. Pat. Nos. 6,197,285, 3,818,105 and 3,439,088, and sold commercially as ISOPAR series of isoparaffins. Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point 238-274° C.).

In another embodiment of the monomer recycle processes for use with fluid phase in-line polymer blending disclosed herein, diluents may include $C_4$ to $C_{25}$ n-paraffins, or $C_4$ to $C_{20}$ n-paraffins, or $C_4$ to $C_{15}$ n-paraffins having less than 0.1%, or less than 0.01% aromatics. Some suitable n-paraffins are commercially available under the tradename NORPAR (ExxonMobil Chemical Company, Houston Tex.), and are sold commercially as NORPAR series of n-paraffins. In another embodiment, diluents may include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, or $C_5$ to $C_{18}$, or $C_5$ to $C_{12}$. They contain very low levels of aromatic hydrocarbons, or less than 0.1, or less than 0.01 aromatics. Suitable dearomatized aliphatic hydrocarbons are commercially available under the tradename EXXSOL (ExxonMobil Chemical Company, Houston Tex.), and are sold commercially as EXXSOL series of dearomaticized aliphatic hydrocarbons.

In another embodiment of the monomer recycle processes for use with fluid phase in-line polymer blending disclosed herein, the inert diluent comprises up to 20 weight % of oligomers of $C_6$ to $C_{14}$ olefins and/or oligomers of linear olefins having 6 to 14 carbon atoms, or 8 to 12 carbon atoms, or 10 carbon atoms having a Kinematic viscosity of 10 or more (as measured by ASTM D 445); and having a viscosity index ("VI"), as determined by ASTM D-2270 of 100 or more.

In another embodiment of the monomer recycle processes for use with fluid phase in-line polymer blending disclosed herein, the inert diluent comprises up to 20 weight % of oligomers of $C_{20}$ to $C_{1500}$ paraffins, alternately $C_{40}$ to $C_{1000}$ paraffins, alternately $C_{50}$ to $C_{750}$ paraffins, alternately $C_{50}$ to $C_{500}$ paraffins. In another embodiment of the fluid phase in-line process for blending disclosed herein, the diluent comprises up to 20 weight % of oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the tradenames Synfluid™ available from Chevron-Phillips Chemical Co. in Pasedena Tex., Durasyn™ available from BP Amoco Chemicals in London England, Nexbase™ available from Fortum Oil and Gas in Finland, Synton™ available from Chemtura Corporation in Middlebury Conn., USA, EMERY™ available from Cognis Corporation in Ohio, USA.

In another embodiment of the monomer recycle processes for use with fluid phase in-line polymer blending disclosed herein, the diluent comprises a fluorinated hydrocarbon. Exemplary fluorocarbons include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, alternatively from 1 to 3, wherein y is an integer greater than or equal to 0 and z is an integer and at least one, alternatively, y and z are integers and at least one. For purposes of the in-line blending processes disclosed herein and the claims thereto, the terms hydrofluorocarbon and fluorocarbon do not include chlorofluorocarbons.

In one embodiment of the monomer recycle processes for use with fluid phase in-line polymer blending disclosed herein, a mixture of fluorocarbons are used, alternatively a mixture of a perfluorinated hydrocarbon and a hydrofluorocarbon, and alternatively a mixture of a hydrofluorocarbons. In yet another embodiment, the hydrofluorocarbon is balanced or unbalanced in the number of fluorine atoms in the HFC used.

In another embodiment of the monomer recycle processes for use with fluid phase in-line polymer blending disclosed herein, the fluorocarbon is not a perfluorinated C4 to C10 alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, or perfluorotoluene. In another embodiment, the fluorocarbon is present at more than 1 weight %, based upon the weight of the fluorocarbon and any hydrocarbon solvent present in the reactor, alternately greater than 3 weight %, alternately greater than 5 weight %, alternately greater than 7 weight %, alternately greater than 10 weight %, alternately greater than 15 weight %. In some embodiments, the fluorocarbons are present in the polymerization reaction media at 0 to 20 volume %, based upon the volume of the media, alternately the fluorocarbons are present at 0 to 10 volume %, alternately 0 to 5 volume %, and alternately 0 to 1 volume %.

With regard to the polymerization media, suitable diluents and solvents are those that are soluble in and inert to the monomer and any other polymerization components at the polymerization temperatures and pressures.

Polymerization Reactor Configuration:

The polymerization processes of the monomer recycle processes for use with fluid phase in-line polymer blending disclosed herein may be carried out in two or more parallel reactor trains making the polymers for downstream blending, and more advantageously in two parallel reactor trains The parallel reactor trains may be fed with essentially the same or different feeds, although there must be one monomer in common between the two or more parallel reactor trains. The parallel reactor trains may be run at essentially the same or different reactor conditions. The parallel reactor trains may also produce essentially the same or different polymeric products, although for downstream blending purposes, the production of different polymeric products is advantageous. For example, one parallel reactor train may produce an olefin based homopolymer and a second parallel reactor train may produce an olefin based copolymer (referred to as polymer produced from two, three or more comonomers), wherein there is one common monomer between the two parallel reactor trains. The number of feed monomers of the copolymerization reactor train may be equal to the number of feed monomers of the combined homo- and copolymerization parallel reactor trains.

When multiple parallel reactor trains are used in the processes disclosed herein, the production of polymer blends is possible. In one particular embodiment, homopolymer and copolymer blends with a common monomer are made by using at least two reactor trains in a parallel configuration, and advantageously two parallel reactor trains. Non-limiting exemplary homopolymers include polyethylene, polypropylene, polybutene, polyhexene, polyoctene, polydecene, and polystyrene. In one embodiment, the homopolymer comprises polyethylene, polypropylene, polybutylene, polyhexene, polyoctane, polydecene, and polystyrene. In another embodiment, the homopolymer is polyethylene or polypropylene. The copolymers may be any two- or three-component combinations of ethylene, propylene, butene-1, hexene-1, octene-1, decene-1, styrene, norbornene, 1,5-hexadiene, and 1,7-octadiene. In one embodiment, the copolymers are made from a two-component combination of ethylene, propylene, butene-1, hexene-1, octane-1, decene-1, styrene, norbornene, 1,5-hexadiene, and 1,7-octadiene. In another embodiment, the copolymer is an ethylene-propylene, propylene-butene-1, propylene-hexene-1, propylene-octene-1, propylene-decene-1, ethylene-butene-1, ethylene-hexene-1 ethylene-octene-1, and/or ethylene-decene-1 copolymer. In yet another embodiment, the copolymer is an ethylene-propylene-butene-1, ethylene-propylene-hexene-1, ethylene-propylene-octene-1, and/or ethylene-propylene-decene-1 copolymer.

As previously described, the in-line blending polymer components are produced in a reactor bank composed of at least two parallel reactor trains and advantageously two parallel reactor trains. A reactor train of the parallel reactor bank may include one or more reactors that may be configured in series configuration. The number of parallel reactors trains or branches in a parallel bank may be any number, but for practical reasons, is generally limited to less than ten, alternatively not more than six parallel reactor trains, alternatively not more than five or not more than four reactor trains, alternatively not more than three parallel reactor trains, and alternatively not more than two parallel reactor trains. The number of series cascade reactors constituting a given reactor train or branch of a parallel configuration may be any number, but for practical reasons, is generally limited to not more than ten reactors in series, alternatively not more than six reactors in series, alternatively not more than three reactors in series, and alternatively not more than two reactors in series.

In one embodiment, the polymer-containing effluents from two or more reactor trains configured in a parallel configuration are combined yielding a polymer blend comprising the polymeric products of the individual reactors without first recovering the polymeric products of the individual reactors in solid forms. The two or more reactor trains constituting the parallel configuration generally include a single reactor, or alternatively, two or more reactors in series.

In another embodiment, the polymer-containing effluents from two reactor trains configured in a parallel configuration are combined yielding a polymer blend comprising the polymeric products of the individual reactors without first recovering the polymeric products of the individual reactors in solid form. The two reactor trains constituting the parallel configuration generally include a single reactor, or alternatively, two or more reactors in series.

The reactors of the polymerization system for the monomer recycle processes for use with fluid phase in-line polymer blending disclosed herein may be stirred or unstirred. When a reactor train comprises two or more reactors, the members of the reactor train are not necessarily constructed the same way, for example, the individual members of a reactor train may be stirred, unstirred, or a combination thereof. The individual reactors may also be of equal or different size. The same is true for the reactors in the entire reactor bank. The optimal reactor configuration and sizes may be determined by standard engineering techniques known to those skilled in the art of chemical engineering.

Any type of polymerization reactor may be deployed in the monomer recycle processes for use with fluid phase in-line polymer blending disclosed herein. The optimal reactor design may be determined by standard engineering techniques known to those skilled in the art of chemical engineering. Non-limiting exemplary reactor designs include stirred tank with or without an external loop, tubular reactor, and loop reactor. The reactors may operate adiabatically or may be cooled. The cooling may be achieved within the reactor, or through the reactor jacket, or dedicated heat exchange loops may be applied.

Polymerization Process Details:

The monomer recycle processes for use with fluid phase in-line polymer blending disclosed herein relate to processes to polymerize olefins comprising contacting one or more olefins having at least two carbon atoms with a suitable catalyst compound and an activator in a fluid reaction medium comprising one or two fluid phases in a reactor. In one embodiment, the fluid reaction medium is in its supercritical state. Catalyst compound and activator may be delivered as a solution or slurry, either separately to the reactor, mixed in-line just prior to the reactor, or mixed and pumped as an activated solution or slurry to the reactor. In one particular embodiment, two solutions are mixed in-line. For a given reactor train of the parallel configuration, polymerizations may be carried out in either single reactor operation, in which monomer, comonomers, catalyst(s)/activator(s), scavenger(s), and optional solvent(s) are added continuously to a single reactor or in series reactor operation, in which the above components are added to two or more reactors connected in series. The catalyst components may be added to the first reactor in the series. The catalyst component may also be added to each reactor in the series reactor train. The fresh catalyst feed if added to more than one reactor in the series train may be the same or different to each reactor and their feed rates may be the same or different.

Polymerization processes of the fluid phase in-line polymer blending processes disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Suitable reaction vessel designs include those necessary to maintain supercritical or other high-pressure ethylene polymerization reactions. Non-limiting exemplary reactors include autoclave, pump-around loop or autoclave, tubular, and autoclave/tubular reactors.

The polymerization processes of the fluid phase in-line polymer blending processes disclosed herein may operate efficiently in autoclave (also referred to as stirred tank) and tubular reactors. Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer(s) may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the polymer blending component leaving a reactor train of the process disclosed herein may itself be a blend of the same polymer with increased molecular weight and/or compositional dispersion or even a blend of homo- and copolymers.

Tubular reactors may also be used in the fluid phase in-line polymer blending processes disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the fluid phase in-line polymer blending processes disclosed herein. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS or also referred to as a separator, separator vessel, separation vessel, separator/blender vessel, or separation/blending vessel).

As will be subsequently described in detail, the temperature in the separation vessel is maintained above the solid-fluid phase separation temperature, but the pressure may be below the critical point. The pressure need only be high enough such that the monomer may condense upon contacting standard cooling water. The liquid recycle stream may then be recycled to the reactor with a liquid pumping system instead of the hyper-compressors required for polyethylene units. The relatively low pressure in separator reduces the monomer concentration in the liquid polymer phase which results in a lower polymerization rate. The polymerization rate may be low enough to operate the system without adding a catalyst poison or "killer". If a catalyst killer is required (e.g., to prevent reactions in the high pressure recycle) then provision must be made to remove any potential catalyst poisons from the recycled polymer rich monomer stream for example, by the use of fixed bed adsorbents or by scavenging with an aluminum alkyl.

In an alternative embodiment, the HPS may be operated over the critical pressure of the monomer or monomer blend but within the dense fluid-fluid two phase region, which may be advantageous if the polymer is to be produced with a revamped high-pressure polyethylene (HPPE) plant. The recycled HPS overhead is cooled and dewaxed before being returned to the suction of the secondary compressor, which is typical of HPPE plant operation. The polymer from this intermediate or high-pressure vessel then passes through another pressure reduction step to a low pressure separator. The temperature of this vessel is maintained above the polymer melting point so that the polymer from this vessel can be fed as a liquid directly to an extruder or static mixer. The pressure in this vessel is kept low by using a compressor to recover the unreacted monomers, etc. to the condenser and pumping system referenced above.

In addition to autoclave reactors, tubular reactors, or a combination of these reactors, loop-type reactors may be utilized in the fluid phase in-line polymer blending processes disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes of the fluid phase in-line polymer blending processes disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3-80%, or 5-80%, or 10-80%, or 15-80%, or 20-80%, or 25-60%, or 3-60%, or 5-60%, or 10-60%, or 15-60%, or 20-60%, or 10-50%, or 5-40%, or 10-40%, or 40-50%, or 15-40%, or 20-40%, or 30-40% or greater than 5%, or greater than 10%. In one embodiment, when the product is isotactic polypropylene and long-chain branching (LCB) of the polypropylene is desired (g'≦0.97 based on GPC-3D and using an isotactic polypropylene standard), single pass conversions may be above 30% and alternatively single-pass conversions may be above 40%. In another embodiment, when isotactic polypropylene essentially free of LCB is desired (0.97<g'<1.05), single-pass conversions may be not higher than 30% and alternatively single-pass-conversions may be not higher than 25%. To limit the cost of monomer separation and recycling, single-pass conversions may be above 3%, or above 5%, or above 10%. It should be understood that the above exemplary conversion values reflect total monomer conversion, i.e., the conversion obtained by dividing the combined conversion rate of all monomers by the total monomer feed rate. When monomer blends are used, the conversion of the more reactive monomer component(s) will always be higher than that of the less reactive monomer(s). Therefore, the conversion of the more reactive monomer component(s) can be substantially higher than the total conversion values given above, and can be essentially complete, approaching 100%.

Product Separation and Downstream Processing:

The reactor effluents of the processes disclosed herein are depressurized to a pressure significantly below the cloud point pressure. This allows separation of a polymer-rich phase for further purification and a monomer-rich phase for optional separation and recycle compression back to the reactor(s). The reactor effluents may be optionally heated before pressure let down to avoid the separation of a solid polymer phase, which causes fouling of the separators and associated reduced-pressure lines. The separation of the polymer-rich phase and the monomer-rich phase in the processes disclosed herein is carried out in a vessel known as a high-pressure separator (also referred to as an HPS, separator, separator vessel, or separation vessel). The high-pressure separator located after the mixing point of the polymer-containing product streams of all reactor trains of the parallel reactor bank is also referred to as, separator-blender, separator-blender vessel, or separation-blending vessel recognizing its dual function of blending the said polymer-containing product streams while also separating a monomer-rich phase from a polymer-rich phase, the latter of which comprises the polymer blend of the in-line blending processes disclosed herein.

One or more single-stream high-pressure separators in series are employed to partially recover the monomer(s) and optional solvent(s) from the effluent of a single reactor train (homopolymerization reactor train) before sending the polymer-enriched stream to the downstream separator-blender.

The monomer-rich phase emerging from the top of the high-pressure separator may then be directly recycled back to the homopolymerization reactor train without the need for one or more chilled towers. The downstream separator-blender blends one or more polymer-enriched streams with one or more unreduced reactor train effluents (from copolymerization reactor train) to yield a monomer-rich phase and a polymer-rich phase, the latter of which comprises the polymer blend. In one form, the monomer-rich phase may then be directly recycled back to the copolymerization reactor train without the need for one or more chilled towers. In another form, the monomer-rich phase may pass through one chilled separation tower if there is a need to separate solvent, oligomers and other heavies from the monomers prior to recycle. In another embodiment, the single-stream high-pressure separator placed upstream of the separator-blender also functions as a buffer vessel (separator-buffer vessel) by allowing the fluid level of the polymer-enriched phase to vary in the separator-buffer vessel. Such buffering enables a more precise control of the blend ratios by compensating for the momentary fluctuations in the production rates in the individual parallel reactor trains of the monomer recycle processes for use with fluid phase in-line polymer blending disclosed herein.

The polymer-rich phase of the separator-blender may then be optionally transferred to one or more low-pressure separators (LPS also referred to as a low-pressure separation vessel) running at just above atmospheric pressure for a simple flash of light components, reactants and oligomers thereof, for producing a low volatile-containing polymer melt entering the finishing extruder or optional static mixer. The one or more low-pressure separators are distinguished from the one or more high-pressure separators in generally operating at lower pressures relative to the high-pressure separators. The one or more low-pressure separators also are located downstream of the one or more high-pressure separators including the separator-blender. Moreover, the one or more low-pressure separators may function to separate light from heavy components comprising the polymer blend of the monomer recycle processes for use with fluid phase in-line polymer blending disclosed herein, whereas the one or more high-pressure separators may function to separate light from heavy components upstream of the low-pressure separator (i.e. monomer-rich phase from polymer-rich phase) and may function to blend the polymer-rich phases from two or more parallel reactor trains or may function as buffers. As previously stated, a high-pressure separator may be alternatively referred to herein as an HPS, separator, separator vessel, separation vessel, separator-blender vessel, or separation-blending vessel, or separator-blender. The use of the term "pressure" in conjunction with low-pressure separator and high-pressure separator is not meant to identify the absolute pressure levels at which these separators operate at, but is merely intended to given the relative difference in pressure at which these separators operate. Generally, separators located downstream in the monomer recycle processes for use with fluid phase in-line polymer blending disclosed herein operate at lower pressure relative to separators located upstream.

Figure 22:
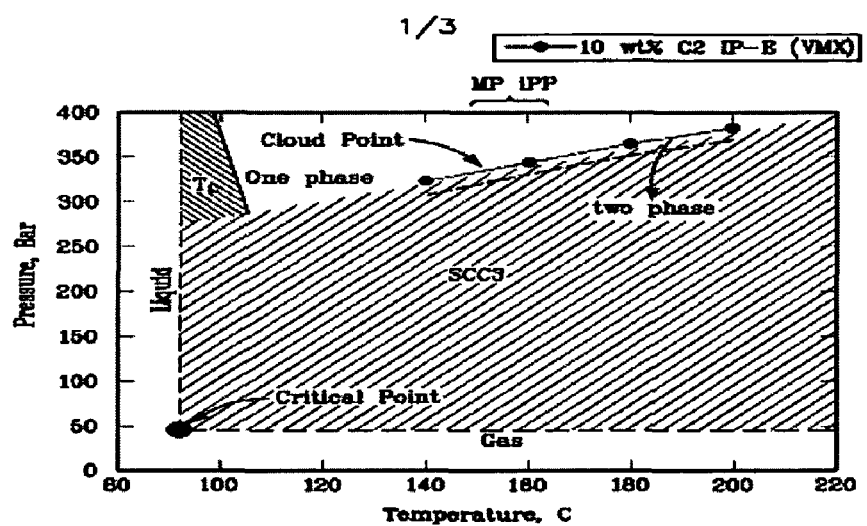
FIG. 22 presents a basic phase diagram for mixture of propylene monomer with selected polymers (isotactic polypropylene—iPP, syndiotactic polypropylene—sPP, atactic polypropylene—aPP, or propylene-ethylene copolymer)
Figure 23:
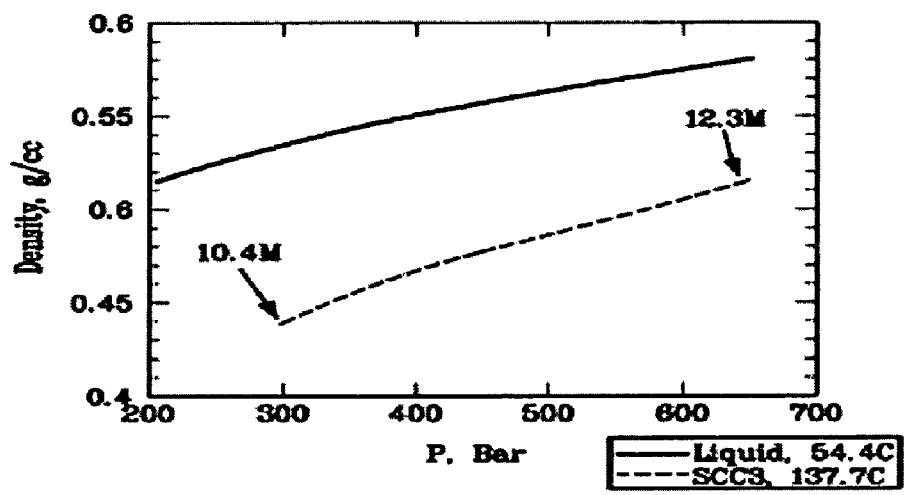
FIG. 23 presents a comparison of the density of supercritical propylene at 137.7° C. with liquid propylene at 54.4° C.

The monomer recycle processes for use with fluid phase in-line polymer blending disclosed herein for supercritical propylene polymerization may be carried out under agitation in the single-phase region in the reactor at 40-200 MPa and 95-180° C. (see FIG. 22). The product mixture from one or more reactor trains (typically the homopolymerization reactor train) may be discharged into a high-pressure separator vessel, where the pressure is dropped to a level of 25 MPa or lower, in which case, the mixture is below its cloud point, while the monomer has not yet flashed off (again, see FIG. 22). Under such conditions, it would be expected from Radosz et al., Ind. Eng. Chem. Res. 1997, 36, 5520-5525 and Loos et al., Fluid Phase Equil. 158-160, 1999, 835-846 that the monomer-rich phase would comprise less than about 0.1 wt % of low molecular weight polymer and have a density of approximately 0.3-0.6 g/mL (see FIG. 23). The polymer-rich phase would be expected to have a density of approximately 0.5-0.8 g/mL.

Assuming that the pressure is dropped rapidly enough, for example, greater than or equal to about 6 MPa/sec, the phases will separate rapidly, permitting the recycle of the monomer-rich phase as a liquid, without the issue of having the monomer-rich phase return to the gas phase. As may be appreciated by those skilled in the art, this eliminates the need for the energy-intensive compression and condensation steps.

The polymer-rich phase may then be sent to a downstream separator-blender for blending with the reactor effluent from the copolymerization reactor train. The separator-blender separates a monomer-rich phase from a polymer-rich blend phase. The polymer-rich blend phase may then be sent to one or more separator in series or may be sent directly to a coupled devolatilizer. Suitable devolatilizers may be obtained, for example, from LIST USA Inc., of Charlotte, N.C. The devolatilization is a separation process to separate remaining volatiles from the final polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich phase to be recycled may optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (supercritical or bulk liquid) state. Once again, one or more knock-out pots may be employed to aid in the removal of low molecular weight polymer from the recycle stream.

Figure 24:
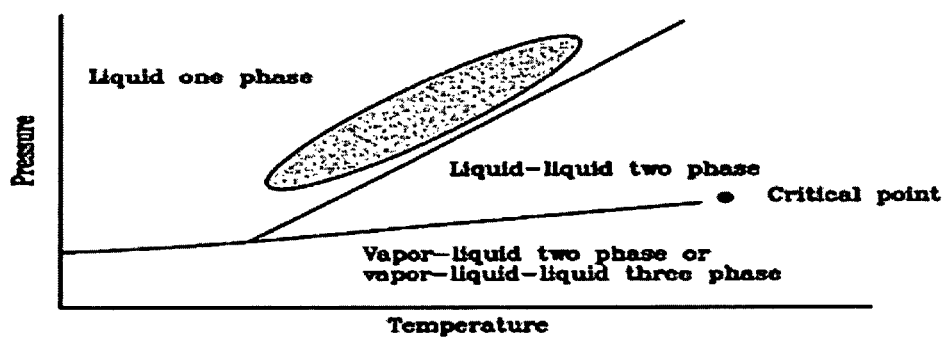
FIG. 24 presents an operating regime in accordance with the process disclosed herein for a reactor operating in a single liquid phase.

As may be appreciated, there are possible and optimal operating regimes for reactors and for the gravity (lower critical solution temperature (LCST)) separator. Referring now to FIG. 24, for reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Figure 25:
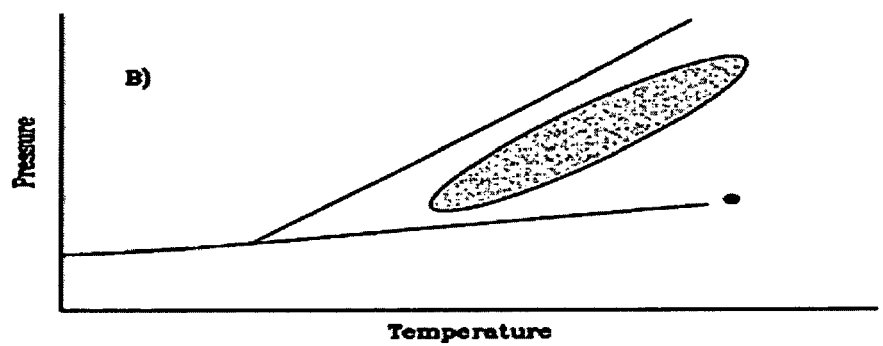
FIG. 25 presents an operating regime in accordance with the process disclosed herein for a reactor operating in a liquid-liquid phase.

Referring now to FIG. 25, for reactors operating within a two-phase fluid-fluid regime, the possible region for operation occurs basically anywhere below the LCST curve. The optimal region (again, shown within the shaded oval) occurs just below the LCST and above the VP curve, although, as may be appreciated, many factors could have a bearing on what actually is optimal, such as the final properties of the desired product. As recognized by those skilled in the art, the two-phase liquid-liquid regime is the economically advantageous method if polypropylene is to be produced with a revamped HPPE plant.

Figure 26:
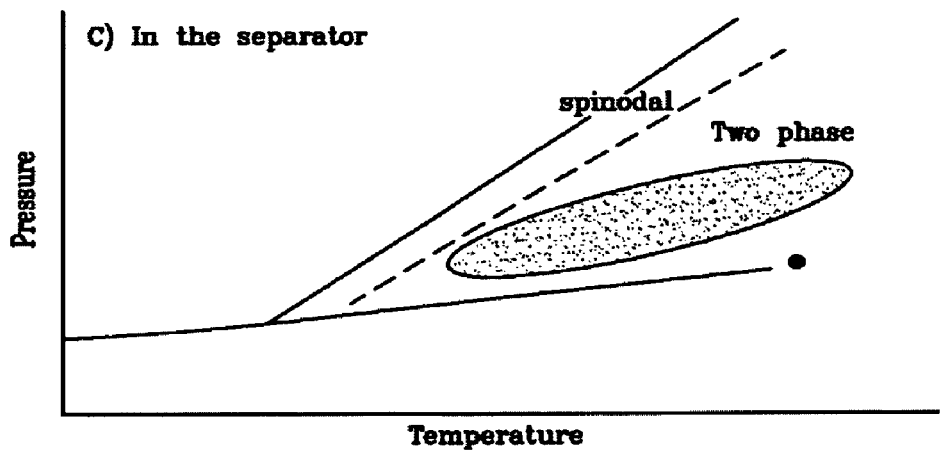
FIG. 26 presents an operating regime in accordance with the process disclosed herein for a gravity separator.

Referring now to FIG. 26, for the case where polymerization is conducted at conditions below the cloud point and the polymer-monomer mixture transported to a gravimetric LCST separator, the possible region of operation is anywhere below the LCST curve and above the VP curve. The optimal region (again, shown within the shaded oval) occurs within that portion that is below the spinodal, but not too low in pressure, as shown. Operating in this regime assures that the energy use is optimized. It is also desirable to avoid operation in the region between the LCST and spinodal curves in order to obtain good gravity settling performance. Moreover, it is desirable that the separation is effected at sufficiently high temperatures, so that crystallization does not occur in the polymer-rich phase. This may require that the temperature of the mixture in the separator be higher than the temperature in the reactor(s).

Advantageously, the liquid monomer-rich recycle stream can be recycled to the reactor using a liquid pumping system instead of a hyper-compressor, required for conventional polyethylene units.

Catalyst Killing:

The use of the processes disclosed herein and the relatively low pressure in the separator vessel greatly reduces the monomer concentration in the liquid polymer-rich phase, which, in turn, results in a much lower polymerization rate. This polymerization rate may be low enough to operate this system without adding a catalyst poison or "killer". If no killing compounds are added then the killer removal step may be eliminated.

If a catalyst killer is required, then provision must be made to remove any potential catalyst poisons from the recycled monomer-rich stream (e.g. by the use of fixed bed adsorbents or by scavenging with an aluminum alkyl). The catalyst activity may be killed by addition of a polar species. Non-limiting exemplary catalyst killing agents include water, alcohols (such as methanol and ethanol), sodium/calcium stearate, CO, and combinations thereof. The choice and quantity of killing agent will depend on the requirements for clean up of the recycle propylene and comonomers as well as the product properties, if the killing agent has low volatility. The catalyst killing agent may be introduced into the reactor effluent stream after the pressure letdown valve, but before the HPS. The choice and quantity of killing agent may depend on the requirements for clean up of the recycle propylene and comonomers as well as the product properties, if the killing agent has low volatility.

Polymer Blending Components:

The polymers produced by processes disclosed herein may be many structure types, including, but not limited to, block, linear, radial, star, branched, and combinations thereof.

Some forms produce polypropylene and copolymers of polypropylene with a unique microstructure. The processes disclosed herein can be practiced such that novel isotactic, atactic, and syndiotactic compositions are made. In other forms, crystalline polymers are made.

The processes disclosed herein produce propylene polymers with a melting point of 40 to 165° C., and a weight-average molecular weight of 2,000 to 1,000,000, 10,000 to 1,000,000, 15,000 to 500,000, 25,000 to 250,000 or 35,000 to 150,000.

The processes disclosed herein produce polymer with a heat of fusion, $\Delta H_f$, of 1-30 J/g, 2-20 J/g, or 3-10 J/g. In another form, the processes disclosed herein produce polymers having a $\Delta H_f$ of up to 10 J/g, alternately 50 to 110 J/g, alternatively 70 to 10 J/g.

Dienes can be used as a comonomer to increase the molecular weight of the resulting polymer and to create long chain branching. Vinyl chloride can be used as a comonomer to increase the degree of vinyl termination in the polymer.

The processes disclosed herein can produce long-chain-branched polypropylene. Long-chain branching is achievable using the processes disclosed herein regardless of whether additional $\alpha,\omega$-diene or other diene such as vinylnorbornene are used. In one form, less than 0.5 wt % diene is used in the combined feed to any polymerization train of the reactor bank. Alternatively, less than 0.4 wt %, or 0.3 wt %, or 0.2 wt %, or 1000 wt ppm, or 500 wt ppm, or 200 wt ppm, or 100 wt ppm are used.

In some forms, the processes disclosed herein involve using as a comonomer an $\alpha,\omega$-diene and the olefin/$\alpha,\omega$-diene copolymers resulting from that use. Additionally, the processes disclosed herein involve a copolymerization reaction of olefin monomers, wherein the reaction includes propylene and ethylene copolymerization with an $\alpha,\omega$-diene and the copolymers that are made. These copolymers may be employed in a variety of articles including, for example, films, fibers, such as spunbonded and melt blown fibers, fabrics, such as nonwoven fabrics, and molded articles. More particularly, these articles include, for example, cast films, oriented films, injection molded articles, blow molded articles, foamed articles, foam laminates and thermoformed articles.

It should be noted that while linear $\alpha,\omega$-dienes are disclosed, other dienes can also be employed to make polymers using the processes disclosed herein. These would include branched, substituted $\alpha,\omega$-dienes, such as 2-methyl-1,9-decadiene; cyclic dienes, such as vinylnorbornene; or aromatic types, such as divinyl benzene.

Other forms include copolymers having from 98 to 99.999 weight % olefin units, and from 0.001 to 2.000 weight % $\alpha,\omega$-diene units. Copolymer forms may have a weight-average molecular weight from 50,000 to 2,000,000, crystallization temperatures from 50° C. to 140° C. and a melt flow rate (MFR) from 0.1 g/10 min to 1500 g/10 min. These forms display high crystallization temperatures intrinsically, hence there is no need for externally added nucleating agents.

In other forms, the copolymer includes from 90 to 99.999 weight % of propylene units, from 0.000 to 8 weight % of olefin units other than propylene units and from 0.001 to 2 weight % $\alpha,\omega$-diene units. Copolymer forms may have weight-average molecular weights from 20,000 to 2,000,000, crystallization temperatures (without the addition of external nucleating agents) from 115° C. to 135° C. and MFRs from 0.1 g/10 min to 100 g/10 min. The accompanying olefin may be any of $C_2$-$C_{20}$ $\alpha$-olefins, diolefins (with one internal olefin) and their mixtures thereof. More specifically, olefins include ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene.

Copolymers of isotactic polypropylene made under supercritical conditions include ethylene and $C_4$-$C_{12}$ comonomers such as butene-1,3-methylpentene-1, hexene-1,4-methylpentene-1, octene-1, and decene-1. The in-line blending processes disclosed herein can prepare these copolymers without the use of solvent or in an environment with low solvent concentration.

Propylene polymers produced typically comprise 0 to 60 weight % of a comonomer, or 1 to 50 weight %, or 2 to 40 weight %, or 4 to 30 weight %, or 5 to 25 weight %, or 5 to 20 weight %, and have one or more of:

1. a heat of fusion, $\Delta H_f$, of 30 J/g or more, or 50 J/g or more, or 60 or more, or 70 or more, or 80 or more, or 90 or more, or 95 or more, or 100 or more, or 105 or more or an $\Delta H_f$ of 30 J/g or less, or 20 J/g or 0;
2. a weight average molecular weight (as measured by GPC DRI) of 20,000 or more, or 30,000 to 1,000,000, or 50,000 to 500,000, or 50,000 to 400,000;
3. a melt flow rate of 0.1 g/10 min or more, or 0.5 g/10 min or more, or 1.0 g/10 min or more, or between 0.1 and 10,000 g/10 min;
4. a melting peak temperature of 55° C. or more, or 75° C. or more, or 100° C. or more, or 125° C. or more, or 150° C. or more, between 145 and 165° C.;
5. an $M_w/M_n$ (as measured by GPC DRI) of about 1.5 to 20, or about 1.5 to 10, or 1.8 to 4.

In another form, the polymers produced by the processes disclosed herein have a melt viscosity of less than 10,000 centipoises at 180° C. as measured on a Brookfield viscometer, or between 1000 to 3000 cP for some forms (such as packaging and adhesives) or between 5000 and 10,000 cP for other applications.

Polymer Blends and Polymer Additives:

Many different types of polymer blends may be made by the monomer recycle processes for use with fluid phase in-line polymer blending disclosed herein. A major fraction of a blend is defined as 50% or more by weight of the blend. A minor fraction of a blend is defined as less than 50% by weight of the blend. The monomer recycle processes for use with fluid phase in-line polymer blending disclosed herein are advantageous for producing olefin-based polymer blends in which the polymers can be divided into two groups, P1 and P2, for which the following conditions satisfied:

$$N(P1+P2)=N(P2) \text{ and } N(P2) \geq N(P1)$$

where N(P1+P2) is the number of monomers in the combined monomer pool of P1 and P2 polymer groups, and N(P1) and N(P2) are the number of monomers in the first (P1) and second (P2) group of polymers, respectively.

In some forms, the polymer blends produced by the monomer recycle processes for use with fluid phase in-line polymer blending disclosed herein include two or more polymers, including but not limited to, thermoplastic polymer(s) and/or elastomer(s). In another advantageous form, the polymer blends produced by the monomer recycle processes for use with fluid phase in-line polymer blending disclosed herein include two polymers (a homopolymer produced in one parallel reactor train and a copolymer produced in a second parallel reactor train) wherein the homopolymer and copolymer have a common monomer and are thermoplastic polymer(s) and/or elastomer(s).

A "thermoplastic polymer(s)" is a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Polyolefins include, but are not limited to, polymers comprising one or more linear, branched or cyclic $C_2$ to $C_{40}$ olefins, polymers comprising propylene copolymerized with one or more $C_2$ or $C_4$ to $C_{40}$ olefins, $C_3$ to $C_{20}$ alpha olefins, or $C_3$ to $C_{10}$ α-olefins. Also, polyolefins include, but are not limited to, polymers comprising ethylene including but not limited to ethylene copolymerized with a $C_3$ to $C_{40}$ olefin, a $C_3$ to $C_{20}$ alpha olefin, propylene and/or butene.

"Elastomers" encompass all natural and synthetic rubbers, including those defined in ASTM D1566). Examples of useful elastomers include, but are not limited to, ethylene propylene rubber, ethylene propylene diene monomer rubber, styrenic block copolymer rubbers (including SI, SIS, SB, SBS, SEBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another form, the polymer blends produced herein may include one or more of isotactic polypropylene, highly isotactic polypropylene, syndiotactic polypropylene, atactic polypropylene, random copolymer of propylene and ethylene and/or butene and/or hexene, polybutene, ethylene vinyl acetate, low density polyethylene (density 0.915 to less than 0.935 g/cm³), linear low density polyethylene, ultra low density polyethylene (density 0.86 to less than 0.90 g/cm³), very low density polyethylene (density 0.90 to less than 0.915 g/cm³), medium density polyethylene (density 0.935 to less than 0.945 g/cm³), high density polyethylene (density 0.945 to 0.98 g/cm³), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, polymers that are a hydrolysis product of EVA that equate to an ethylene vinyl alcohol copolymer, polymers of aromatic monomers such as polystyrene, poly-1 esters, polyacetal, polyvinylidine fluoride, polyethylene glycols and/or polyisobutylene.

In another form, elastomers are blended using the processes disclosed herein to form rubber toughened compositions. In some forms, the rubber toughened composition is a two (or more) phase system where the elastomer is a discontinuous phase and the polymer produced herein is a continuous phase. This blend may be combined with tackifiers and/or other additives as described herein.

In another form, the polymer blends produced by the processes disclosed herein may include elastomers or other soft polymers to form impact copolymers. In some forms, the blend is a two (or more) phase system where the elastomer or soft polymer is a discontinuous phase and other polymer(s) is a continuous phase. The blends produced herein may be combined with tackifiers and/or other additives as described herein.

In some forms, the polymers blends disclosed herein include metallocene polyethylenes (mPEs) or metallocene polypropylenes (mPPs). The mPE and mPP homopolymers or copolymers are typically produced using mono- or bis-cyclopentadienyl transition metal catalysts in combination with an activator of aluminoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In some forms the polymer blends produced by the processes disclosed herein include one polymer at from 10 to 99 weight %, based upon the weight of the polymers in the blend, or 20 to 95 weight %, or at least 30 to 90 weight %, or at least 40 to 90 weight %, or at least 50 to 90 weight %, or at least 60 to 90 weight %, or at least 70 to 90 weight % with one or more other polymers constituting the remainder of the blend.

In another form, in-line polymer blends are produced from propylene-based polymers made at homogeneous polymerization conditions, particularly at bulk homogeneous polymerization conditions, such as bulk homogeneous supercritical or bulk solution polymerization.

In another form, in-line polymer blends are produced from propylene-based polymers made at homogeneous polymerization conditions, particularly at bulk homogeneous polymerization conditions, such as bulk homogeneous supercritical or bulk solution polymerization, and comprise the following:
(a) 10-20 wt % of isotactic polypropylene with 0.8-10,000 g/10 min MFR and melting peak temperatures of 80-165° C. plus 80-90 wt % crystallizable ethylene-propylene copolymer comprising 10-16 wt % ethylene content and 0.8-100 g/10 min MFR or
(b) 15-90 wt % of isotactic polypropylene with 0.8-10,000 g/10 min MFR and melting peak temperatures of 80-165° C. plus 10-85 wt % propylene copolymer of isotactic polypropylene crystallinity comprising 1-20 wt % ethylene or 1-40 wt % hexene-1 or 1-30 wt butene-1 content and 0.8-100 g/10 min MFR or
(c) 10-30 wt % of isotactic polypropylene with 0.8-10,000 g/10 min MFR and melting peak temperatures of 80-165° C. plus 90-70 wt % low-crystallinity (0-30 J/g) homo- or copolymer with MFR of 0.8-500 g/10 min.

The in-line polymer blends produced by the process disclosed herein may be also blended with other polymers and additives using the in-line blending process for other polymers and additives depicted in FIGS. 10 and 11, in an extrusion process downstream of in-line polymerization/separation/blending processes disclosed herein, or blended in an off-line compounding process.

Any of the above polymers included in the in-line polymer blends produced by the processes disclosed herein may be functionalized. Functionalized means that the polymer has been contacted with an unsaturated acid or anhydride. Forms of unsaturated acids or anhydrides include any unsaturated organic compound containing at least one double bond and at least one carbonyl group. Representative acids include carboxylic acids, anhydrides, esters and their salts, both metallic and non-metallic. The organic compound contains an ethylenic unsaturation conjugated with a carbonyl group (—C═O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is one particular form. The unsaturated acid or anhydride is present at about 0.1 weight % to about 5 weight %, or at about 0.5 weight % to about 4 weight %, or at about 1 to about 3 weight %, based upon the weight of the hydrocarbon resin and the unsaturated acid or anhydride.

Tackifiers may also be blended either in-line by the processes disclosed herein (see FIGS. 10 and 11), in-line via an extrusion process downstream of in-line polymerization/separation/blending processes disclosed herein, or in an off-line compounding process. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. Non-polar tackifiers are substantially free of monomers having polar groups. The polar groups are generally not present; however, if present, they are not present at more that 5 weight %, or not more that 2 weight %, or no more than 0.5 weight %. In some embodiments, the tackifier has a softening point (Ring and Ball, as measured by ASTM E-28) of 80° C. to 140° C., or 100° C. to 130° C. In some embodiments the tackifier is functionalized. By functionalized is meant that the hydrocarbon resin has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C═O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present in the tackifier at about 0.1 weight % to 10 weight %, or at 0.5 weight % to 7 weight %, or at 1 to 4 weight %, based upon the weight of the hydrocarbon resin and the unsaturated acid or anhydride.

The tackifier, if present, is typically present at 1 weight % to 50 weight %, based upon the weight of the blend, or 10 weight % to 40 weight %, or 20 weight % to 40 weight %. Generally however, tackifier is not present, or if present, is present at less than 10 weight %, or less than 5 weight %, or at less than 1 weight %.

In another form, the polymer blends produced by the processes disclosed herein further comprise a crosslinking agent. The crosslinking agent may be blended either in-line by the processes disclosed herein (see FIGS. 10 and 11), in-line via an extrusion process downstream of in-line polymerization/separation/blending processes disclosed herein, or in an off-line compounding process. Useful crosslinking agents include those having functional groups that can react with the acid or anhydride group and include alcohols, multiols, amines, diamines and/or triamines. Non-limiting examples of crosslinking agents useful include polyamines such as ethylenediamine, diethylenetriamine, hexamethylenediamine, diethylaminopropylamine, and/or menthanediamine.

In another form, the polymer blends produced by the processes disclosed herein, and/or blends thereof, further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, nucleating agents and/or clarifying agents. These additives may be present in the typically effective amounts well known in the art, such as 0.001 weight % to 10 weight %. These additive may be blended either in-line by the processes disclosed herein (see FIGS. 10 and 11), in-line via an extrusion process downstream of in-line polymerization/separation/blending processes disclosed herein, or in an off-line compounding process.

Useful fillers, cavitating agents and/or nucleating agents include titanium dioxide, calcium carbonate, barium sulfate, silica, silicon dioxide, carbon black, sand, glass beads, mineral aggregates, talc, clay and the like. Nucleating agents of the non-clarifying type include, but are not limited to, sodium benzoate, Amfine NA 11, Amfine NA 21, and Milliken HPN 68.

Useful antioxidants and UV stablilizers include phenolic antioxidants, such as Irganox 1010, Irganox 1076 both available from Ciba-Geigy. Oils may include paraffinic or naphthenic oils such as Primol 352, or Primol 876 available from ExxonMobil Chemical France, S.A. in Paris, France. The oils may include aliphatic naphthenic oils, white oils or the like.

Plasticizers and/or adjuvants may include mineral oils, polybutenes, phthalates and the like. The plasticizers may include phthalates such as diisoundecyl phthalate (DIUP), diisononylphthalate (DINP), dioctylphthalates (DOP) and polybutenes, such as Parapol 950 and Parapol 1300 available from ExxonMobil Chemical Company in Houston Tex. Additional plasticizers include those disclosed in WO0118109A1, U.S. patent application Ser. No. 10/640,435, now U.S. Pat. No. 7,619,026, and U.S. patent application Ser. No. 11/177,004, now abandoned, which are incorporated by reference herein with regard to plasticizer compositions and blending thereof.

Useful processing aids, lubricants, waxes, and/or oils include low molecular weight products such as wax, oil or low $M_n$ polymer, (low meaning below $M_n$ of 5000, or below 4000, or below 3000, or below 2500). Useful waxes include polar or non-polar waxes, functionalized waxes, polypropylene waxes, polyethylene waxes, and wax modifiers.

Useful functionalized waxes include those modified with an alcohol, an acid, or a ketone. Functionalized means that the polymer has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present at 0.1 weight % to 10 weight %, or at 0.5 weight % to 7 weight %, or at 1 to 4 weight %, based upon the weight of the hydrocarbon resin and the unsaturated acid or anhydride. Examples include waxes modified by methyl ketone, maleic anhydride or maleic acid. Low Mn polymers include polymers of lower alpha olefins such as propylene, butene, pentene, hexene and the like. A useful polymer includes polybutene having an Mn of less than 1000 g/mol. An example of such a polymer is available under the trade name PARAPOL™ 950 from ExxonMobil Chemical Company. PARAPOL™ 950 is a liquid polybutene polymer having an Mn of 950 g/mol and a kinematic viscosity of 220 cSt at 100° C., as measured by ASTM D 445.

Useful clarifying agents include, but are not limited to, the benzalsorbitol family of clarifiers, and more particularly dibenzalsorbitol (Millad 3905), di-p-methylbenzalsorbitol (Milliad 3940), and bis-3,4-dimethylbenzalsorbitol (Milliad 3988).

Applications:

The polymer blends produced by the processes disclosed herein are typically used in any known thermoplastic or elastomer application. Non-limiting examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. An in-line blending process for polymers comprising:
  (a) providing two or more reactor trains configured in parallel and two or more high-pressure separators downstream fluidly connected to the two or more reactor trains configured in parallel;
  (b) contacting in the two or more reactor trains configured in parallel 1) olefin monomers having two or more carbon atoms, 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa,
  wherein the polymerization system for each reactor train is in its dense fluid state and comprises the olefin monomers, any comonomer present, any diluent or solvent present, any scavenger present, and the polymer product, and
  wherein the catalyst system for each reactor train comprises one or more catalyst precursors, one or more activators, and optionally, one or more catalyst supports;
  (c) forming an unreduced reactor effluent including a homogenous fluid phase polymer-monomer mixture in each reactor train configured in parallel,
  wherein one or more of the parallel reactor trains define a first group (G1) of reactor trains and another one or more of the parallel reactor trains define a second group (G2) of reactor trains, wherein the number of monomers (N) in the feed monomer pools for G1 (N(G1)), G2 (N(G2)), and for the combined feed monomer pool of G1 and G2 (N(G1+G2)) are related as follows: N(G1+G2)=N(G2) and N(G1)≦N (G2), and wherein the feed monomer pool in each reactor train of G2 are the same;

(d) passing the unreduced reactor effluents from one or more of the G1 reactor trains through one or more high-pressure separators, maintaining the temperature and pressure within the one or more high-pressure separators above the solid-fluid phase transition point but below the cloud point pressure and temperature to form fluid-fluid two-phase systems in each of the one or more high-pressure separators with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases;

(e) passing the one or more polymer-enriched phases from the one or more high-pressure separators of (d), any unreduced reactor effluents of G1 not passing through the one or more high-pressure separators of G1, and the unreduced reactor effluents of the G2 reactor trains through another high-pressure separator for product blending and product-feed separation;

(f) maintaining the temperature and pressure within the another high-pressure separator of (e) above the solid-fluid phase transition point but below the cloud point pressure and temperature to form a fluid-fluid two-phase system comprising a polymer-rich blend phase and a monomer-rich phase;

(g) separating the monomer-rich phase from the polymer-rich blend phase in the another high-pressure separator of (e) to form a polymer-rich blend and a separated monomer-rich phase;

(h) recycling the one or more separated monomer-rich phases of (d) to one or more reactor trains of G1; and (i) recycling the separated monomer-rich phase of (g) to one or more reactor trains of G2.

2. The process of claim 1 wherein the combined flow rates of each monomer in the one or more polymer-enriched phases from (d) plus the combined flow rate of each monomer in any unreduced reactor effluents of G1 not passing through the one or more high-pressure separators of G1 minus the combined flow rate of each monomer purged from the process of claim 1 is less than or equal to the combined conversion rate of the corresponding monomer in the G2 reactor trains.

3. The process of claim 1 wherein G1 includes one reactor train and G2 includes one reactor train.

4. The process of claim 1 wherein at least one of the reactor trains of each of G1 and G2 includes propylene.

5. The process of claim 1 wherein the optional one or more comonomers of (b) comprise one or more of ethylene, propylene, butenes, hexenes, octenes, decenes, or dodecenes.

6. The process of claim 1 wherein the one or more reactor trains of G1 polymerize a homopolymer and the one or more reactor trains of G2 polymerize a copolymer.

7. The process of claim 6 wherein the homopolymer is chosen from isotactic polypropylene, syndiotactic polypropylene, atactic polypropylene, polyethylene, polybutene, polyhexene, polyoctene, polydecene, and polystyrene.

8. The process of claim 6 wherein the copolymer is chosen from ethylene-propylene, propylene-butene-1, propylene-hexene-1, propylene-octene-1, propylene-decene-1, ethylene-butene-1, ethylene-hexene-1, ethylene-octene-1, ethylene-propylene-butene-1, ethylene-propylene-hexene-1, ethylene-propylene-octene-1, and ethylene-propylene-decene-1 copolymers.

9. The process of claim 1 further comprising removing low molecular weight oligomers, low molecular weight polymers, solvents/diluents or combinations thereof from the separated monomer-rich phases of (d) and/or (g).

10. The process of claim 9 wherein the low-molecular weight oligomers, low molecular weight polymers, solvents/diluents or combinations thereof are removed through the use of at least one knock-out pot, at least one separation tower, or a combination thereof.

11. The process of claim 1 further comprising feeding the combined one or more polymer-enriched phases from the one or more high-pressure separators of (d), the unreduced reactor effluents of G1 not passing through the one or more high-pressure separators of G1, and the unreduced reactor effluents of the G2 reactor trains through one or more static mixers.

12. The process of claim 1 further comprising providing one or more storage tanks, and feeding from the one or more storage tanks one or more polymers and/or polymer additives to the process after (c).

13. The process of claim 1 further comprising one or more pressure letdown valves for each reactor train positioned before the two or more high-pressure separators of (a), and one or more pressure letdown valves between the two or more high-pressure separators of (a).

14. The process of claim 1 further comprising feeding the polymer-rich blend of (g) to one or more low-pressure separators serially connected to further separate the monomers and other volatiles to form a further-enriched polymer blend and one or more monomer-rich streams.

15. The process of claim 14 further comprising feeding the further-enriched polymer blend to a coupled devolatizer to further separate other volatiles to form a polymer blend.

16. The process of claim 15 wherein the coupled devolatilizer operates under vacuum enabling the further-enriched polymer blend to flash off the monomers and other volatiles.

17. The process of claim 15 wherein the coupled devolatilizer is a devolatizing extruder.

18. The process of claim 17 wherein one or more polymer additives are added to the polymer blend at one or more high-pressure separators, one or more low-pressure separators, the devolatizing extruder or combinations thereof.

19. The process of claim 1 wherein the two or more high-pressure separators of (a) are gravimetric separation vessels.

20. The process of claim 13 wherein the pressure is dropped at a rate of at least about 6 MPa/sec.

21. The process of claim 12 or 18 wherein the one or more polymer additives are chosen from waxes, polyalfaolefins, antioxidants, plasticizers, nucleating and clarifying agents, slip agents, flame retardants, heat and UV stabilizers, antiblocking agents, fillers, reinforcing fibers, antistatic agents, lubricating agents, coloring agents, foaming agents, and combinations thereof.

22. The process of claim 1 wherein one or more of the reactor trains configured in parallel of (a) comprise a tubular reactor, a stirred autoclave reactor, a loop reactor, or combinations thereof.

23. The process of claim 1 wherein one or more of the reactor trains configured in parallel of (a) comprise two or more reactors in series wherein the two or more reactors in series comprise a tubular reactor followed by a stirred autoclave reactor or a tubular reactor followed by a loop reactor.

24. An in-line blending process for polymers comprising:
(a) providing two or more reactor trains configured in parallel and a high-pressure separator downstream fluidly connected to the two or more reactor trains configured in parallel;
(b) contacting in the two or more reactor trains configured in parallel 1) olefin monomers having two or more carbon atoms, 2) one or more catalyst systems, 3) optional one or more comonomers, 4) optional one or more scavengers, and 5) optional one or more diluents or solvents,
wherein at least one of the reactor trains configured in parallel is at a temperature above the solid-fluid phase-transition temperature of the polymerization system and a pressure no lower than 10 MPa below the cloud point pressure of the polymerization system and less than 1500 MPa,
wherein the polymerization system for each reactor train is in its dense fluid state and comprises the olefin monomers, any comonomer present, any diluent or solvent present, any scavenger present, and the polymer product, and
wherein the catalyst system for each reactor train comprises one or more catalyst precursors, one or more activators, and optionally, one or more catalyst supports;
(c) forming a reactor effluent including a homogeneous fluid phase polymer-monomer mixture in each reactor train configured in parallel,
wherein one or more of the parallel reactor trains define a first group (G1) of reactor trains and another one or more of the parallel reactor trains define a second group (G2) of reactor trains,
wherein the number of monomers (N) in the feed monomer pools for G1 (N(G1)), G2 (N(G2)), and for the combined feed monomer pool of G1 and G2 (N(G1+G2)) are related as follows: N(G1+G2)=N(G2) and N(G1)≦N(G2), and
wherein the feed monomer pool in each reactor train of G2 are the same;
(d) passing the reactor effluent comprising the homogeneous fluid phase polymer-monomer mixture from each reactor train of G1 and G2 through the high-pressure separator for product blending and product-feed separation;
(e) maintaining the temperature and pressure within the high-pressure separator above the solid-fluid phase transition point but below the cloud point pressure and temperature to form a fluid-fluid two-phase system comprising a polymer-rich blend phase and a monomer-rich phase;
(f) separating the monomer-rich phase from the polymer-rich blend phase in the high-pressure separator to form a polymer-rich blend and a separated monomer-rich phase; and
(g) recycling the separated monomer-rich phase of (f) to one or more reactor trains of G2 without recovering individual monomer components.

25. The process of claim 24 wherein the combined flow rates of each monomer in the reactor effluent from each reactor train of G1 minus the combined flow rates of each monomer purged from the process of claim 24 is less than or equal to the combined conversion rate of the corresponding monomer in the G2 reactor trains.

26. The process of claim 24 wherein G1 includes one reactor train and G2 includes one reactor train.

27. The process of claim 24 wherein at least one of the reactor trains of each of G1 and G2 includes propylene.

28. The process of claim 24 wherein the optional one or more comonomers of (b) comprise one or more of ethylene, propylene, butenes, hexenes, octenes, decenes, or dodecenes.

29. The process of claim 24 wherein the one or more reactor trains of G1 polymerize a homopolymer and the one or more reactor trains of G2 polymerize a copolymer.

30. The process of claim 29 wherein the homopolymer is chosen from isotactic polypropylene, syndiotactic polypropylene, atactic polypropylene, polyethylene, polybutene, polyhexene, polyoctene, polydecene, and polystyrene.

31. The process of claim 29 wherein the copolymer is chosen from ethylene-propylene, propylene-butene-1, propylene-hexene-1, propylene-octene-1, propylene-decene-1, ethylene-butene-1, ethylene-hexene-1, ethylene-octene-1, ethylene-propylene-butene-1, ethylene-propylene-hexene-1, ethylene-propylene-octene-1 copolymers, and ethylene-propylene-decene-1.

32. The process of claim 24 further comprising removing low molecular weight oligomers, low molecular weight polymers, solvents/diluents or combinations thereof from the separated monomer-rich phase of (f).

33. The process of claim 32 wherein the low-molecular weight oligomers, low molecular weight polymers, solvents/diluents or combinations thereof are removed through the use of at least one knock-out pot, at least one separation tower, or a combination thereof.

34. The process of claim 24 further comprising feeding the combined reactor effluents of G1 and/or G2 through one or more static mixers.

35. The process of claim 24 further comprising providing one or more storage tanks, and feeding from the one or more storage tanks one or more polymers and/or polymer additives to the process after (c).

36. The process of claim 24 further comprising one or more pressure letdown valves for each reactor train positioned before the high-pressure separator.

37. The process of claim 24 further comprising feeding the polymer-rich blend of (f) to one or more low-pressure separators serially connected to further separate the monomers and other volatiles to form a further-enriched polymer blend and one or more monomer-rich streams.

38. The process of claim 37 further comprising feeding the further-enriched polymer-rich blend to a coupled devolatizer to further separate other volatiles to form a polymer blend.

39. The process of claim 38 wherein the coupled devolatilizer operates under vacuum enabling the further-enriched polymer-rich blend to flash off the monomers and other volatiles.

40. The process of claim 38 wherein the coupled devolatilizer is a devolatizing extruder.

41. The process of claim 38 wherein one or more polymer additives are added to the polymer blend at the high-pressure separator, one or more low-pressure separators, the devolatizing extruder or combinations thereof.

42. The process of claim 24 wherein the high-pressure separator of (d) is a gravimetric separation vessel.

43. The process of claim 36 wherein the pressure is dropped at a rate of at least about 6 MPa/sec.

44. The process of claims 35 or 41 wherein the one or more polymer additives are chosen from waxes, polyalfaolefins, antioxidants, plasticizers, nucleating and clarifying agents, slip agents, flame retardants, heat and UV stabilizers, antiblocking agents, fillers, reinforcing fibers, antistatic agents, lubricating agents, coloring agents, foaming agents, and combinations thereof.

45. The process of claim 24 wherein one or more of the reactor trains configured in parallel of (a) comprise a tubular reactor, a stirred autoclave reactor, a loop reactor, or combinations thereof.

46. The process of claim 24 wherein one or more of the reactor trains configured in parallel of (a) comprise two or more reactors in series wherein the two or more reactors in series comprise a tubular reactor followed by a stirred autoclave reactor or a tubular reactor followed by a loop reactor.

47. An in-line blending process for polymers comprising:
(a) providing a first group (G1) of one or more reactor trains and a second group (G2) of one or more reactor trains, wherein G1 polymerizes a polypropylene homopolymer and G2 polymerizes a polypropylene copolymer, wherein one high-pressure separator is fluidly connected to G1 and another high-pressure separator is fluidly connected to G2, and wherein the G1 reactor trains are configured parallel to and fluidly connected to the G2 reactor trains;
(b) contacting in each of the reactor trains of G1 and G2: 1) propylene monomer, 2) one or more catalyst systems, 3) one or more comonomers in each of the reactor trains of G2, 4) optional one or more scavengers, and 5) optional one or more diluents or solvents,
wherein each of the reactor trains for G1 and G2 are at a temperature above the solid-fluid phase-transition temperature of the polymerization system and a pressure no lower than 10 MPa below the cloud point pressure of the polymerization system and less than 1500 MPa and have at least one common monomer,
wherein the polymerization system for each reactor train of G1 and G2 is in its dense fluid state and comprises propylene monomer, any diluent or solvent present, any scavenger present, and the polymer product, and the polymerization system for the second reactor train further comprises one or more comonomers, and
wherein the catalyst system for each reactor train of G1 and G2 comprises one or more catalyst precursors, one or more activators, and optionally, one or more catalyst supports;
(c) forming an unreduced reactor effluent including a homogenous fluid phase polymer-monomer mixture in each reactor train of G1 and G2;
(d) passing the unreduced reactor effluents from the one or more of the G1 reactor trains through a high-pressure separator while maintaining the temperature and pressure within the high-pressure separator above the solid-fluid phase transition point but below the cloud point pressure and temperature to form a fluid-fluid two-phase systems comprising a polymer-enriched phase and a monomer-rich phase, and separating the monomer-rich phase from the polymer-enriched phase in the high-pressure separator to form a separated monomer-rich phase and a polymer-enriched phase;
(e) passing the polymer-enriched phase from the high-pressure separator of (d) and the unreduced reactor effluents of the G2 reactor trains through another high-pressure separator for product blending and product-feed separation;
(f) maintaining the temperature and pressure within the another high-pressure separator of (e) above the solid-fluid phase transition point but below the cloud point pressure and temperature to form a fluid-fluid two-phase system comprising a polymer-rich blend phase and a monomer-rich phase;
(g) separating the monomer-rich phase from the polymer-rich blend phase in the another high-pressure separator of (e) to form a polymer-rich blend and a separated monomer-rich phase;
(h) recycling the separated monomer-rich phase of (d) to the one or more reactor trains of G1; and
(i) recycling the separated monomer-rich phase of (g) to one or more reactor trains of G2.

48. The process of claim 47 wherein the polypropylene copolymer is chosen from ethylene-propylene, propylene-butene-1, propylene-hexene-1, propylene-octene-1, propylene-decene-1, ethylene-propylene-butene-1, ethylene-propylene-hexene-1, ethylene-propylene-octene-1, and ethylene-propylene-decene-1 copolymers.

49. The process of claim 47 wherein the combined flow rate of propylene monomer in the polymer-enriched phase from (d) minus the combined flow rate of propylene monomer purged from the process of claim 47 is less than or equal to the combined conversion rate of the propylene monomer in the G2 reactor trains of (a).

50. An in-line blending process for polymers comprising:
(a) providing a first group (G1) of one or more reactor trains and a second group (G2) of one or more reactor trains, wherein G1 polymerizes a polypropylene homopolymer and G2 polymerizes a polypropylene copolymer, wherein a high-pressure separator is fluidly connected to G1 and G2, and wherein the G1 reactor trains are configured parallel to and fluidly connected to the G2 reactor trains;
(b) contacting in each of the reactor trains of G1 and G2: 1) propylene monomer, 2) one or more catalyst systems, 3) one or more comonomers in each of the reactor trains of G2, 4) optional one or more scavengers, and 5) optional one or more diluents or solvents,
wherein each of the reactor trains for G1 and G2 are at a temperature above the solid-fluid phase-transition temperature of the polymerization system and a pressure no lower than 10 MPa below the cloud point pressure of the polymerization system and less than 1500 MPa and have at least one common monomer,
wherein the polymerization system for each reactor train of G1 and G2 is in its dense fluid state and comprises propylene monomer, any diluent or solvent present, any scavenger present, and the polymer product, and the polymerization system for the second reactor train further comprises one or more comonomers, and
wherein the catalyst system for each reactor train of G1 and G2 comprises one or more catalyst precursors, one or more activators, and optionally, one or more catalyst supports;
(c) forming a reactor effluent including a homogeneous fluid phase polymer-monomer mixture in each reactor train of G1 and G2;
(d) passing the reactor effluents from each reactor train of G1 and G2 through the high-pressure separator for product blending and product-feed separation;
(e) maintaining the temperature and pressure within the high-pressure separator above the solid-fluid phase transition point but below the cloud point pressure and temperature to form a fluid-fluid two-phase system comprising a polymer-rich blend phase and a monomer-rich phase;
(f) separating the monomer-rich phase from the polymer-rich blend phase in the high-pressure separator to form a polymer-rich blend and a separated monomer-rich phase; and (g) recycling the separated monomer-rich phase of (f) to the one or more reactor trains of G2.

51. The process of claim 50 wherein the polypropylene copolymer is chosen from ethylene-propylene, propylene-butene-1, propylene-hexene-1, propylene-octene-1, propylene-decene-1, ethylene-propylene-butene-1, ethylene-propylene-hexene-1, ethylene-propylene-octene-1, and ethylene-propylene-decene-1 copolymers.

52. The process of claim 50 wherein the combined flow rate of propylene monomer in the reactor effluent from all reactor trains of G1 minus the combined flow rate of propylene monomer purged from the process of claim 50 is less than or equal to the combined conversion rate of propylene monomer in the G2 reactor trains of (a).

* * * * *